United States Patent
Hannebauer et al.

(10) Patent No.: US 11,463,125 B2
(45) Date of Patent: Oct. 4, 2022

(54) TRANSPORTING SAMPLED SIGNALS OVER MULTIPLE ELECTROMAGNETIC PATHWAYS

(71) Applicant: hyPHY USA Inc., Dover, DE (US)

(72) Inventors: Robert Steven Hannebauer, Vancouver (CA); Todd Elliot Rockoff, Holgate (AU)

(73) Assignee: HYPHY USA INC., Dover, DE (US)

( * ) Notice: Subject to any disclaimer, the term of this patent is extended or adjusted under 35 U.S.C. 154(b) by 0 days.

(21) Appl. No.: 16/494,901

(22) PCT Filed: Mar. 21, 2018

(86) PCT No.: PCT/AU2018/050257
§ 371 (c)(1),
(2) Date: Sep. 17, 2019

(87) PCT Pub. No.: WO2018/170546
PCT Pub. Date: Sep. 27, 2018

(65) Prior Publication Data
US 2020/0014419 A1    Jan. 9, 2020

(30) Foreign Application Priority Data

Mar. 20, 2017 (AU) ................................. 2017900974

(51) Int. Cl.
*H04B 1/707* (2011.01)
*H04B 1/06* (2006.01)

(52) U.S. Cl.
CPC ............... *H04B 1/707* (2013.01); *H04B 1/06* (2013.01)

(58) Field of Classification Search
CPC ........ H04B 1/707; H04B 1/69; H04B 1/7073; H04B 1/06; H04B 1/0483
See application file for complete search history.

(56) References Cited

U.S. PATENT DOCUMENTS

| | | |
|---|---|---|
| 3,204,035 A | 8/1965 | Ballard et al. |
| 3,795,765 A | 3/1974 | DeGroat et al. |
| 5,793,759 A | 8/1998 | Rakib et al. |
| 5,796,774 A | 8/1998 | Kato |
| 5,870,414 A | 2/1999 | Chaib et al. |
| 5,936,997 A | 8/1999 | Kanda |
| 5,938,787 A | 8/1999 | Stark et al. |

(Continued)

FOREIGN PATENT DOCUMENTS

| | | |
|---|---|---|
| CN | 101933277 | 12/2010 |
| CN | 101969319 | 2/2011 |

(Continued)

OTHER PUBLICATIONS

Immink "Construction of DC-free Codes using the Fast Hadamard Transform", Nov. 2001, pp. 1-6.*

(Continued)

*Primary Examiner* — Sophia Vlahos
(74) *Attorney, Agent, or Firm* — Beyer Law Group LLP

(57) ABSTRACT

The subject of this disclosure is applying SSDS-CDMA techniques to media signal communication as well as control and status exchange to implement a diversity of media interfaces, achieving suitable media communication results despite EM propagation challenges.

28 Claims, 29 Drawing Sheets

(56) References Cited

U.S. PATENT DOCUMENTS

| | | | |
|---|---|---|---|
| 6,125,136 A * | 9/2000 | Jones | H04B 1/707 375/147 |
| 6,128,309 A | 10/2000 | Tariki et al. | |
| 6,310,923 B1 | 10/2001 | Lee et al. | |
| 6,480,559 B1 | 11/2002 | Dabak et al. | |
| 6,751,247 B1 | 6/2004 | Zhengdi | |
| 6,763,009 B1 | 7/2004 | Bedekar et al. | |
| 6,956,891 B2 | 10/2005 | Tan et al. | |
| 7,793,022 B2 | 9/2010 | Travers et al. | |
| 7,796,575 B2 | 9/2010 | Lim et al. | |
| 7,873,980 B2 | 1/2011 | Horan et al. | |
| 7,908,643 B2 | 3/2011 | Huotari et al. | |
| 7,937,605 B2 | 5/2011 | Rea et al. | |
| 7,996,584 B2 | 8/2011 | Keady et al. | |
| 8,073,647 B2 | 12/2011 | Horan et al. | |
| 8,094,700 B2 | 1/2012 | Okazaki | |
| 8,272,023 B2 | 9/2012 | Horan et al. | |
| 8,280,668 B2 | 10/2012 | Horan et al. | |
| 8,295,296 B2 | 10/2012 | Keady et al. | |
| 8,369,794 B1 | 2/2013 | Bharghavan et al. | |
| RE44,199 E | 5/2013 | Garodnick | |
| 8,520,776 B2 | 8/2013 | Rea et al. | |
| 8,546,688 B2 | 10/2013 | Horan et al. | |
| 8,674,223 B2 | 3/2014 | Horan et al. | |
| 8,674,224 B2 | 3/2014 | Horan et al. | |
| 8,674,225 B2 | 3/2014 | Horan et al. | |
| 8,674,226 B2 | 3/2014 | Horan et al. | |
| 8,680,395 B2 | 3/2014 | Horan et al. | |
| 8,705,588 B2 | 4/2014 | Odenwalder | |
| 9,324,478 B2 | 4/2016 | Horan et al. | |
| 9,970,768 B2 | 5/2018 | Monroe et al. | |
| 10,158,396 B2 | 12/2018 | Hannebauer et al. | |
| 2002/0013926 A1 | 1/2002 | Kim et al. | |
| 2002/0097779 A1 | 7/2002 | Bang et al. | |
| 2003/0139178 A1 | 7/2003 | Uesugi et al. | |
| 2004/0120415 A1 | 6/2004 | Song et al. | |
| 2005/0069020 A1 | 3/2005 | Lakkis | |
| 2008/0084920 A1 | 4/2008 | Okazaki | |
| 2008/0106306 A1 | 5/2008 | Keady et al. | |
| 2010/0013579 A1 | 1/2010 | Horan et al. | |
| 2010/0091990 A1 | 4/2010 | Etemad et al. | |
| 2010/0142723 A1 | 6/2010 | Bucklen | |
| 2010/0321591 A1 | 12/2010 | Onomatsu | |
| 2011/0044409 A1 | 2/2011 | Yoshimoto et al. | |
| 2012/0014464 A1 | 1/2012 | Eiger et al. | |
| 2019/0158138 A1 | 5/2019 | Hannebauer et al. | |
| 2019/0260629 A1 | 8/2019 | Nikopour et al. | |

FOREIGN PATENT DOCUMENTS

| | | | |
|---|---|---|---|
| CN | 101917209 | 7/2015 | |
| EP | 0 727 881 | 8/1996 | |
| EP | 1 079 536 | 2/2001 | |
| EP | 1 968 324 | 9/2008 | |
| JP | 08293818 | 11/1996 | |
| JP | 2001156861 | 6/2001 | |
| JP | 2001510658 | 7/2001 | |
| JP | 2002281545 | 9/2002 | |
| JP | 2011003331 | 6/2011 | |
| WO | WO 97/02663 | 1/1997 | |
| WO | WO 98/52365 | 11/1998 | |
| WO | 2010/106330 | 9/2010 | |
| WO | WO-2010106330 A2 * | 9/2010 | ............ H04J 13/16 |
| WO | WO 2012/007785 | 1/2012 | |
| WO | WO 2017/049347 | 3/2017 | |

OTHER PUBLICATIONS

Eltokhy et al, "A Low Power Analog Matched-Filter with Smart Sliding Correlation", IEEJ Trans., ETS, vol. 123 No. 11, 2003, pp. 1970-1976.*

International Search Report dated Jul. 6, 2018 from International Application No. PCT/AU2018/050257.

Van der Heijden, "An Analog Correlator for a High Speed DS-CDMA Modem", Eindhoven University of Technology, Department of Electrical Engineering Telecommunication Technology and Electromagnetics, 1998, 65 pages.

Ieee, An Analog Spread-Spectrum Interface for Power-Line Data Communication in Home Networking, Dated Jan. 2005.

Japanese Office Action for Patent Application No. 2019-548445, dated Mar. 25, 2022.

* cited by examiner

| Location | Alternative Logical Assignments for HDMI Connector Pins | | |
| --- | --- | --- | --- |
| | HDMI | hyPHY-HDMI-A-A | hyPHY-HDMI-A-C |
| Pin 1 | TMDS Data2+ | hyPHY0+ | hyPHY0+ |
| Pin 2 | TMDS Data2 Shield | hyPHY0 Shield | hyPHY0 Shield |
| Pin 3 | TMDS Data2- | hyPHY0- | hyPHY0- |
| Pin 4 | TMDS Data1+ | hyPHY1+ | hyPHY1+ |
| Pin 5 | TMDS Data1 Shield | hyPHY1 Shield | hyPHY1 Shield |
| Pin 6 | TMDS Data1- | hyPHY1- | hyPHY1- |
| Pin 7 | TMDS Data0+ | hyPHY2+ | Status Tunnel+hyPHY2+ |
| Pin 8 | TMDS Data0 Shield | hyPHY2 Shield | hyPHY2 Shield |
| Pin 9 | TMDS Data0- | hyPHY2- | Status Tunnel+hyPHY2- |
| Pin 10 | TMDS Clock+ | hyPHY3+ | Control Tunnel+hyPHY3+ |
| Pin 11 | TMDS Clock Shield | hyPHY3 Shield | hyPHY3 Shield |
| Pin 12 | TMDS Clock- | hyPHY3- | Control Tunnel+hyPHY3- |
| Pin 13 | CEC | Control/Status Tunnel+ | N.C. |
| Pin 14 | N.C. | N.C. | N.C. |
| Pin 15 | SCL | N.C. | N.C. |
| Pin 16 | SDA | Control/Status Tunnel- | N.C. |
| Pin 17 | DDC/CEC Gnd | Tunnel Shield | N.C. |
| Pin 18 | +5V Supply | +5V Supply | +5V Supply |
| Pin 19 | Hot Plug Detect | Hot Plug Detect | Hot Plug Detect |

FIGURE 28

| UTP | hyPHY-UTP-A32 | hyPHY-UTP-S |
|---|---|---|
| Pair 0 | hyPHY0 | hyPHY 0 + bi-dir |
| Pair 1 | hyPHY1 | hyPHY 1 + bi-dir |
| Pair 2 | hyPHY 2 + downstream | hyPHY 2 + bi-dir |
| Pair 3 | hyPHY 3 + upstream | hyPHY 3 + bi-dir |

Uphill Transform

TRANSPORTING SAMPLED SIGNALS OVER MULTIPLE ELECTROMAGNETIC PATHWAYS

The field of the disclosure is communication of media signals, i.e., sampled signals that are destined ultimately for human perception. In particular, the subject of this disclosure is implementing arbitrary media interfaces with an adaptive compression media transport.

BACKGROUND

Physical Basis of Communication
Electromagnetic Propagation Pathway (EM Path)

An electromagnetic propagation pathway (EM path) enables the rapid propagation of physical energy as a signal from a transmitting terminal to a receiving terminal across physical space. EM paths for media signal communication are generally available in one of three kinds: wire pair (cable), free space (wireless), and optical waveguide (fibre).

Various kinds of EM paths cover disparate spatial arrangements, from within an integrated circuit package to within the chassis of a camera or a phone to the space around the equipment wearer's body to within the constructed environments that surround people (such as within a room or within a vehicle) or throughout a building or across a campus. Some EM paths convey media signals over distances exceeding tens of kilometres, thus enabling telecommunications.

Electromagnetic Signal (EM Signal)

For the purposes of this disclosure, an electromagnetic signal (EM signal) is a variable represented as electromagnetic energy whose amplitude changes over time. EM signals propagate through EM paths, from a transmitter terminal to a receiver terminal.

EM signals can be characterized as continuous or discrete independently in each of two dimensions:
Time
Continuous: The time between successive values being assigned to the variable is limited by the resolution at which it is possible to measure time
Discrete ("Sampled"): The time between successive values being assigned to the variable is predetermined, and the average sampling interval's inverse is the EM signal's "sampling rate."
Amplitude
Continuous: The number of possible amplitudes of the EM signal value is limited by the resolution at which it is possible to measure energy
Discrete ("Quantized"): The number of possible amplitudes of the EM signal value is predetermined. The logarithm base 2 of the number of different possible amplitudes is the quantized EM signal's "number of bits."

There are four combinations of these attributes and thus four distinct types of EM signal:
"Analog" signals are continuous-time, continuous-amplitude EM signals.
"Digital" signals are discrete-time, discrete-amplitude EM signals.
"Pulsatile" signals are discrete-time, continuous-amplitude EM signals. This unusual meaning of the term "pulsatile" is appropriated for clarity in this disclosure. Pulsatile signals are sometimes called "sampled analog" signals by others also skilled in the art.
"Neuronal" signals are continuous-time, discrete-amplitude EM signals. This is not necessarily the usual meaning of the word "neuronal," but is fitting for this fourth quadrant of the taxonomy herein. Neuronal signals are outside the scope of the present disclosure.

Some physical portion of an EM signal is in transit between transmitter terminal and receiver terminal while being conveyed through the EM path. The greatest amount of information that can be in transit through an EM path at a single instant is a number whose numerator depends on the physical distance travelled between transmitter and receiver, and whose denominator can be as large as the speed of light.

Imperfect EM Paths

Due to such phenomena as attenuation, reflections due to impedance mismatches, and impinging aggressor signals, every EM path degrades EM signals that propagate through it, in the sense that measurements of an EM signal taken at a receiving terminal are certain to differ to some extent from the levels made available at a corresponding transmitting terminal. Therefore, every EM path is an imperfect electromagnetic propagation pathway. Therefore, measurements taken at a receiving terminal are always subject to error with respect to corresponding levels made available to the transmitting terminal paired to the receiving terminal through the EM path. The quality of any given EM path is characterized by the comparison of the levels measured at the receiving terminal after conveyance through the EM path to the levels made available at the transmitter.

As an embodiment, cables are the EM path referred to most often herein. However, the principles, methods, and apparatuses described and claimed apply equally to all EM paths.

Media Signal

Media signals are a special type of EM signals. A media signal is an ordered series of samples. A media signal may be produced by a physical measuring device, for example an image sensor, or a video engine, for example a graphics processor. The input to an image or video display matrix is also a media signal.

Video signals are an important class of media signals. As an embodiment, media signals are considered video signals where appropriate herein. There are many alternative electronic formats for video signals. A video consists of an ordered sequence of images, each of which in turn describes a two-dimensional array of color values. Color values may be represented in diverse color spaces, and the resolution of each frame, and the frame rate, all vary. Most video signals may be represented as a one-dimensional list of color values, i.e., an ordered series of samples. These samples are quantized in digital video systems and they are continuous in pulsatile (sampled-analog) video systems.

Media Signal Snippet

A media signal snippet is a finite contiguous sub-series from the ordered series of samples of a media signal. Examples of media snippets include still images (e.g., .JPG, .BMP) and movies (e.g., .MP4, .AVI). A media signal source, such as a video camera, produces an arbitrarily long but finite sequence of media signal snippets.

Physical Basis of Media Signal Snippets

A media signal snippet exists as a physical object whose temporal and spatial expanse is finite, but unbounded.

Common examples of physical embodiments of media snippets include voltages across an array of capacitors, as in image sensors, and as in the contents of dynamic computer memories; ink on paper; or currents through an array of diodes, as in a direct LED display. A media signal snippet may also be embodied as a waveform travelling through free space.

The physical embodiment of the media signal snippet may span an arbitrarily small or large volume of time and space. Each of the kinds of media signal snippet embodiments listed above can be compact in space and persist over long intervals.

Most familiar physical embodiments of media signal snippets are spatially compact. Examples of familiar embodiments for images, an image being an especially important kind of media signal snippet, include the set voltages held in the capacitors in the image sensor of a camera, the set of emitter drive currents provided to the LED array of a direct LED display, and the set of bits representing an image in a frame buffer memory of an electronics apparatus.

Media Signal Communication

Media Signal Communication Requirements

Media signal communication is a physical process that repeatedly transforms sets of samples from one or more input media signals between physical embodiments, from one place to another, through electromagnetic propagation.

A media signal communication system consists of a media-signal-producing device (a "source") and a media-signal-consuming device (a "sink") that exchange energy through electromagnetic propagation across one or more EM paths. Most of the energy is allocated to conveying EM signals representing the input media signals from the source to the sink. A relatively modest further amount of energy is allocated to conveying control and status information between source and sink. For clarity herein, the source is considered to be "upstream" or "uphill" of the sink with respect to the direction of media signal communication.

The source transforms one or more input media signals by repeatedly transforming one or more input media signal snippets into intervals of one or more EM signals made available to associated EM paths.

The sink reconstructs one or more output media signals by repeatedly reconstructing one or more output media signal snippets from intervals of one or more EM signals having been conveyed across associated EM paths.

Media Signal Communication Quality and Human Perception

One success metric for media communication is the degree to which the output signals are suitable representations of the input signals. What defines suitability, or fitness for purpose, varies broadly amongst applications. For video communication, the intrinsic error characteristics of image sensors and displays allows for a spectrum of image quality requirements, for example spanning the following range of examples:

i) every bit of every color value in every image is correct (It is challenging to produce defect-free high-resolution displays and image sensors)
  ii) there is a certain number of 'bad' pixels, with a certain distribution
  iii) "no person can tell" (e.g., 4:2:2 compression)
  iv) "I see something, now that you point it out" (e.g., light noise)
  v) obvious glitches (e.g., block artifacts arising from discrete cosine transform failures)
  vi) blank screens (no video signal communicated; not acceptable for any application)

Where there is latitude in the definition of quality, the requirements for media signal communication differ starkly from the requirements for binary data communication. When communicating binary data, such as email, every symbol is expected to be reconstructed perfectly at the destination. In contrast, output media signals are fit for some purposes, including human perception, even when the media communication does not reconstruct every symbol precisely. For example, lossy compression is increasingly widely accepted for video communication as increasing video resolutions test the practical limits of bit-serial video transport capability.

The utility of the methods and apparatuses disclosed herein is based in part on the observation that Human perception of video signal communication quality depends on the statistics of the spatial and temporal distribution of the individual color value errors in the reconstructed video signal as well as on the aggregate magnitude of the errors.

Media Transport

A Media Transport consists of a source circuit paired with a sink circuit over a single EM path. Media Transport selection is a critical design consideration for media equipment, because systems are assembled by end customers buying off-the-shelf equipment supplied from various factories, and interconnected through in some cases difficult-to-predict and sometimes difficult-to-constrain EM paths. End customers expect interoperability, but it is challenging for an equipment manufacturer to anticipate operating over all possible legacy EM paths. An ideal media transport accommodates a broadest diversity of legacy EM paths.

Media Interface

Those skilled in the art ascribe a diversity of meanings to the term "Interface." "Media Interface" herein refers to the specifications for source equipment, in some cases allowable EM paths, and for sink equipment, for media signal communication.

A Media Interface relies on a Media Transport, by specifying a certain number of EM paths, herein P, pairing P Media Transport sources with P Media Transport sinks. A Media Interface also specifies a control/status exchange protocol. A Media Interface may furthermore specify physical connector and EM path properties. Whatever the physical constraints and control/status protocol may be, every media interface relies on a Media Transport.

Video interfaces are an especially important type of media interface. Examples of Video Interfaces include HDMI (EIA/CEA-861), DVI, DisplayPort, MIPI, USB, AHD, various IP Video interfaces, and many others.

Bit-Serial Media Interfaces

Most Media Transports are bit-serial in design, such that the EM path conveys one bit at a time. A Media Interface that aggregates several bit-serial Media Transports over several EM paths at once is itself a bit-serial Media Interface. At the physical level, such bit-serial Media Transports construe each sample to be a number, each of whose bits are communicated precisely.

Physical considerations pertaining to the propagation of EM signals through EM paths impose a limit on the rate at which bits can be sent through any real-world EM path. Therefore, every bit-serial Media Transport imposes a hard frequency limit, which translates to a resolution and frame rate limitation in the Media Interface specification.

A critical differentiator amongst bit-serial Video Interfaces is the Media Transport specified. For example, HDMI and DVI specify TMDS; DisplayPort specifies a fixed-data-rate packet transport; MIPI's D-PHY, M-PHY, and C-PHY each specify bit-serial communication; USB specifies bit-serial differential signalling on one or more twisted-pair data cables; AHD specifies 2-channel Y/C FDMA over coaxial cable; while the various IP Video interfaces specify Ethernet over various EM paths; and so forth.

Accommodating the insatiable market demand for media content delivery with intrinsically limited bit-serial Media Transports has led to the development of IP Video. IP Video usually relies on video compression. The goal of video compression is to reduce the bandwidth of the media signal as measured in bits per second. Compression algorithms represent each Media Signal Snippet with a smaller set of bits, each of which must be communicated precisely.

IP Video is a class of bit-serial Media Transports wherein video signal snippets are first algorithmically encoded into compressed representations that require fewer bits than the original input video signal snippet, such that the compressed representation may be transported bit-serially through conventional (e-mail compatible) network links. The compressed representation is no longer a video signal, although it remains a digital signal. IP Video is subject to the same constraints as other bit-serial Media Transports.

Video compression is algorithmically challenging and thus costly to develop. Video compression is computation-intensive and thus costly to implement. Video compression processes add latency to communication processes.

Moreover, the quality of the reconstructed video is sometimes visibly impaired by compression artifacts. Examples of objectionable high-spatial-frequency artifacts include "contouring" edges appearing in gradual gradients presented over large digital display areas, and "blocking" artifacts arising from very minor errors on the order of 0.1% in the DC terms of DCT blocks in motion-based compression algorithms.

A distinguishing characteristic of bit-serial media communication is that when the electrical characteristics of the EM path are insufficient to sustain the required bit communication rate, bit-serial media communication systems fail precipitously, either producing artifacts in reconstructed output signals that human observers find objectionable or losing the ability to reconstruct any useful output signal at all. Marginal cases leading to total failure of communication have high impact on consumers of media signals, leading to the need for a Media Transport that is more resilient than bit-serial solutions have proven to be.

SSDS-CDMA for Sampled Signal Communication

In the search for an alternative video transport free from the limitations of known video transports, Spread Spectrum Direct Sequence—Code Division Multiple Access (SSDS-CDMA) transmission systems as defined in "Spread Spectrum Systems with Commercial Applications" by Robert C. Dixon, volume 3, Wiley & Sons 1994, is incorporated by reference into this specification.

SSDS is a widely used communication method for sampled signals that relies on spreading Codes. A Code is a unique indexed sequence of a certain number of values called "chips," and a spreading Code has certain frequency characteristics.

An SSDS transmitter modulates (encodes) each sample of the input information signal by a higher-frequency spreading Code to create an output EM signal having certain properties with respect to electromagnetic propagation.

An SSDS receiver measures an input EM signal as an ordered series of levels, correlates (decodes) the received EM signal by a synchronized instance of the Code applied by the creator of the EM signal, and collects output samples as the output information.

SSDS is well known to confer multiple benefits, including resilience against EM path defects including, for example, attenuation, dispersion, and reflections. SSDS is especially resilient against narrow-band aggressor signals. Aggressor signals correspond to sporadic bursts of energy introduced to the EM path that is concentrated around certain frequencies, rather than spread uniformly across all frequencies. One example source of aggressor signals is mobile phone emissions.

SSDS accounts for reflected waves from impedance discontinuities: the characteristic delay of these reflected waves is very much greater than a single dispatching or measuring interval. The only practical concern regarding reflections is that it becomes possible for the receiver to lock on a reflected EM signal rather than on the EM signal made available at the transmitter terminal.

The robustness of SSDS is commonly applied to ensuring that at least a certain percentage of a set of bits is conveyed correctly through a potentially challenging EM path. In contrast to this prevalent bit-serial design objective, the success of media transports is measured not as what percentage of a payload of bits is delivered, but rather how suitable for a given application is the output media quality, in consideration of the media transport implementation cost.

Acquisition and Tracking of Synchronization Information in SSDS-CDMA Systems

In any SSDS communication system, the receiver needs to be synchronized with the transmitter. Typically, the synchronization takes place in two parts: an initial coarse synchronization, also known as acquisition, followed by a finer synchronization, also known as tracking. There are many sources of error in the acquisition of synchronization, however in the embodiments disclosed herein, application issues of Doppler shift, multipath interference and some of the subtler effects which impact prior SSDS-CDMA are not present due to the relatively constrained nature of most infrastructure EM paths.

SSDS-CDMA for Media Signal Communication

SSDS-CDMA is a communication method wherein several independent SSDS output EM signals, each modulated with a distinct spreading Code, share a common EM path. The SSDS-CDMA receiver distinguishes among the various SSDS output EM signals contributing to the received EM signal based on the specific spreading Code applied by each modulator.

Differentiation from Known SSDS-CDMA Methods

SSDS is different from what is claimed in this disclosure:
SSDS is applied when nearly every bit of a digital signal must be conveyed correctly, versus the satisficing approximations required of media transports for many applications, including most human-viewing applications.
SSDS is generally applied for single signal streams through an EM path which is often in free space, whereas media transport carries media signal snippets through an EM path which is often a waveguide.

SSDS-CDMA is different from what is taught in this disclosure:
In known SSDS-CDMA applications, the encoded values are transmitted independently from one another; by contrast, the media interface disclosed herein relies on a media transport that synchronously encodes all values in a vector of N media signal sample values as a series of L values conveyed across the EM path.
Some known SSDS-CDMA applications seek to hide the transmitted signals in the ambient noise floor, for minimum energy consumption, minimum potentially harmful EM radiation, and minimum probability of intercept; by contrast, the media interface disclosed herein relies on a media transport that can convey the maximum energy through the EM path that is permitted by relevant FCC/CE/CCC regulations.

Known (bit-serial) SSDS-CDMA relies on Chip-phase-shifted Code variants to differentiate amongst transmitters; by contrast, the encoder and decoder pair claimed herein uses orthogonal Code Books to minimize Inter-track Interference (II).

An orthogonal Code Book may contain non-spreading Codes. The Identity matrix (sketched in FIG. 15) is an example of one such Code Book.

One embodiment of an orthogonal Code Book contains spreading Codes, such that 1) transmission of each input/output vector sample enjoys the resiliency benefits of SSDS against aggressors and 2) for signals destined for perception, transforming electrical imperfections as well as any II into perceptually benign artifacts.

Media signals are sample sequences, and not all bits of all samples have the same value: The high-order bits of samples are generally most important to perception, while all bits of all samples potentially contain value. Digital transports such as Transition Minimized Differential Signalling convey bit sequences. Digital media transports, to re-balance the bit values, apply digital compression algorithms. Compression adds cost, latency, power consumption, and design complexity, all while reducing quality. In between compression and decoding, all bits are conveyed at equal significance. The apparatuses and methods disclosed herein convey sample sequences, which is a more direct approach to communicating media signals. These processes apply statistical encoding/decoding that a) compensates for physical propagation errors at least as well as any digital transport compensates for such errors and b) yields highest-fidelity reconstructions considering any residual, not-correctable physical propagation errors. The effectiveness of the process relies on selecting an appropriate code book rather than on analyzing the media signal; as a direct consequence of this "content obliviousness," the process is implemented with low latency and low gate count.

Various aspects to be described herein will ease the hard limits for EM propagation distance and video resolution described above and will also be useful in the enhancement and replacement of various known media interfaces and known media signal transport.

SUMMARY OF THE PRESENT DISCLOSURE

In an aspect a Media Interface specifies a media transport and a bi-directional protocol for exchanging control and status information between a source and a sink across the one or more EM paths. The number of EM paths and the bi-directional communication protocols specified by a Media Interface are chosen according to the requirements of specific applications. The methods and apparatuses disclosed herein are targeted to achieve media signal quality results that are perceived as suitable for specific applications, while being adapted to conform to the control/status protocol specified for those applications.

In an aspect the methods and apparatuses disclosed herein apply diverse SSDS-CDMA methods to media interface implementation by simultaneously:
  a) approximately reconstructing media signal samples from one or more input EM signals, applying a new SSDS-CDMA-based media transport
  b) reconstructing binary status information from the input EM signals, applying SSDS-CDMA
  c) encoding binary control information, propagating opposite to the direction of media signal propagation, applying SSDS-CDMA As applied to practical video interfaces, including those providing for bi-directional digital audio, the total amount of information to be communicated is dominated by video. Therefore, control information and status information are communicated at a far lower bit rate than the video sample rate. Therefore, the spreading codes applied to the control and status bits have scope to achieve much higher process gain than the spreading codes applied to the video samples. Higher process gain is achieved by modulating with longer spreading codes and ensures signal acquisition in particularly challenging EM propagation environments. Such high process gain is especially important in this context because the EM propagation environment is made especially challenging by the presence in the EM path of the high-bandwidth EM signal representing the video signal itself.

This specification in an aspect discloses methods and apparatuses that implement a broad range of Media Interfaces by aggregating P instances of a Single-EM-path SSDS-CDMA Media Transport, consisting of a transmitter and receiver pair over an EM path and adding bi-directional status/control communication. The methods and apparatuses disclosed herein are suitable for all sampled signals and are particularly well suited to media communication in support of human perception. Band-limited analog EM signals, when measured at predetermined intervals, are sampled and therefore amenable to communication by the methods and apparatuses disclosed herein.

An aspect of the methods and apparatuses disclosed herein provides for a downstream digital data signal ("status channel") and an upstream digital data signal ("control channel") by adding EM signals to the EM signals created for the input media signals. Whereas media signal communication admits some error, bit-serial data signal communication requires that a certain percentage of the bits be reconstructed precisely by the receiver.

In an aspect of the disclosure, the methods and apparatuses disclosed herein include Media Transports directed to cause uncompensated errors in the EM signal level measurements at the sink relative to the levels made available by the paired source to manifest as white noise in reconstructed output signals. The objective is to exploit the robust human ability to see and hear content despite the presence of white noise added to the input signal.

Whereas each bit-serial Media Transport constrains the types of EM path over which bits can be reconstructed reliably, the Media Transport applied in the methods and apparatuses disclosed herein adapts the output media signal quality to the quality of the EM path at hand. This characteristic renders the subject of this disclosure applicable to upgrading equipment in existing media systems, enabling direct re-use of legacy infrastructure.

Repeated Distributing, Encoding, and Making Available Method

In one aspect, a method for repeatedly distributing samples from one or more input signals to one or more input vectors, each in an encoder input memory, encoding each input vector into an ordered series of output levels to be made available, and making available each series of output levels to a unique EM path comprises a series of steps.

In an aspect a preliminary step for the method is to select values for P, an integer $\geq 1$, and for N and L, each an integer such that $L \geq N \geq 2$. P is the number of EM paths through which EM signals are conveyed. N is the number of samples per input vector. L is the number of chips per spreading Code. High L means high electrical resilience due to increased spreading process gain, but higher L demands higher-speed circuits, all else being equal. High N means high media signal throughput, but higher N means lower resilience, for fixed L. In one embodiment for communicating HDMI signals over UTP, P=4, N=63, and L=64. In a further embodiment for communicating HDMI signals over UTP, P=4, N=126, and L=512.

In an aspect another preliminary step is to determine a set of time intervals during which the major steps of the method occur: the distributing interval, the encoding interval, the transporting interval, the decoding interval, and the collecting interval. These intervals may be different from one another.

In an aspect the predetermination of the transport interval depends, for example, upon trade-offs involving N, L, the energy density limits of the EM path, and the limits of the implementation technology: For fixed N and L, a shorter transport interval means higher media signal throughput, at the additional expense of higher-speed embodiments, all else being equal.

In an embodiment, the transport interval is 100 ns, corresponding to 10 million input vectors transported per second.

In a preferred embodiment, the distributing, encoding, transporting, decoding, and collecting intervals are of one common duration.

In an aspect another preliminary step is to select a set of N Codes ("code book"). A unique Code is associated with each index in the encoder input vectors. A Code is a unique indexed sequence of L chips, and each of the codes is different from the other N−1 codes in the set. In a preferred embodiment, each of these chips is a binary value, either +1 or −1, and each Code is DC-balanced. Each Code in the Code book is associated with a unique position in the input vector. The first step in the method applied at each of P encoders is to modulate the sample at each index in the input vector by the correspondingly indexed value of the Code associated with that input vector index. In one class of embodiments, the possible chip values are −1 and +1, the binary values so chosen to facilitate DC-balanced direct sequence modulation by a Code. In another class of embodiments, the number of possible values for each chip is a predetermined integer number greater than two, such that the chip is a digital value whose representation requires more than one bit. In another class of embodiments, there is an infinite number of possible chip values within a predetermined range, such that the Codes are pulsatile (sampled-analog) signals.

In an aspect a step of the method is distributing samples from the one or more input media signals into P indexed input vectors, each of length N. This distributing step takes place during the predetermined distributing interval. This distributing step implements a predetermined distributing permutation, which is a one-to-one mapping between indices in the set of input media signals snippets to indices in the P input vectors. The properties of the permutation do not matter, such that any one of the N! possible permutations is equally preferred. In an embodiment, the input media signal samples are assigned to input vector locations in in the P encoders in straightforward round-robin order.

In an aspect a further step of the method is the encoding step, which takes place during the predetermined encoding interval in each of the P encoders. The encoding step iterates a modulating sub-step L times, once for each of the L code indices.

Each modulating sub-step takes place within a predetermined modulating interval. The modulating sub-step comprises multiple sub-sub-steps:

i. determining the modulating interval of this sub-step (the modulating interval),
 ii. modulating each sample in the input vector by the value addressed by the loop index in the corresponding code, and
 iii. summing the results of all modulations sub-sub-step ii. to form one of the ordered series of output levels, and
  wherein the ordered series of output levels resulting from sub-sub-step iii. in its entirety represents an EM signal with certain properties conducive to reconstructing output vectors that suitably represent the corresponding encoder input vectors.

In an aspect a yet further step of the method for each of P EM paths is the making available step: all L values in the ordered series of output levels is made available to the EM path, within the pre-determined transport interval. The making available step iterates a dispatching sub-step L times, once for each of the L indices in the ordered series of output levels. Each dispatching sub-step takes place during a pre-determined dispatching interval and comprises multiple sub-sub-steps:

i. determining the dispatching interval for this sub-step, and
 ii. making available to the EM path the indexed one of the ordered series of output levels.

Uniform Modulating and Dispatching Intervals

In a range of preferred embodiments, each dispatching interval equals the same-indexed modulating interval. In a range of preferred embodiments, the dispatching and modulating intervals are uniform for all sub-steps, thus equalling the transport interval divided by L. In an embodiment, the uniform dispatching interval is 100 ps.

Non-Uniform Modulating and Dispatching Intervals

Modulation schemes that rely on the temporal characteristics of the outgoing EM signal require that each modulating interval equal the corresponding dispatching interval. For simplicity, the discussion herein refers only to the modulating interval.

In an aspect additional information can be conveyed over the EM path by varying successive modulating intervals. The ordered series of varied modulating intervals is itself a modulation that adds phase information to the EM signal produced by media signal SSDS-CDMA modulation.

A further practical advantage of varying successive modulating intervals is to provide supplementary EMI/RFI (Electro-magnetic Interference/Radio Frequency interference) spectral energy suppression, thereby increasing the likelihood of EMI compliance. When the sequence of modulating intervals is a PN sequence or a near-PN sequence, this method creates beneficial phase noise in the EM signal made available to the EM path. Modulating the modulating intervals broadens the individual spikes in the comb pattern formed by the frequency-domain representation of the EM signal energy, thereby further increasing the likelihood of EMI compliance.

There is more than one way to pre-determine the modulating intervals. One way relies on a look-up table. Another way relies on an algorithmic modulating interval determiner circuit, such as a PN generator. There are other ways to achieve this aim.

In an embodiment, the modulating intervals are either 80 ps and 120 ps, and the selection between the two values is such that the sequence of modulating intervals is a near-PN sequence with an average of 100 ps. Such an embodiment might be considered a "binary modulating intervals" embodiment. In an aspect of the embodiment, the predetermined durations of the modulating intervals are generated by a linear feedback shift register, whose output constitutes a binary PN sequence, and which controls a delay generation circuit.

In an embodiment, the modulating intervals each is one of 40 ps, 60 ps, 80 ps, 100 ps, 120 ps, 140 ps, 160 ps, and 180 ps, and the selection of successive values is such that the sequence of modulating intervals is a PN code. Such an embodiment might be considered a "3-bit modulating intervals" embodiment. In general, where the number of possible modulating interval durations is $2^k$, such an embodiment might be considered a "k-bit modulating interval durations" embodiment. In a preferred embodiment, the sequence of modulating intervals is a near-PN sequence whose average value is the encoding interval divided by L.

In an embodiment, the modulating intervals range continuously between 80 ps and 120 ps, and the determination of the smallest modulating interval is impossible. One example of such impossibility arises in an embodiment wherein the modulating interval durations are determined by a stochastic process. In an embodiment, a noise source is derived from a Johnson-Nyquist noise generator that relies on a physical phenomenon. Such an embodiment might be considered a "continuous modulating interval durations" embodiment.

In a further embodiment of a distributing, encoding, and making available method, the modulating intervals are uniform to facilitate the encoding step implementation, while the dispatching intervals are varied for the benefits cited above. In an aspect, this embodiment prepares an input media signal snippet of predetermined length subsequently to be made available by the making available step. It remains to be explored how this EM signal representation might itself be further compressed.

Conversion of Digital Output Signal Values to Analog EM Signal Levels

A switched-capacitor (analog) implementation of the modulation yields EM signal levels that need only be amplified into the EM path. A digital implementation of the arithmetic calculation, on the other hand, yields numbers representing the EM signal levels. In an aspect, the method further provides as appropriate for conversion of output values from digital numbers to EM signal levels as part of the making available step. In any case, the physical result is an EM signal, to be conveyed through an EM path.

Repeated Receiving, Decoding, and Collecting Method

In an aspect, a method for receiving an ordered series of input values corresponding to a series of output values produced by a corresponding encoding method having been applied to one or more input media signal snippets from an EM path during a predetermined transport interval, decoding the ordered series of input values into an output vector, and distributing the output vector into one or more reconstructed media signal snippets, comprises a series of steps.

The first step is to acquire synchronization with the signal arriving from the EM path. The literature on SSDS-CDMA systems contains many methods and apparatus to acquire synchronization.

The next step is to prepare an output vector containing a predetermined number N of locations in which to develop the reconstructed samples.

The next step is to associate with each index in an output vector a code, from a predetermined code set, wherein each of the codes is an indexed sequence of values, or "chips." Each code is orthogonal to all of the other N−1 codes in the set. Also, each code is L chips long. Moreover, the code set is identical to the code set applied in the corresponding encoding method. L and N for the decoding method match the corresponding parameter values in the corresponding encoding method.

The next step is the receiving step. The receiving step takes place during the same transport interval in which the paired method for collecting, encoding, and making available executes its making available step. The receiving step repeats a measuring inner loop, executed once for each of the L indices in the ordered series of input values, comprising multiple sub-steps:
  i. determining the duration of this measuring interval, and
  ii. measuring the indexed one of the ordered series of values delivered from an EM path.

The considerations regarding the transport interval and the measuring interval are the same as those for the transport interval in the corresponding method for collecting, encoding, and making available. In a uniform sequence of measuring intervals, the duration of each measuring interval is given by transport interval divided by L. The ordered series of input values produced by the receiving step in its entirety represents the input media signal snippets that were encoded by the corresponding method for collecting, encoding, and making available and are to be reconstructed by this method.

The considerations for, and the construction of, non-uniform sequences of measuring intervals are the same as those for non-uniform sequences of dispatching intervals in the corresponding method for collecting, encoding, and making available.

The next step is the decoding step. The decoding step takes place during a predetermined decoding interval. In a preferred embodiment, the decoding interval equals the transport interval. The decoding step executes L iterations of the demodulating loop, one iteration for each of the L indices in the ordered input series, each step executed during a demodulating interval, each step consisting of several sub-steps:
  i. determining the duration of this demodulating interval,
  ii. demodulating the indexed value in the ordered input series by the commonly indexed value in the code corresponding to the output vector index,
  iii. summing the demodulation result from sub-step i) 1) with the correspondingly indexed element of the output vector,
  iv. storing the summing result from sub-step i) 2) in the corresponding output vector index, and
  v. tracking synchronization with the sending signal.

In a uniform sequence of demodulating intervals, the duration of each demodulating interval is equal to the duration of the transport interval divided by L. In an embodiment, the uniform demodulating interval is 100 ps.

In a non-uniform sequence of demodulating intervals, successive demodulating intervals vary among predetermined values. The sequence of demodulating intervals recovers the phase-modulated signal produced by the corresponding method for collecting, encoding, and making available. The purpose of this phase modulation of the demodulating intervals is to minimize EFI and RFI in the EM path.

The considerations for determining and controlling the demodulation intervals are the same as those for determining and controlling the modulation intervals in the corresponding method for collecting, encoding, and making available.

The final step is the distributing step. The distributing step takes place during a predetermined distributing interval. In a preferred embodiment, the distributing interval equals the transport interval. This distributing step implements a predetermined permutation, which is a one-to-one mapping between indices in the output vector to indices in the set of reconstructed media signal snippets. The permutation is the inverse of the permutation applied in the corresponding encoding method. This decoder permutation presents zero or more samples from the output vector to each reconstructed media signal snippet.

An Apparatus for Collecting, Encoding, and Making Available

In an aspect, an apparatus for collecting an input vector of samples from one or more input media signal snippets, encoding the input vector into an ordered series of output values during a pre-determined encoding interval, and making available the ordered series of output values to an EM path during a pre-determined transport interval, comprises a collection of elements.

One of the elements is a memory for receiving and storing all of the samples in an input vector of a predetermined length N. The predetermination of N involves a trade-off: Higher N confers greater throughput while sacrificing electrical resilience, all else being equal. In an embodiment, N=16.

Another element is a permuter. The permuter assigns input media signal snippet samples to input vector locations. The permuter implements a pre-determined permutation, which is also called a "one-to-one mapping." There are N! possible such permutations. In a preferred embodiment, the permutation is chosen for convenience.

Another element is a controller for repeating, for all N indices of the input vector during a predetermined collecting interval, the step of:

Configuring the permuter to store the successive input media signal snippet sample to the indexed input vector location.

Another element is a set of N code generators for generating a predetermined set of codes. There is one code generator for each input vector index. Each code in the code set is an indexed sequence of values, or "chips." The codes are all a common predetermined length L, such that there are L chips in each code. The predetermination of L involves a trade-off: Higher L confers greater electrical resilience, at the expense of higher-speed circuit implementations. In an embodiment, L=1024. Each code is different from all the other codes in the set.

Another element is a set of N modulators. There is one modulator corresponding to each input vector index. Equivalently, there is one modulator corresponding to each code in the code set. Each modulator has two inputs: One input comes is the corresponding input sample, while the other input is the corresponding chip.

Another element is a single N-input summation circuit (a "summer"). The summer inputs are driven by the modulator outputs, one per input vector index.

Another element is a controller for repeating, for all indices of the set of codes, at a rate sufficient to enumerate all indices of the set of codes within the predetermined encoding interval, a modulating sub-step, taking place within a pre-determined modulating interval, consisting of the following sub-sub-steps:

i. determining the duration of this modulating interval, and
ii. modulating each element of the input vector with its corresponding modulator by the value stored in the commonly indexed position in the corresponding code, and
iii. summing with the summer the results of all modulations of sub-sub-step ii) to form the indexed one in the ordered series of output values.

In a preferred embodiment, the encoding interval equals the transport interval, such that each modulator can be seen directly to modulate its input sample by the corresponding code over the course of one encoding interval.

In a uniform sequence of modulating intervals, the duration of each modulating interval is equal to the duration of the transport interval divided by L. In an embodiment, the uniform modulating interval is 100 ps.

In a non-uniform sequence of modulating intervals, successive modulating intervals vary among predetermined values. The sequence of modulating intervals is itself a signal that adds a time dimension (phase modulation) to the direct sequence modulation. This phase modulation of the modulating intervals is to minimize EFI and RFI.

In an embodiment, the modulating intervals are either 80 ps and 120 ps, and the selection between the two values is such that the sequence of modulating intervals is a near-PN sequence with an average of 100 ps. Such an embodiment might be considered a "binary chip interval durations" embodiment.

In an embodiment, the modulating intervals each is one of 40 ps, 60 ps, 80 ps, 100 ps, 120 ps, 140 ps, 160 ps, and 180 ps, and the selection of successive durations is such that the sequence of modulating intervals is a PN code. Such an embodiment might be considered a "3-bit chip interval durations" embodiment. In general, where the number of possible modulating interval durations is $2^k$, such an embodiment might be considered a "k-bit chip interval durations" embodiment.

In an embodiment, the modulating intervals range continuously between 80 ps and 120 ps, and the determination of the smallest modulating interval is impossible. One example of such impossibility arises in an embodiment wherein the modulating interval durations are determined by a stochastic process. In an embodiment, a noise source is derived from a Johnson-Nyquist noise generator that relies on a physical phenomenon. Such an embodiment might be considered a "continuous chip interval durations" embodiment.

Another element is an output terminal for making available the ordered series of values created during the encoding interval.

Another element is a making available controller for repeating during the transport interval, for each of the L indices in the ordered series of output values, a dispatching sub-step taking place within a dispatching interval, the sub-sub-steps of:

i. determining the duration of this dispatching interval, and
ii. making available the indexed value in the ordered output series created during the encoding interval, such that the sum of the dispatching intervals does not exceed the transport interval.

The ordered output series that has been made available after L iterations of the foregoing dispatching sub-step in its entirety represents the input media signal snippets.

In a uniform sequence of dispatching intervals, the duration of each dispatching sub-step is equal to the duration of the transport interval divided by L. In an embodiment, the dispatch interval is 100 ps.

In a non-uniform sequence of dispatching intervals, successive dispatching intervals vary, for example to provide supplementary EMI/RFI (Electro-magnetic Interference/Radio Frequency interference) spectral energy suppression and EMI compliance. When the sequence of modulating intervals is a PN sequence, this apparatus creates beneficial phase noise in the physical signal made available to the EM path.

The modulated intervals broaden the individual spikes in the comb spreading the energy in the frequency domain and reducing the EMI footprint.

In an embodiment, the dispatching intervals are either 80 ps and 120 ps, and the selection between the two values is such that the sequence of dispatching intervals is a near-PN sequence with an average of 100 ps. Such an embodiment might be considered a "binary dispatching interval durations" apparatus. In an aspect of the embodiment, the predetermined durations of the dispatching intervals are generated by a linear feedback shift register, whose output constitutes a binary PN sequence, and which controls a delay generation circuit.

In an embodiment, the dispatching intervals each is one of 40 ps, 60 ps, 80 ps, 100 ps, 120 ps, 140 ps, 160 ps, and 180 ps, and the selection of successive values is such that the sequence of dispatching intervals is a PN code. Such an embodiment might be considered a "3-bit dispatching intervals" apparatus. In general, where the number of possible dispatching interval durations is $2^k$, such an embodiment might be considered a "k-bit dispatching interval durations" apparatus.

In an embodiment, the dispatching intervals range continuously between 80 ps and 120 ps, and the determination of the smallest dispatching interval is impossible. One example of such impossibility arises in an embodiment wherein the dispatching interval durations are determined by a stochastic process. In an embodiment, a noise source is derived from a Johnson-Nyquist noise generator that relies on a physical phenomenon. Such an embodiment might be considered a "continuous dispatching interval durations" apparatus.

In an embodiment, the intervals in the non-uniform sequence of dispatching intervals exactly match the intervals at the corresponding indices in the non-uniform sequence of encoding intervals. In such an embodiment, the EMI/RFI reduction can be accomplished either under control of the encoding controller or of the making available controller, at the implementer's convenience.

In a further embodiment of an on-line collecting, encoding, and making available apparatus, the modulating intervals are uniform to facilitate the encoding controller implementation, while the dispatching intervals are non-uniform and varied so as to minimize EMI and RFI. In an aspect, this embodiment double buffers a predetermined number of values in the ordered series to be made available between the encoding controller and the making available controller.

It remains to explore the scope of potential positive and negative interactions that might arise from the modulating intervals in a non-uniform sequence of modulating intervals being different from the corresponding dispatching intervals in a non-uniform sequence of dispatching intervals in a real-time apparatus.

In a further aspect, the values are transmitted over an EM path.

In a further aspect, the source assembly apparatus varies these parameters under algorithmic control, for example to accommodate changes in the nature of the payload, the EM path propagation characteristics, or the application requirements.

In an embodiment, the apparatus processes snippets repeatedly ad infinitum.

An Apparatus for Receiving, Decoding, and Distributing

In an aspect, an apparatus for receiving an ordered series of input values corresponding to an ordered series of output values produced by a corresponding collecting, encoding, and making available apparatus having been applied to one or more input media signal snippets from an EM path during a predetermined transport interval, decoding the ordered series of input values into an output vector of samples during a predetermined decoding interval, and distributing the output vector as one or more reconstructed media signal snippets during a predetermined distributing interval, comprises a collection of elements.

One of the elements is a memory for reconstructing and storing all the samples in an output vector of a predetermined length N, which equals the N of the corresponding encoding apparatus.

One of the elements is a set of code generators. There are N code generators, one for each output vector index. Each code generator produces a predetermined code, which is an indexed sequence of values, or "chips." Each code in the code set is another predetermined length L, which equals the L of the corresponding encoding apparatus. Each code is different from all the other codes in the set. The code set is identical to the code set of the corresponding apparatus for collecting, encoding, and making available.

Another of elements is a set of N correlators. There is one correlator corresponding to each output vector index and, equivalently, one correlator corresponding to each code in the code set. Each correlator has two inputs: One input is the received input value, and the other input is the corresponding chip.

One of the elements is a set of N summing circuits There is one summing circuit associated with each output vector index. Each summing circuit has two inputs: One input is the output of the corresponding correlator, and the other is the content of the correspondingly indexed output vector location.

One of the elements is a synchronization acquisition and tracking circuit. The timing acquisition and tracking circuit comprises a clock recovery circuit and a correlation spike detector. The correlation spike detector, which performs an absolute-value power measurement of the reconstructed media signal samples, feeds its output to control circuitry that adjusts PLL settings in the clock recovery circuit.

One of the elements is a receiving controller for repeating during the transport interval, for each of the L indices in the ordered series of input values, a measuring step during a measuring interval, the measuring step consisting of the following sub-steps:
  i. determining the duration of this measuring interval, such that the sum of the L measuring intervals does not exceed the transport interval, and
  ii. configuring the synchronization acquisition and tracking circuit to infer reference clock frequency and phase by analyzing the signal arriving from the EM path, and
  iii. measuring the indexed value in the ordered input series at the input terminal.

The ordered input series that has been received after L measuring intervals have transpired represents the input media signal snippets to be reconstructed.

The considerations regarding the transport interval and the measuring interval are the same as those for the transport interval in the corresponding apparatus for collecting, encoding, and making available. In a uniform sequence of measuring intervals, the duration of each measuring interval is equal to the duration of the transport interval divided by L.

The considerations for, and the construction of, non-uniform sequences of measuring intervals are the same as those for non-uniform sequences of dispatching intervals in the corresponding apparatus for collecting, encoding, and making available.

Another of the elements is a demodulating controller for repeating, during a predetermined decoding interval, for each of the L indices in the ordered series of input values, a demodulating step during a demodulating interval, consisting of the sub-steps of:

determining the duration of this demodulating interval, and repeating, for each of the N indices in the output vector, the sub-sub-steps of:

i. configuring the indexed correlator to contribute a portion of the indexed output sample by correlating the received input value by the commonly indexed value in the indexed code, ii. configuring the indexed summing circuit to sum the output of the indexed correlator with the content of the indexed output vector location, and iii. configuring the correspondingly indexed location in the output vector memory to receive the output of the summing circuit.

In a uniform sequence of demodulating intervals, the duration of each demodulating interval is equal to the duration of the transport interval divided by L. In an embodiment of the apparatus, the uniform demodulating interval is 100 ps.

In a non-uniform sequence of demodulating intervals, successive demodulating intervals vary among predetermined values. The sequence of demodulating intervals recovers the phase-modulated signal produced by the corresponding apparatus for collecting, encoding, and making available. The purpose of this phase modulation of the demodulating intervals is to minimize EFI and RFI in the EM path.

The considerations for determining and controlling the demodulation intervals are the same as those for determining and controlling the modulation intervals in the corresponding apparatus for collecting, encoding, and making available.

One of the elements is a controller for repeating, during a predetermined distributing interval, for each of the N indices in the output vector, the steps of:

i. configuring the synchronization acquisition and tracking circuit to infer reference clock frequency and phase by analyzing the signal arriving from the EM path, and ii. receiving the indexed value in the ordered input series at a rate sufficient to enumerate all the series indices within the transport interval.

The ordered input series that has been received after completion of L iterations of the inner loop above in its entirety represents the media signal snippets to be reconstructed.

One of the elements is a distributing controller for repeating during a predetermined distributing interval, for all N indices of the output vector, the step of:

i. configuring the permuter to make available the indexed output vector location as the successive reconstructed media signal snippet sample.

In a further aspect, the ordered series of input values is received over an EM path.

In an embodiment, the apparatus for receiving, decoding, and distributing is applied to successive snippets ad infinitum, exploiting iteration to acquire and refine synchronization with the corresponding apparatus for collecting, encoding, and making available.

Apparatuses for Communicating Sampled Signals over a Single EM Path

In another aspect, what is claimed is an apparatus for communicating sampled signals incorporating a collecting, encoding, and making available apparatus paired with a corresponding receiving, decoding, and distributing apparatus.

In a further aspect, an apparatus for communicating sampled signals incorporating a collecting, encoding, and making available apparatus configured for carrying digital signals is paired with a corresponding receiving, decoding, and distributing apparatus configured for carrying digital signals.

In a further aspect, an apparatus for communicating sampled signals incorporating a collecting, encoding, and making available apparatus configured for carrying pulsatile signals is paired with a corresponding receiving, decoding, and distributing apparatus configured for carrying digital signals.

In a further aspect, an apparatus for communicating sampled signals incorporating a collecting, encoding, and making available apparatus configured for carrying digital signals is paired with a corresponding receiving, decoding, and distributing apparatus configured for carrying pulsatile signals.

In a further aspect, an apparatus for communicating sampled signals incorporating a collecting, encoding, and making available apparatus configured for carrying pulsatile signals is paired with a corresponding receiving, decoding, and distributing apparatus configured for carrying pulsatile signals.

Tunnelling

In one aspect, what is claimed is a method and apparatus for piggy backing the modest-volume must-be-bit-accurate bit-serial control and status media signals over the same EM path that conveys an EM signal representing the high-bandwidth input media signal.

Media signal bandwidths are orders of magnitude greater than the bandwidths of control and status information. In fact, video is so bandwidth-intensive that in recent years as video resolution has increased the relative bandwidth of digital audio signals has shrunk to become similar to the relative bandwidth of control and status information. This is due to the relatively modest bandwidth requirements of individual audio channels. Other status information includes video framing, such as vsync and hsync. These additional signals are "sub-band signals". These additional signals are either low-data-rate signals, compared to the video signals, and/or they are timing reference waveforms. These additional signals are carried by "tunnelling," by which we mean applying SSDS-CDMA techniques with codes that are very long relative to the preferred code books for media transport. It is essential that these very-long-code SSDS-CDMA techniques perfectly correctly deliver the sequences of control and status bits. The additional modulated timing/control signals must be added together correctly with the output of the media transport source assembly before being amplified at the transmitter assembly output. The modulated status signals must be added correctly to the signal at the receiver assembly input, such that the media transport sink assembly is able correctly to measure the ordered series of values arriving from the EM path.

There are at least 3 possible strategies for tunnelling with regards to a number of EM paths available:

1. Overlay one or more tunnelled signals on one or more of the P EM signals produced by the media signal SSDS-CDMA. If the relatively long code modulating the tunnelled signal is orthogonal to those in the code book (and all other long codes also modulating tunnelled signals), then the Inter-Track Interference (ITI) should be negligible and mitigatable 2. Aggregate all tunnelled signals on their own high-speed wire bundle (re-purposed from one of HDMI's four TMDS bundles), thereby preserving a "full-bandwidth" TMDS bundle for each of three concurrent EM signals produced by the media signal SSDS-CDMA. The disadvantage of this approach is potentially wastes a high-bandwidth EM path on low-bandwidth control/status bits.
3. Re-purpose any available unshielded conductor pairs for control and status; apply spreading using very long codes to overcome the electrical poverty of the unshielded pair, and aggregate all the tunnelled signals on these re-purposed pins Elaboration of Transmitter to Simplify Timing Recovery In an embodiment, timing recovery information is injected in the outgoing signal using the scheme sketched in FIG. 33.

Note that the code overlaid per FIG. 33 must be orthogonal with all the codes in the codebook.

Note that it is possible to use a long-PN-sequence code overlay scheme to provide other timing information, possibly including hsync and vsync.

High-Speed Timing Recovery Circuit

FIG. 34 shows the circuit strategy for high-speed timing recovery circuit.

Note that the PN code generated in FIG. 34 must be the same as that referenced in FIG. 33.

The high-speed timing recovery circuit is embedded in the receiver assembly.

Tunnelled Timing Signals

The group of possibly tunnelled signals includes these timing signals:
  Modulating/Making Available/Measuring/Demodulating Clock: The highest-speed timing reference. The rate at which values are driven by the transmitter and received by the receiver.
  In an embodiment, the encoder and decoder also operate at the chip clock rate. Recovery of chip clock frequency and phase are critical for the receiver assembly function
  Code Clock (or Bank Clock): The rate at which new groups of samples are processed by the encoder and decoder
  Chip Clock frequency=L times Code Clock frequency
  hsync (or Row Clock): The edge indicating the start of the next row of dots (by "dot" we mean the value associated with a physical position in an image sensor or display) in a frame
    hsync frequency=N times Code Clock frequency divided by number of samples per row
    Note that hsync is a redundant signal, once the video format is known and timing lock is acquired
  vsync (or Frame Clock): The edge indicating the first row of a frame
    vsync frequency=hsync frequency divided by the number of rows per frame Media Interface Method and Apparatus In another aspect, what is claimed is a method and apparatus for media interfaces incorporating sample-serial media transports disclosed above. In one embodiment, one or more sample-serial media transports convey the media signals, while modest-bandwidth control and status information is exchanged bit accurately through a separate EM path. In a further embodiment, the control and status information are conveyed across the same EM paths used for media transport, in a process called "tunnelling." The control and status information must be delivered bit-accurately, but the information rate is relatively low. Thus, control and status information are amenable to bit-serial SSDS-CDMA techniques. Options include choosing a) using very long codes for this low-bandwidth digital payloads and b) selecting the code-books to be orthogonal with the code-book governing the modulation/demodulation of the media payload sharing the EM path.

Those of skill in the art would understand that information and signals may be represented using any of a variety of technologies and techniques. For example, data, instructions, commands, information, signals, bits, samples, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a media signal communication product for performing the method or operations presented herein. For example, such a media signal communication product may comprise a camera, video processor, or display, any of which might contain a stored-program computer (or information processor) capable of performing the operations described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The system may be a computer implemented system comprising of a display device, a processor and a memory and an input device. The memory may comprise instructions to cause the processor to execute a method described herein. The processor memory and display device may be included in a standard computing device, such as a desktop computer, a portable computing device such as a laptop computer or tablet, or they may be included in a customised device or system. The computing device may be a unitary computing or programmable device, or a distributed device comprising several components operatively (or functionally) connected via wired or wireless connections. An embodiment of a computing device comprises a central processing unit (CPU), a memory, a display apparatus, and may include an input device such as keyboard, mouse, etc. The CPU comprises an Input/Output Interface, an Arithmetic and Logic Unit (ALU) and a Control Unit and Program Counter element, which is in communication with input and output devices (eg input device and display apparatus) through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc). A graphical processing unit (GPU) may also be included. The display apparatus may comprise a flat screen display (eg LCD, LED, plasma, touch screen, etc.), a projector, CRT, etc. The computing device may comprise a single CPU (core) or multiple CPU's (multiple core), or multiple processors. The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules or instructions. The processor(s) may be configured to load and executed the software modules or instructions stored in the memory.

BRIEF DESCRIPTIONS OF FIGURES

Figure 4:
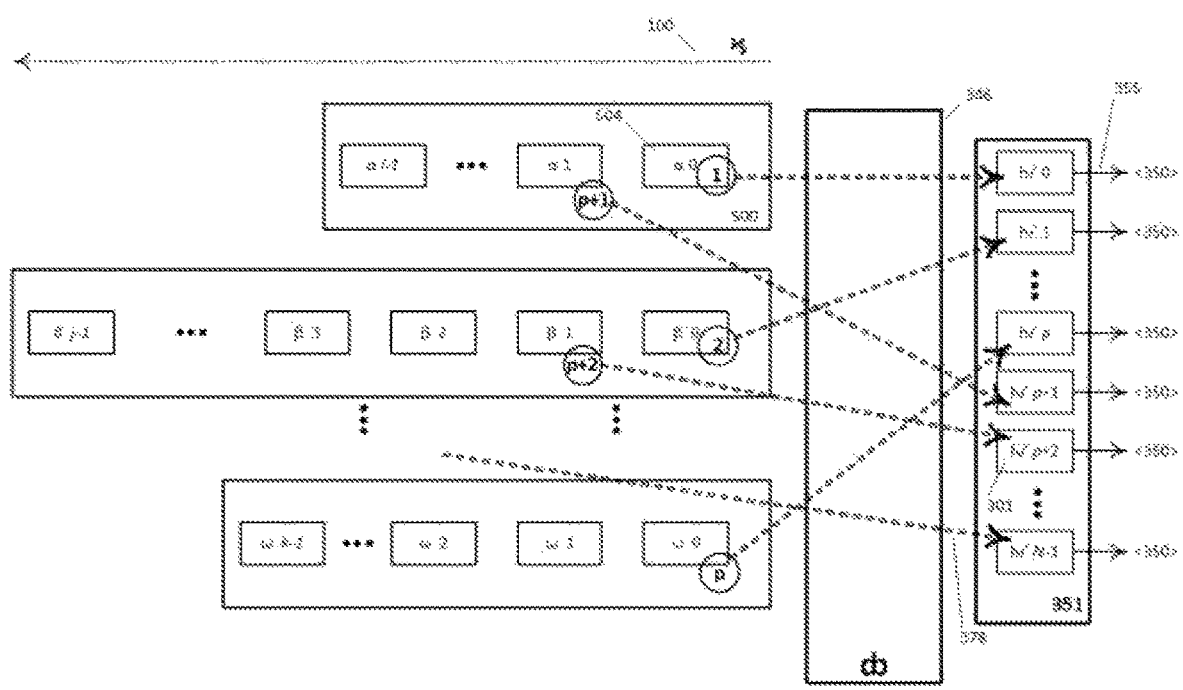
Figure 5:
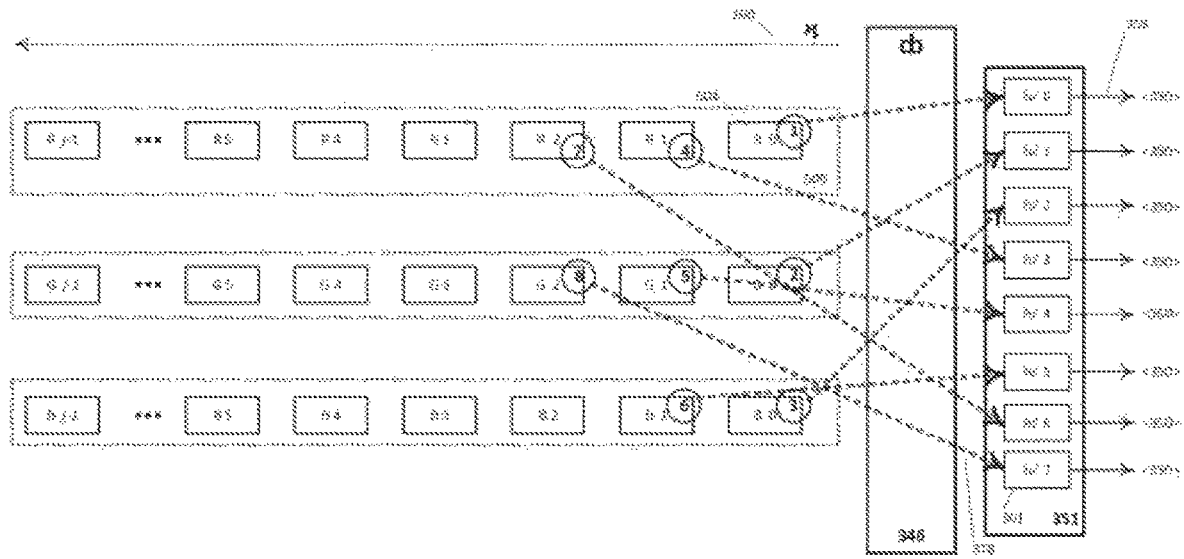
Figure 6:
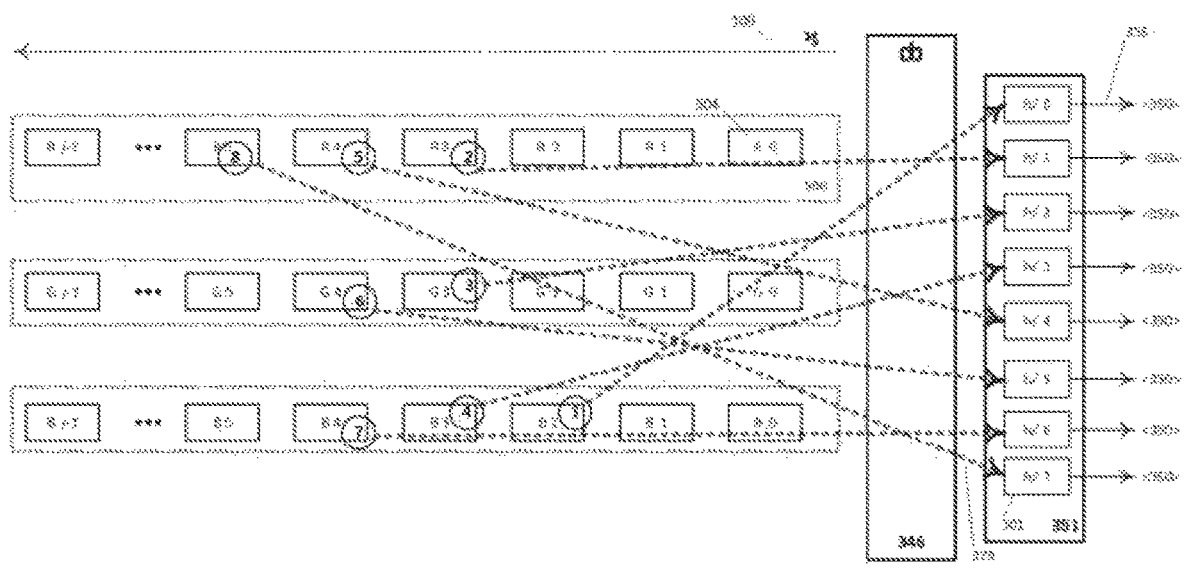
Figure 7:
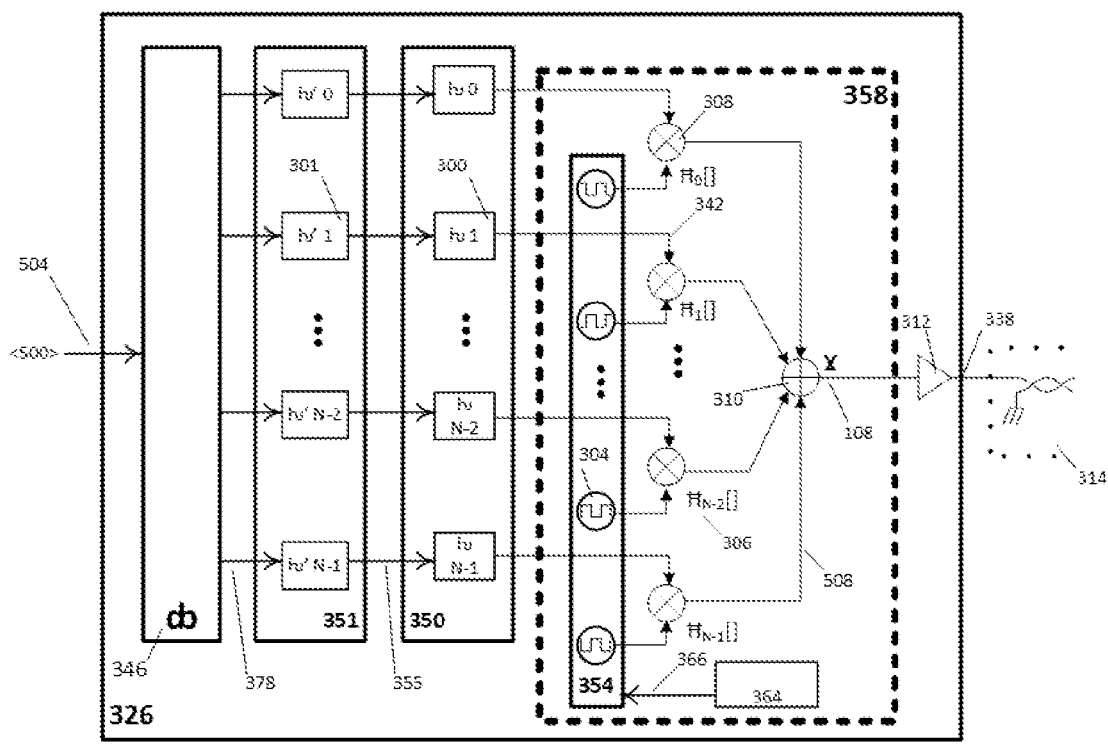
Figure 8:
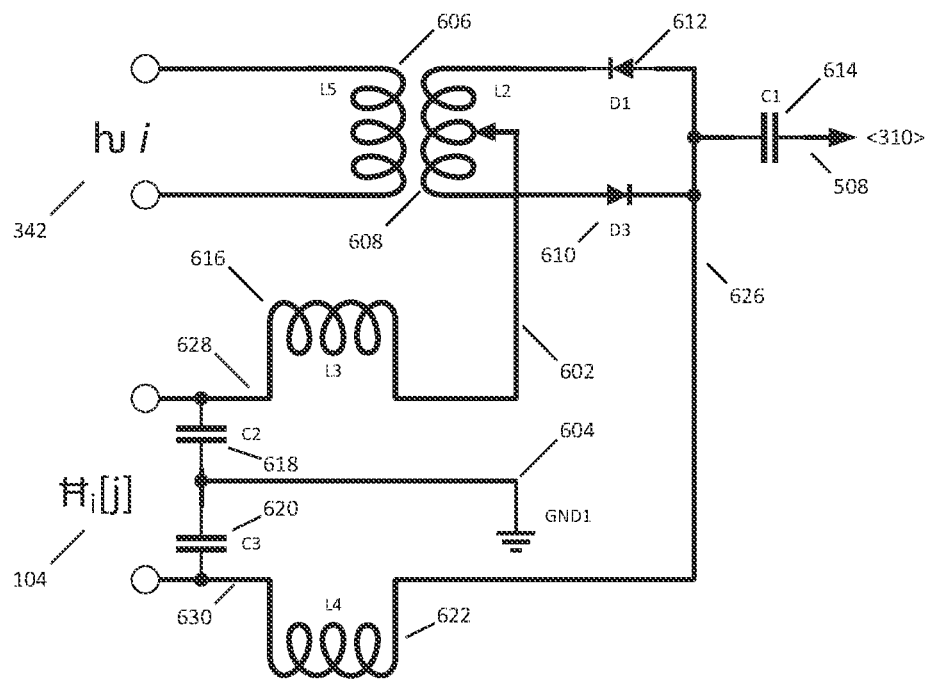
Figure 9:
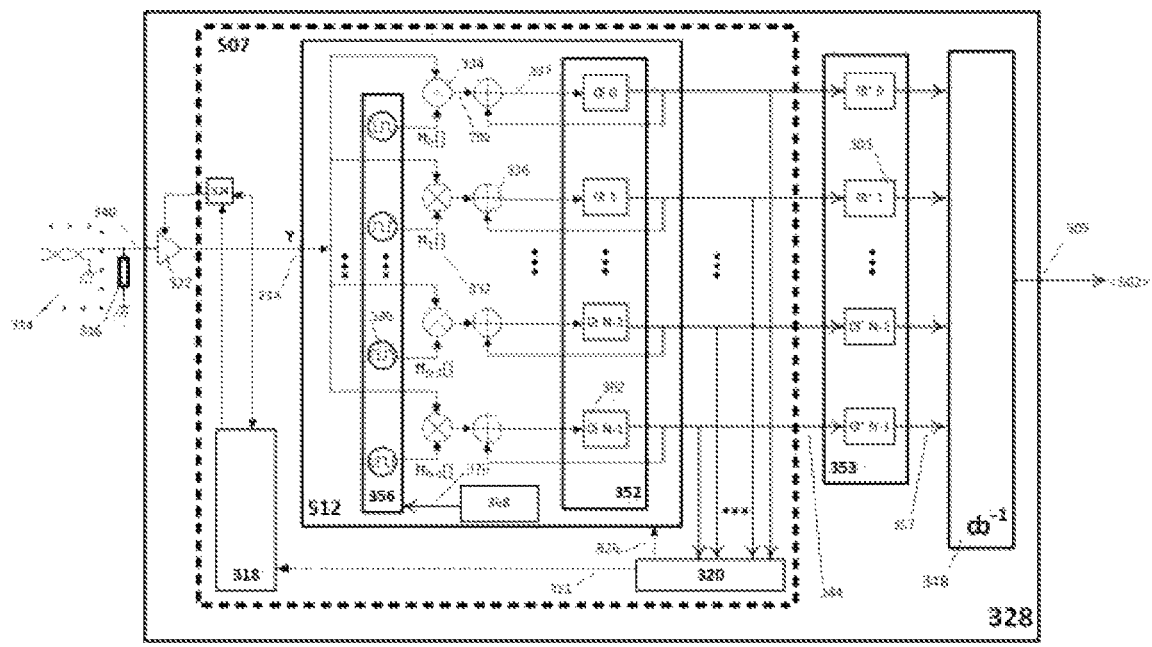
Figure 10:
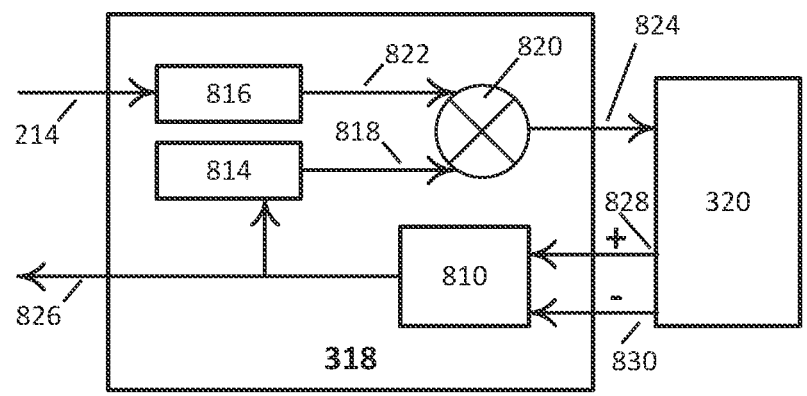
Figure 11:
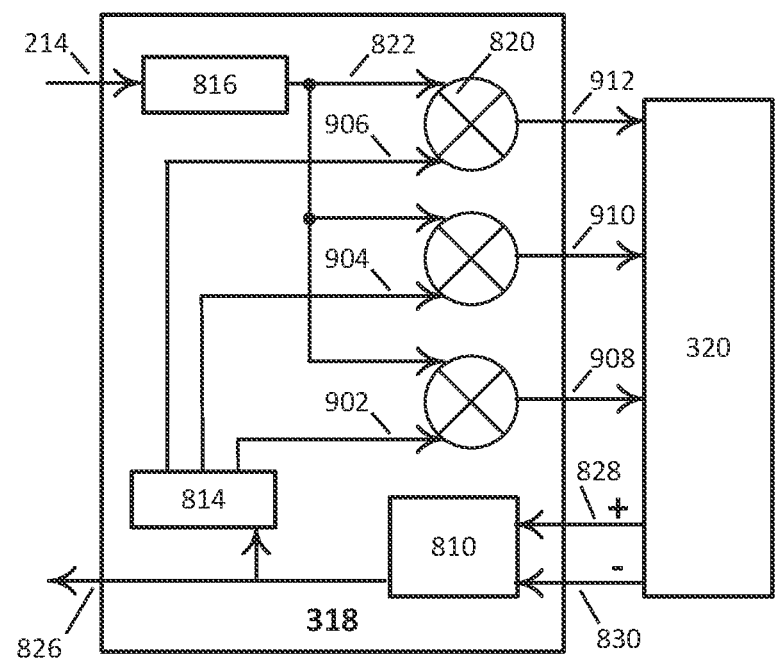
Figure 12:
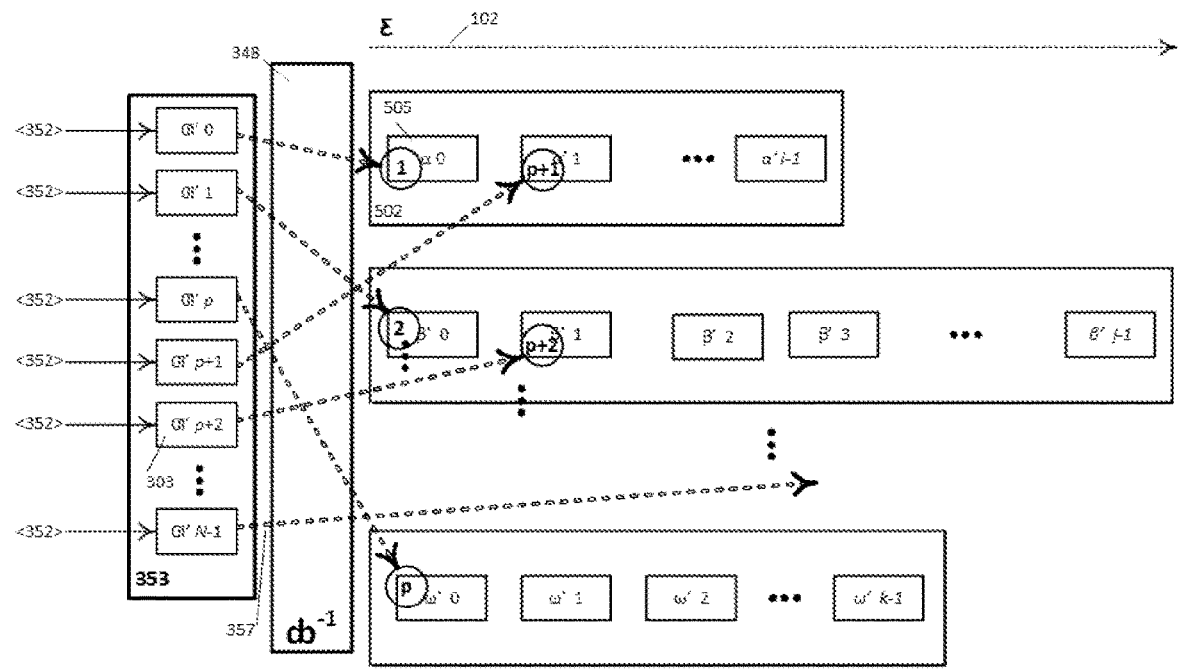
Figure 13:
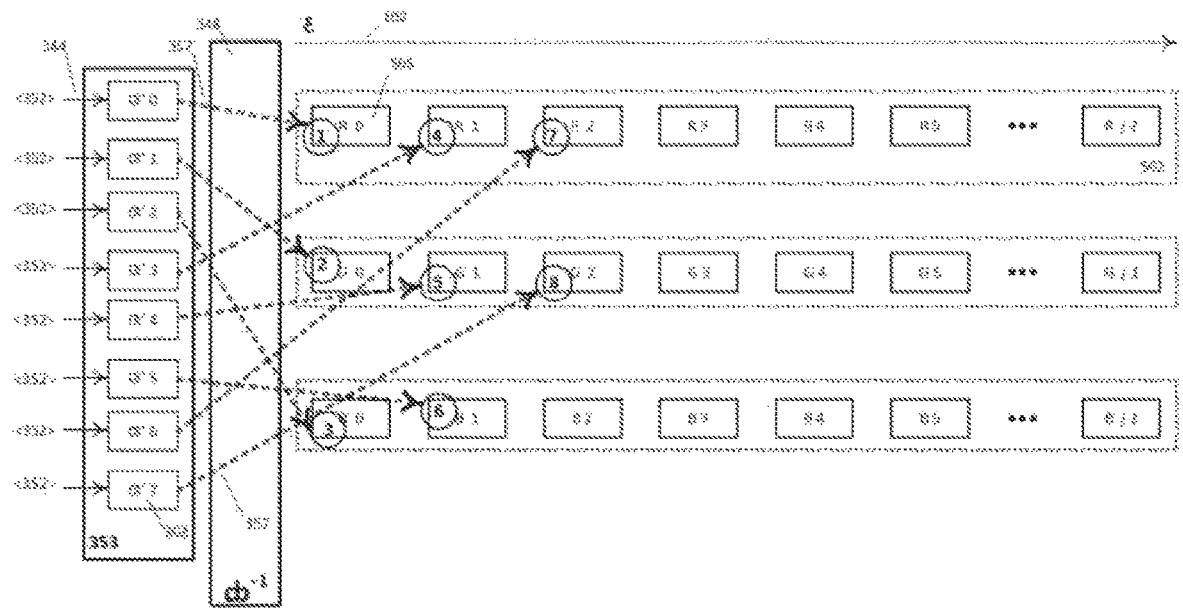

FIG. 4 describes an embodiment of a distributing permutation assigning samples from one or more input signals to locations in encoder input memories, the example shown being round-robin assignment from at least 3 input signals to a single encoder input memory;

FIG. 5 illustrates an example round-robin permutation assigning samples from a 4:4:4 input video signal to locations in an 8-sample input memory;

FIG. 6 further illustrates the repetitive aspect of the method, extending the example round-robin permutation of FIG. 5 to a successive iteration, assigning a second 8-sample snippet from the input video signal to the input memory;

FIG. 7 shows an apparatus for repeatedly distributing samples from an input signal to an N-sample input memory, encoding the input memory contents as an ordered series of L output EM signal levels, and making the output EM signal levels available as an output EM signal for conveyance through an EM path;

FIG. 8 depicts an example of a commutating modulator;

FIG. 9 illustrates an apparatus for repeatedly measuring an EM signal as an ordered series of L input levels, decoding the ordered series of input levels to an N-sample output memory, and collecting the output samples to an output video signal;

FIG. 10 shows the architecture of one synchronization acquisition and tracking circuit;

FIG. 11 shows the architecture of an alternative synchronization acquisition and tracking circuit;

FIG. 12 describes an embodiment of a collecting permutation assigning samples from decoder output memories to one or more output signals, the example shown being round-robin assignment from a single decoder output memory to at least 3 output signals;

FIG. 13 illustrates an example round-robin collecting permutation assignment of samples from an 8-sample output memory to a 4:4:4 output video signal.

Figures 14, 15:
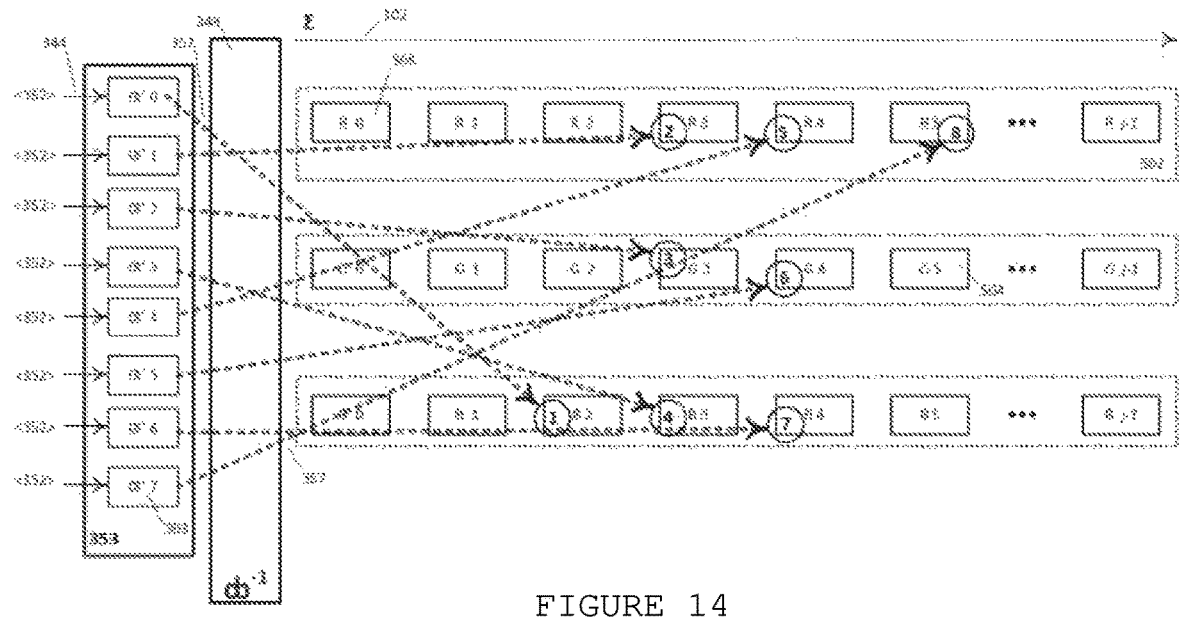
Figure 16:
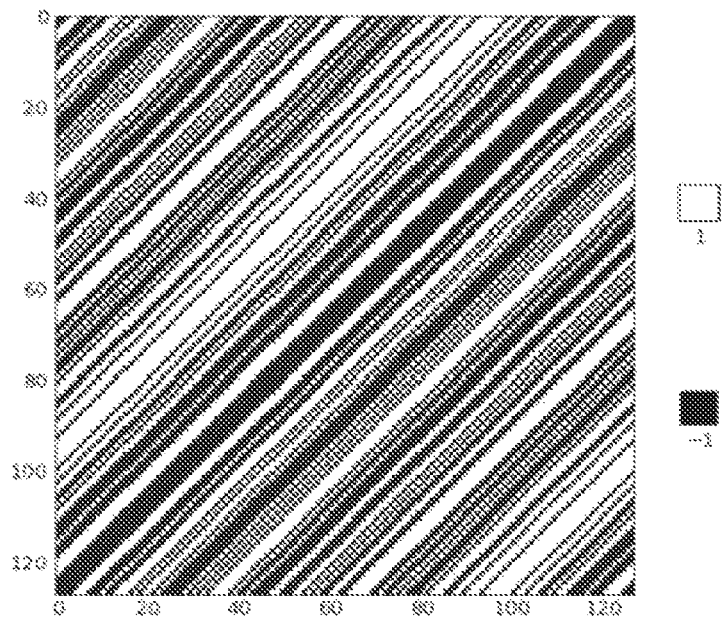
Figure 17:
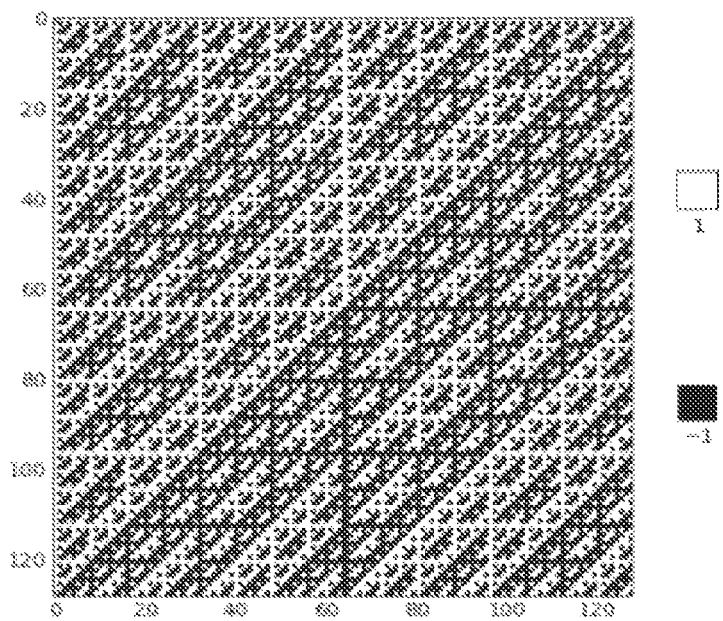
Figure 18:
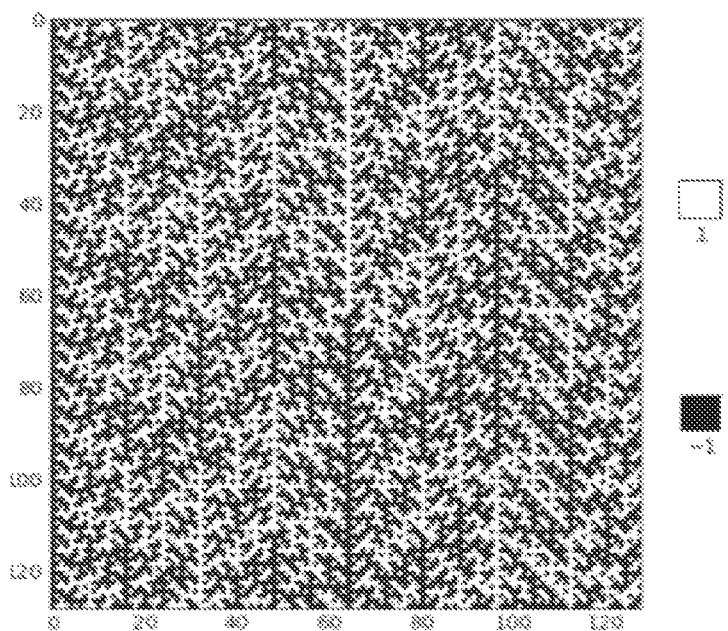
Figure 19:
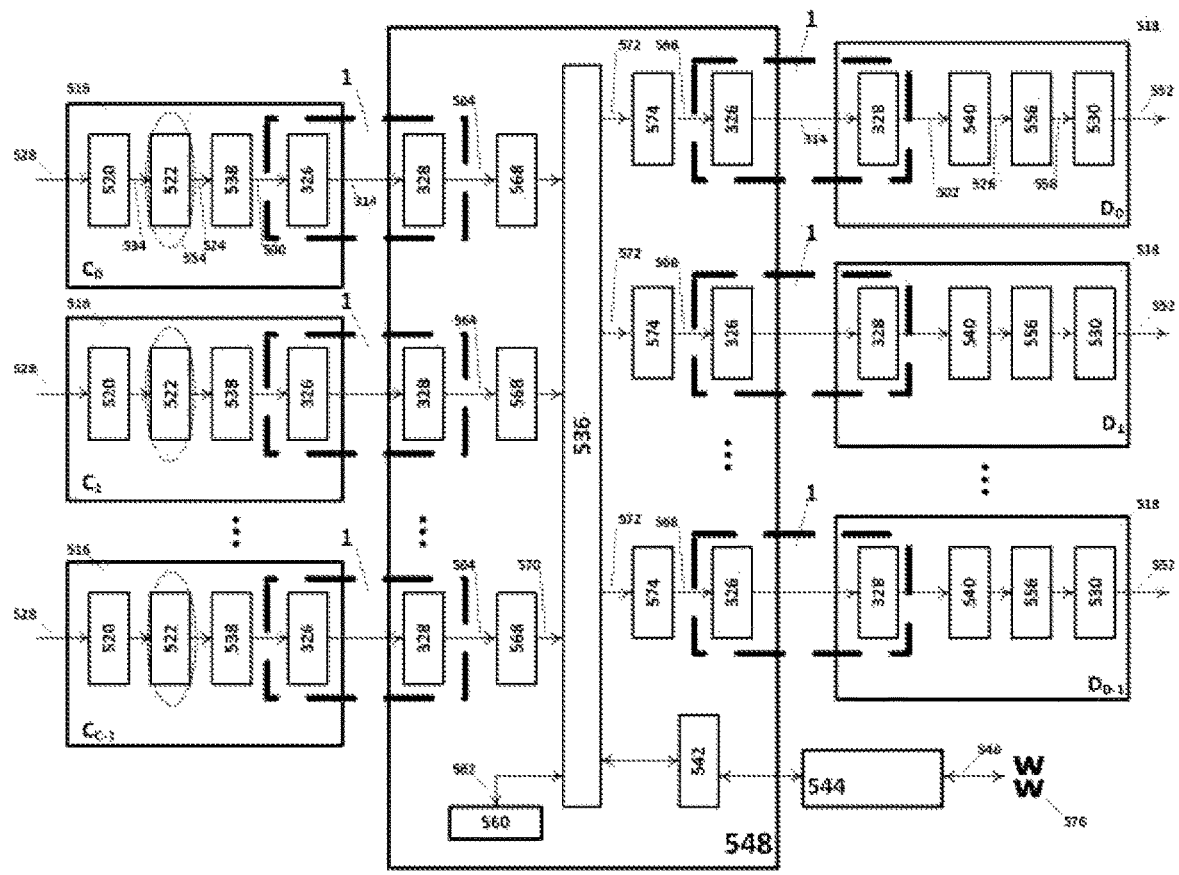
Figure 20:
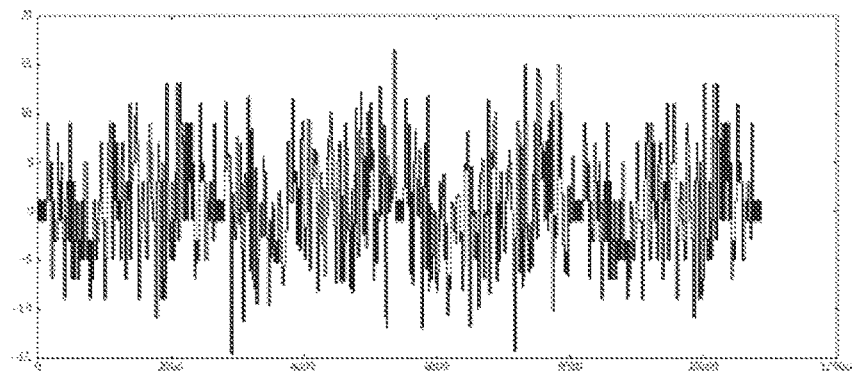

FIG. 14 further illustrates the repetitive aspect of the method, extending the example round-robin permutation of FIG. 13 to a successive iteration, assigning samples from a second 8-sample snippet from the output memory to the output video signal;

FIG. 15 shows the schema of one binary Code Book that is a subset of the identity matrix;

FIG. 16 shows an example of a 127×127 binary code book whose codes is each a unique rotation of a common PN sequence;

FIG. 17 shows an example of a 128×128 binary code book, which is a Walsh-Hadamard matrix;

FIG. 18 shows an example of a 128×128 binary code book, which is constructed by element-wise multiplying each row of a Walsh-Hadamard matrix with a common near-PN sequence;

FIG. 19 depicts the interconnections amongst the constituents of a media signal collection, processing, and presentation system; and FIG. 20 shows an example of an EM signal arriving from an EM path at a receiver terminal.

Figure 21:
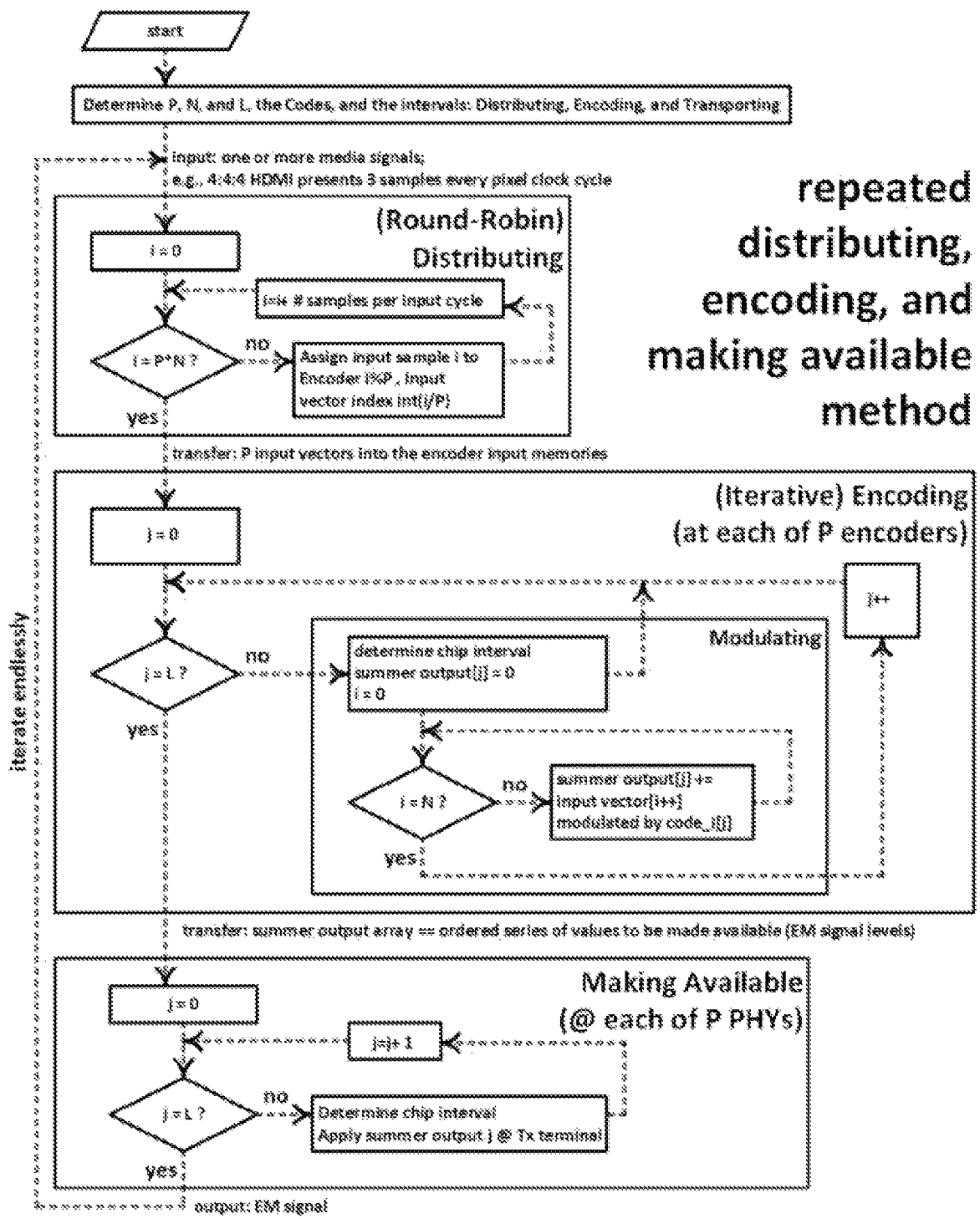

FIG. 21 shows a flow diagram for the repeated distributing, encoding, and making available method, suggesting a diversity of ways in which the various steps can be decoupled for practical benefit.

Figure 22:
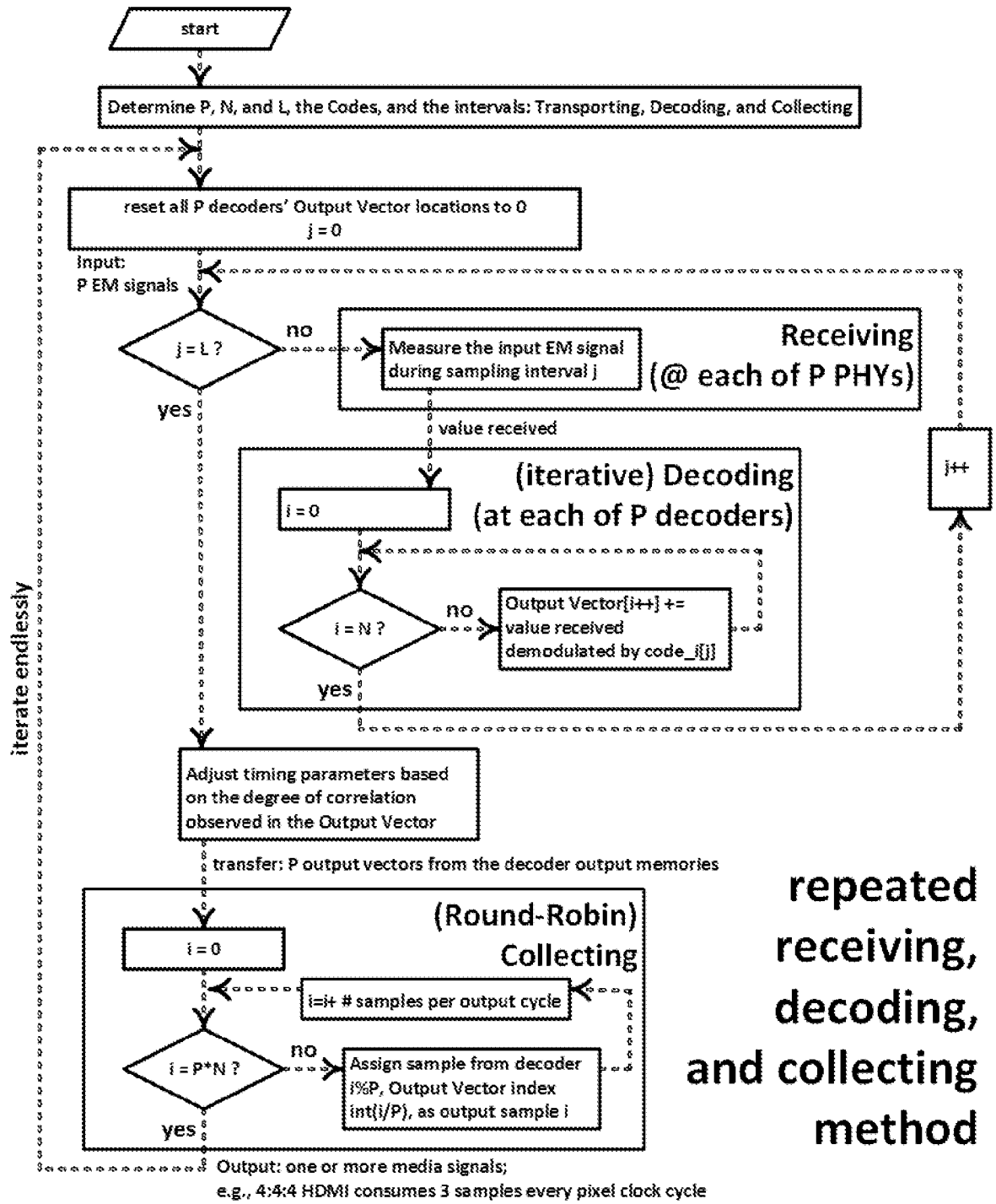

Similarly, FIG. 22 shows a flow diagram for a repeated receiving, decoding, and collecting method.

Figure 23:
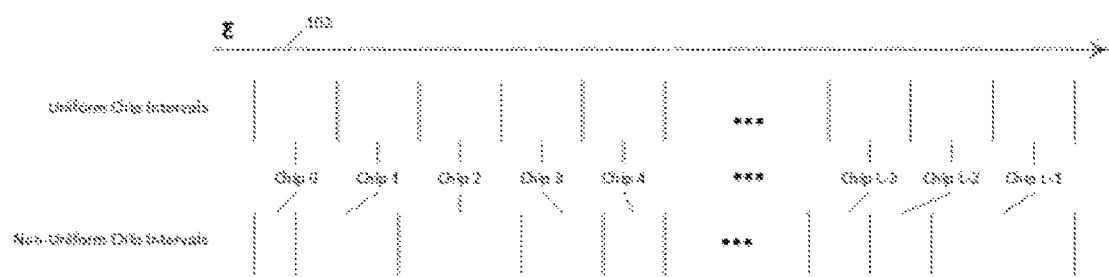

FIG. 23 shows an Example Comparing Uniform Modulating/Demodulating Intervals and Non-Uniform Modulating/Demodulating Intervals.

Figure 24:
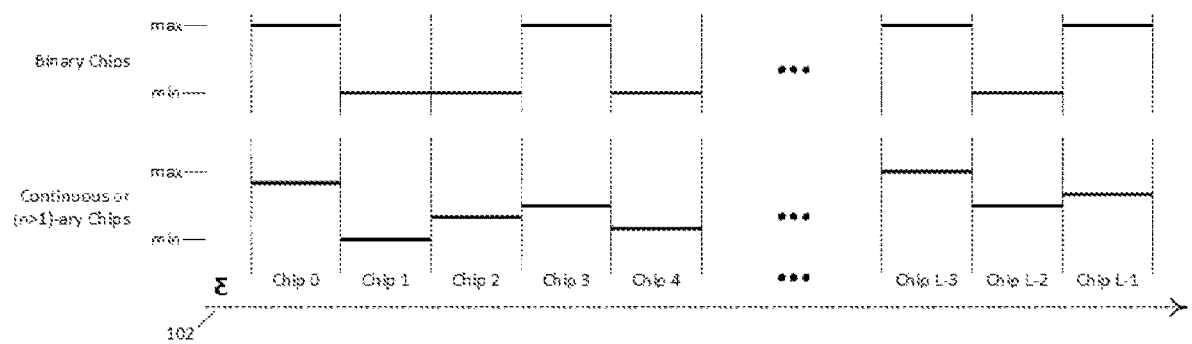

FIG. 24 shows an Example Comparing Binary Chip Values, Greater-than-Binary, and Continuous Chip Values.

Figure 25:
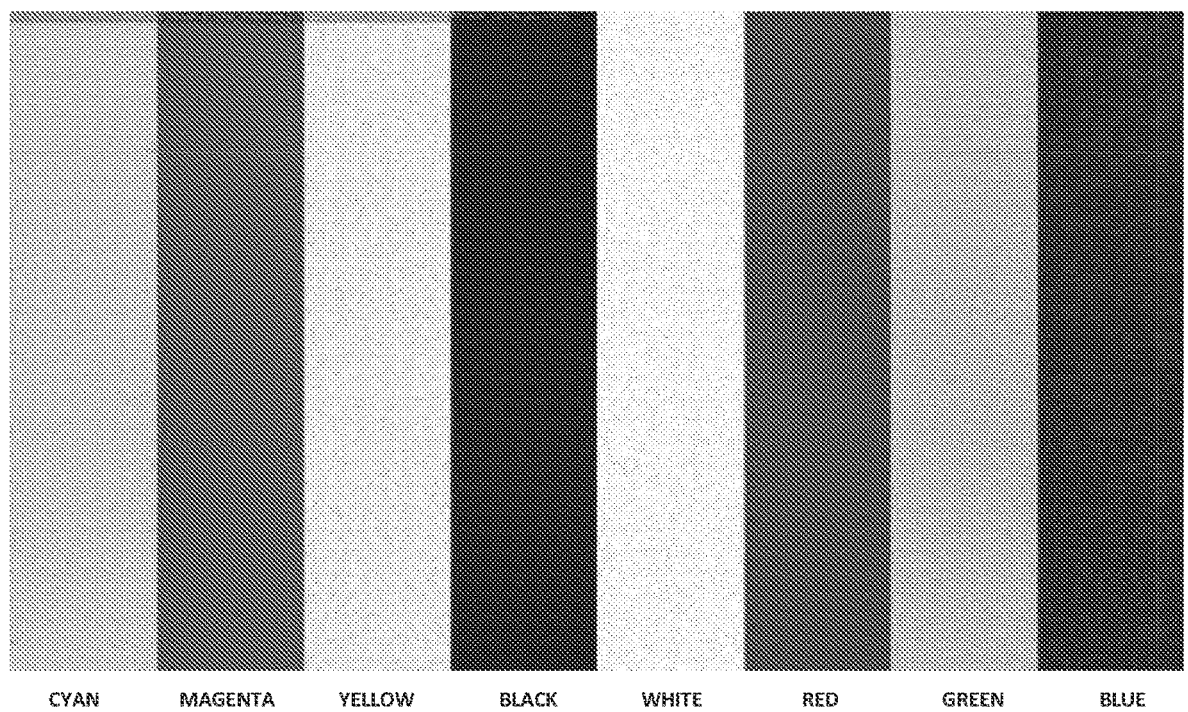

FIG. 25 shows an example of a test pattern reconstructed by a Media Transport embodiment of the methods and apparatuses disclosed herein, wherein the EM signal is conveyed through a simulated low-quality EM path (36 dB electrical SNR).

Figure 26:
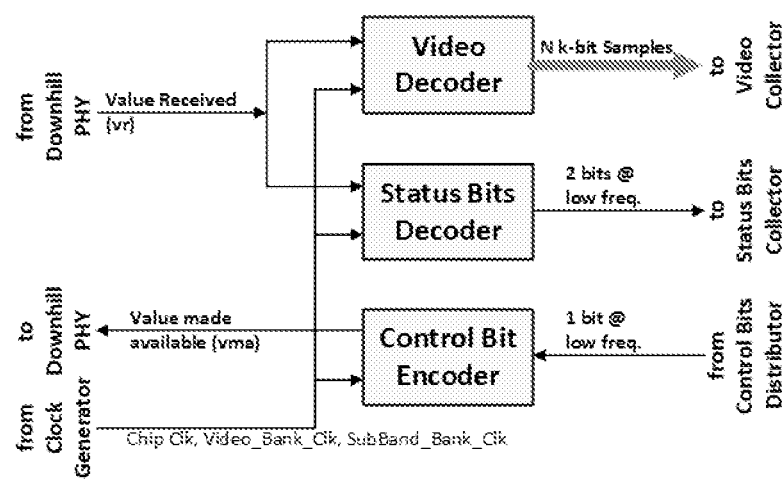

FIG. 26 shows an embodiment of the implementation of the sink assembly Downhill Transform.

Figure 3:
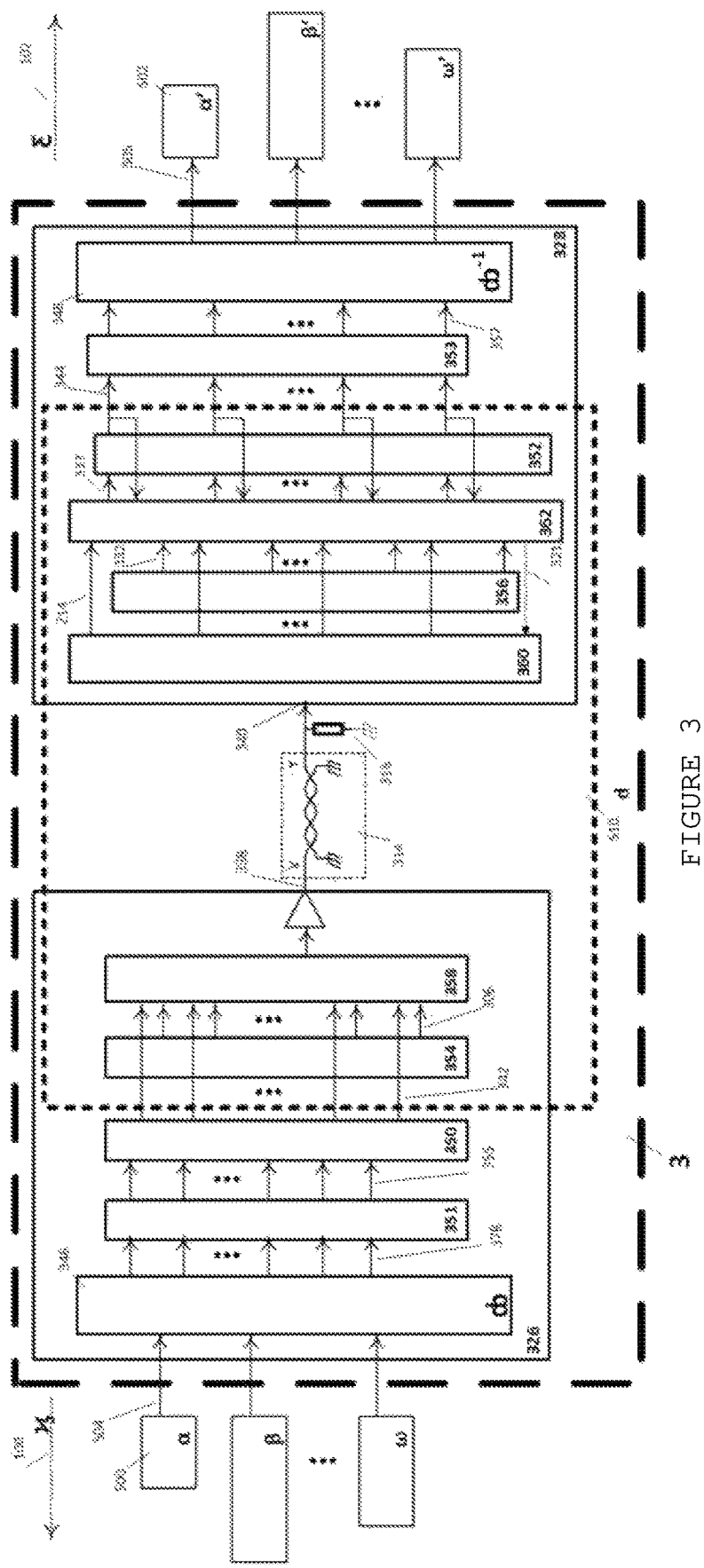
FIG. 3 illustrates a media transport system for communicating a number of input media signals as an EM signal conveyed across a single EM pathway so as to produce a matching number of output media signals.
Figure 27:
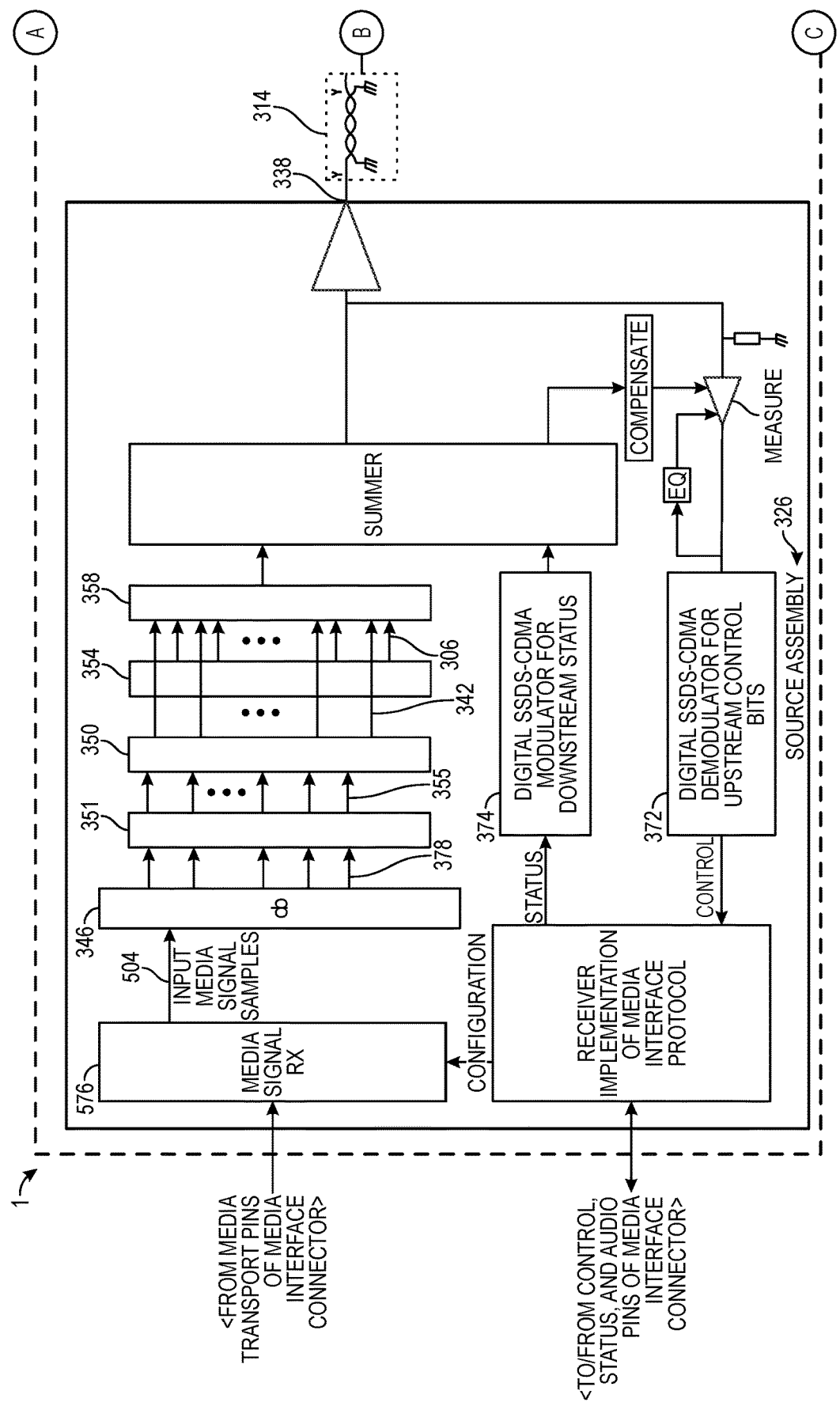
Figure 27:
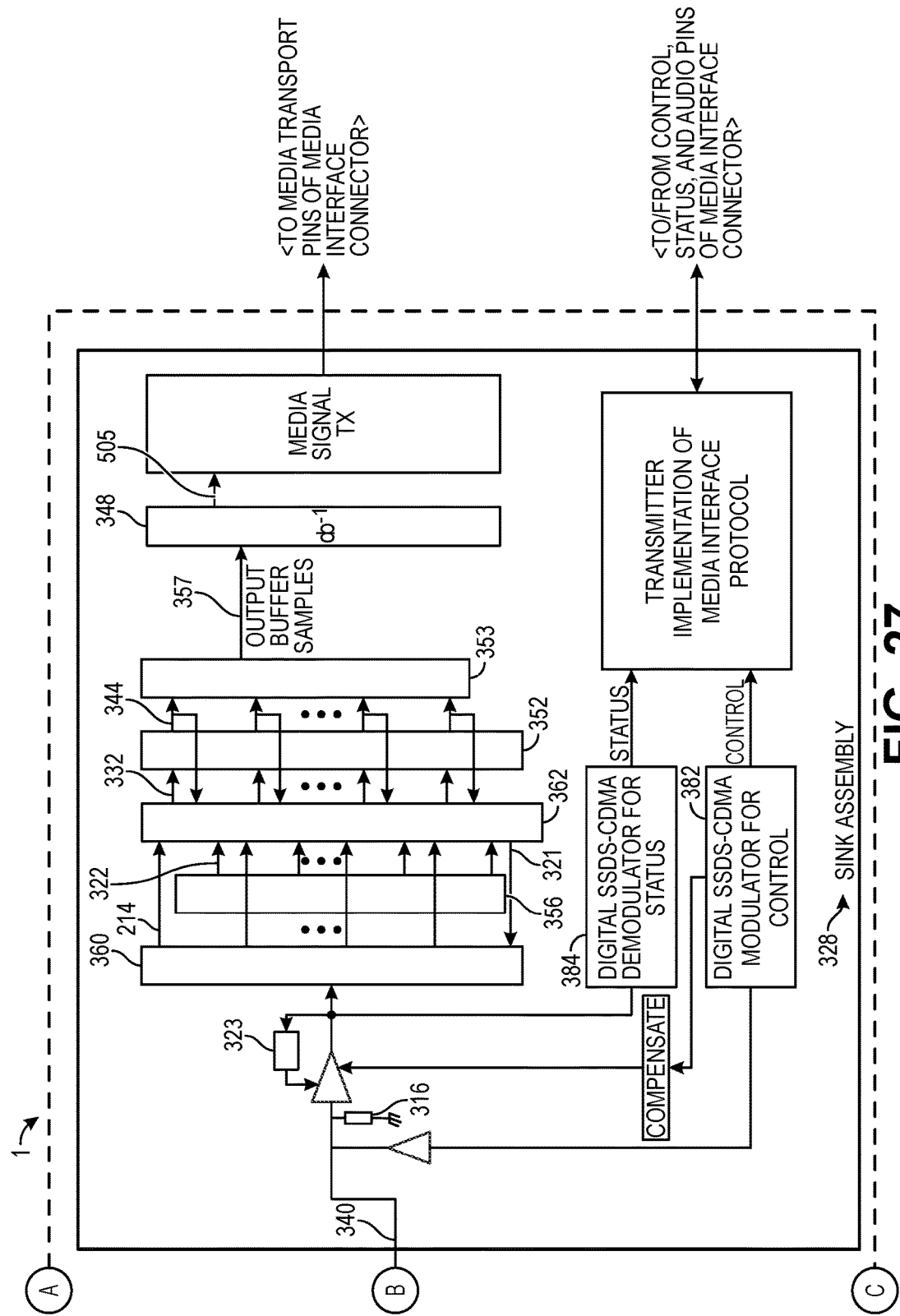

FIG. 27 shows a single-EM-pathway Media Interface implemented with the media transport system of FIG. 3, with further adaptations providing for the bi-directional exchange of control and status information.

FIG. 28 shows three alternative sets of logical pin assignments for a 19-pin HDMI connector, two of which are suitable for EM signalling according to the methods and apparatuses disclosed herein with P≥4.

Figure 29:
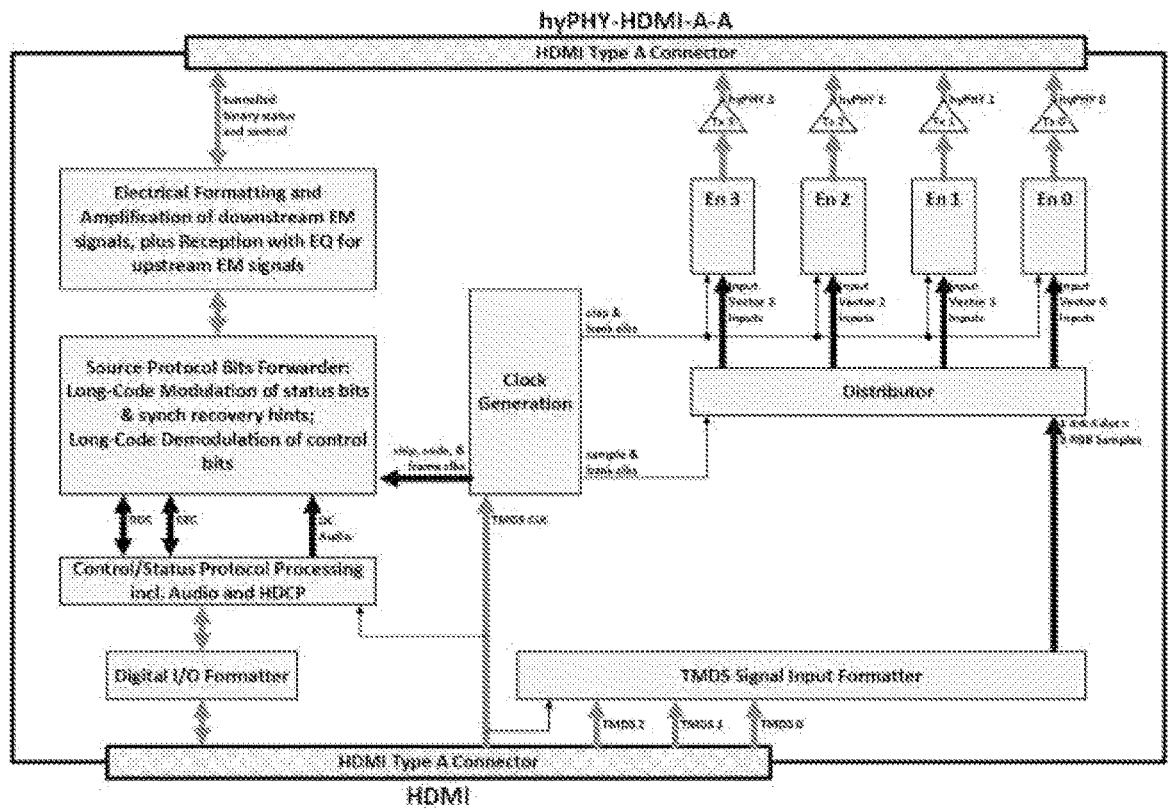

FIG. 29 shows a source HDMI-to-hyPHY transcoder assembly that receives a video signal and exchanges control and status information on an HDMI interface and exchanges EM signals representing the video signal and forwarding the control and status information over a hyPHY-HDMI-A-A interface (as defined in FIG. 28).

Figure 30:
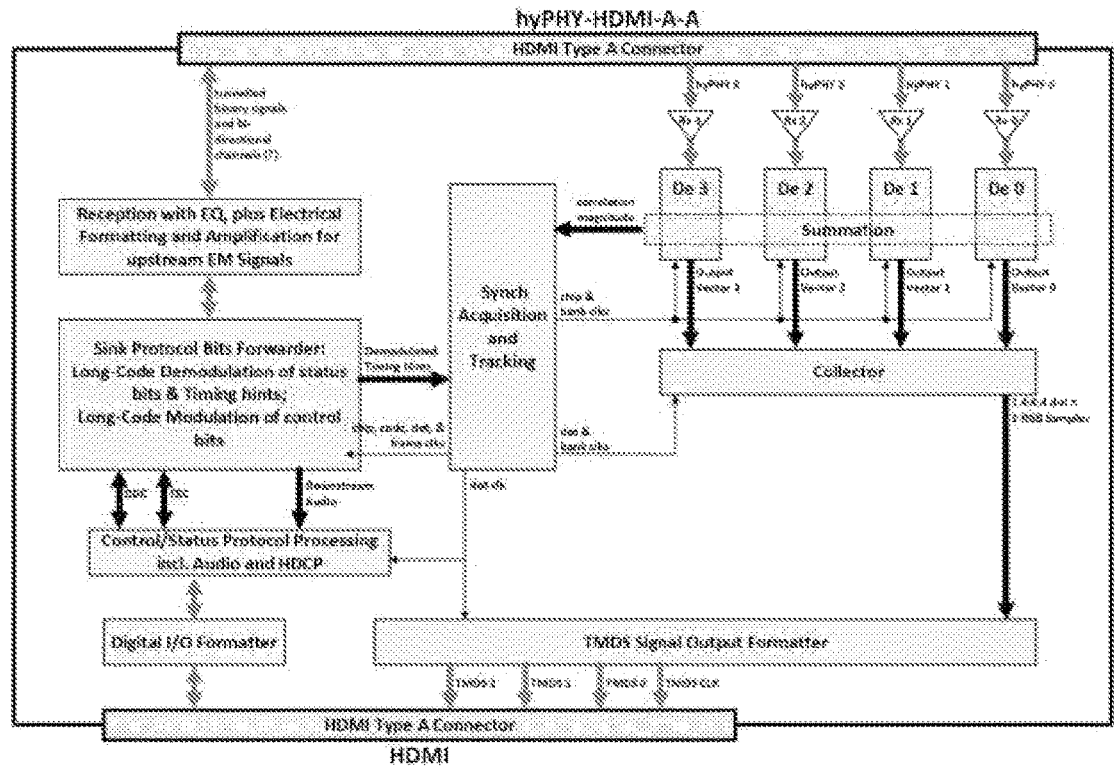

FIG. 30 shows a sink hyPHY-to-HDMI transcoder assembly that exchanges EM signals over a hyPHY-HDMI-A-A interface and transmits a reconstructed video signal and exchanges control and status information on an HDMI interface.

Figures 31, 32:
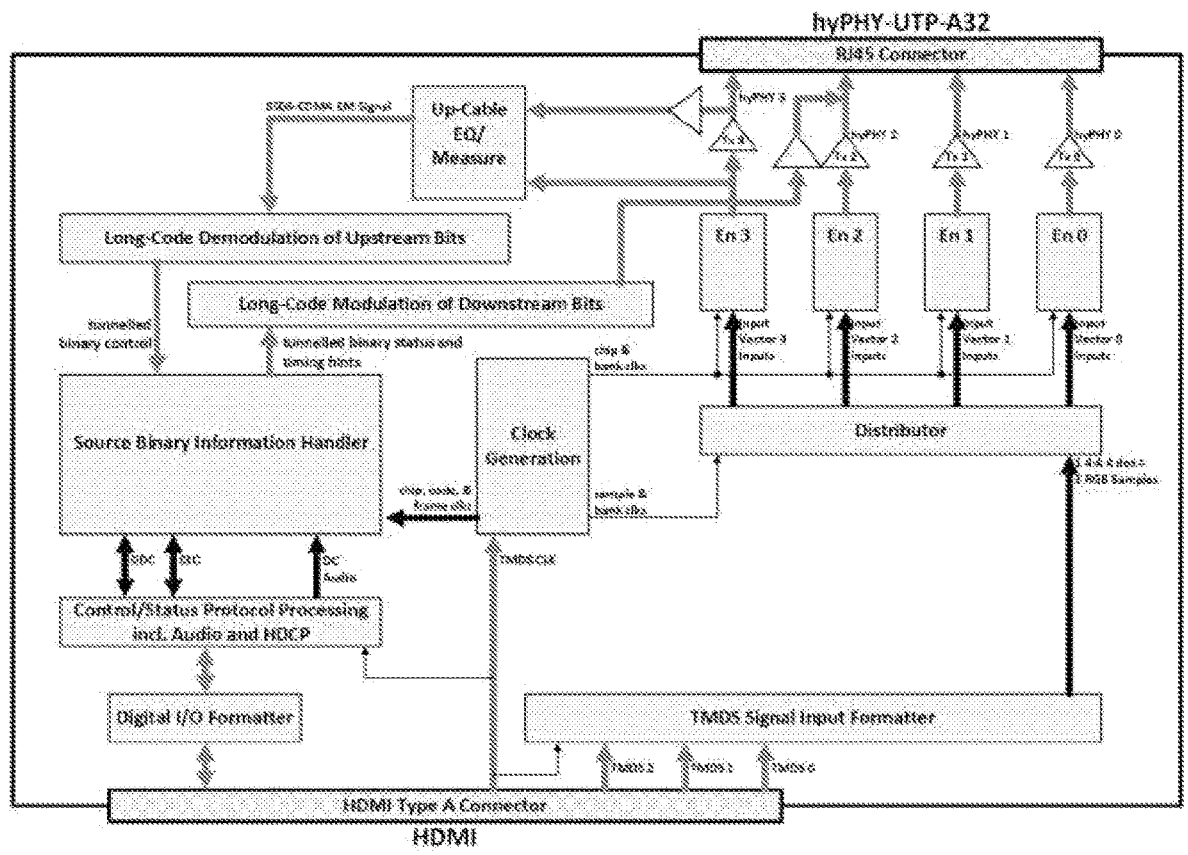

FIG. 31 shows two alternative sets of logical pin assignments for an 8P8C UTP connector that are suitable for EM signalling according to the methods and apparatuses disclosed herein with P=4.

FIG. 32 shows a source HDMI-to-hyPHY transcoder assembly that receives a video signal and exchanges control and status information on an HDMI interface and exchanges EM signals representing the video signal and forwarding the control and status information over a hyPHY-UTP-A32 interface (as defined in FIG. 31).

Figure 33:
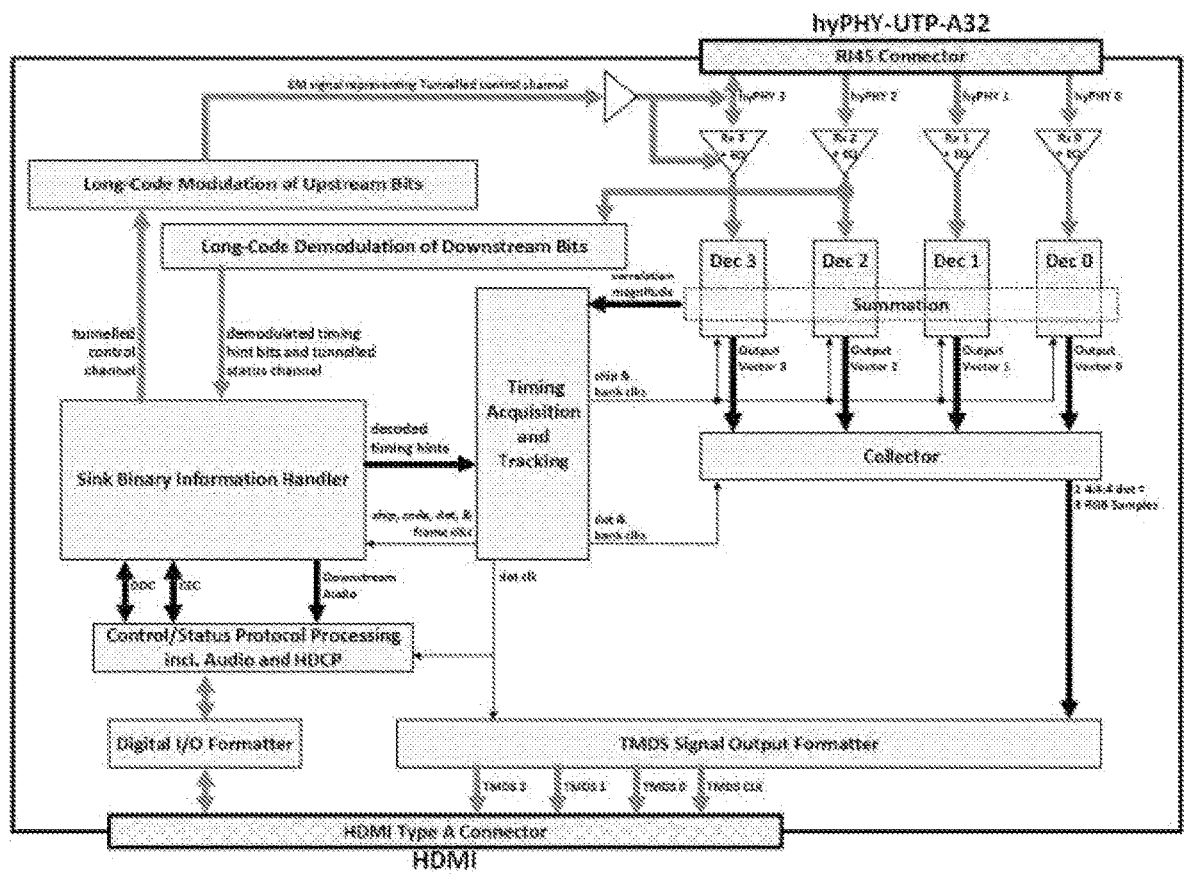

FIG. 33 shows a sink hyPHY-to-HDMI transcoder assembly that exchanges EM signals over a hyPHY-UTP-A32 interface and transmits a reconstructed video signal and exchanges control and status information on an HDMI interface.

Figure 34:
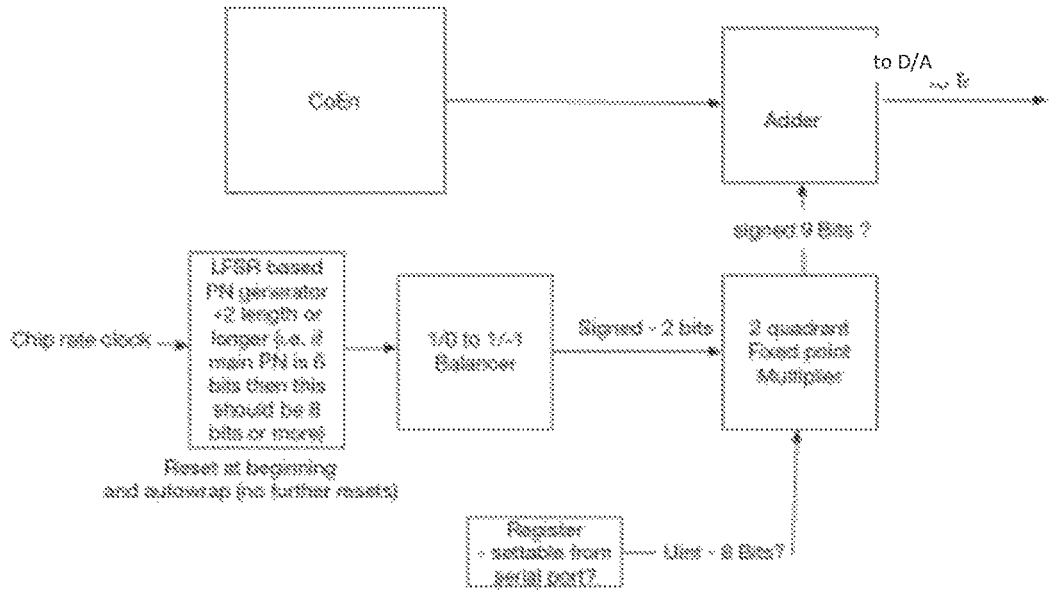

FIG. 34 shows a source assembly sub-circuit that adds an EM signal containing timing recovery information to an EM signal representing an input media signal snippet; the added EM signal facilitates synchronization acquisition and tracking in a paired sink assembly.

Figure 35:
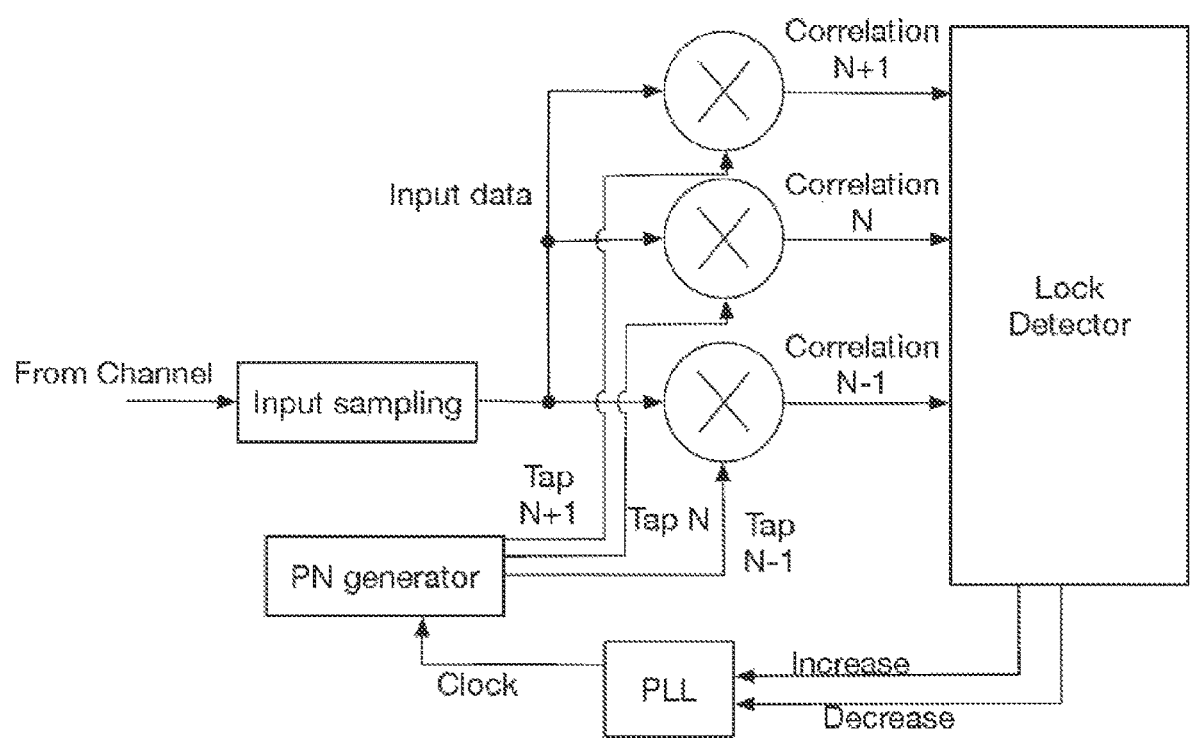

FIG. 35 shows a sink assembly sub-circuit that heuristically searches for phase and frequency lock with an incoming EM signal containing timing recovery information.

Figure 36:
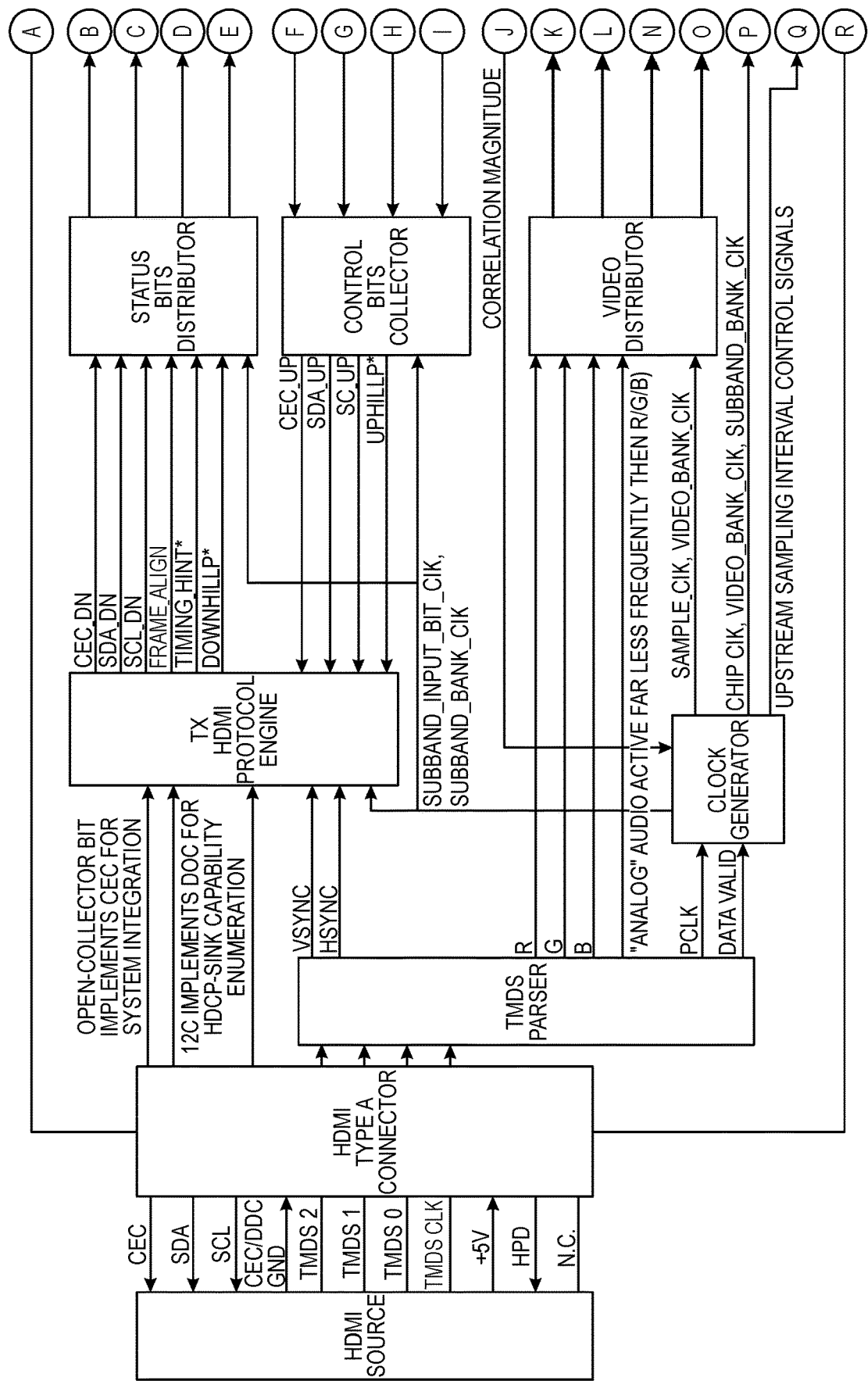
Figure 36:
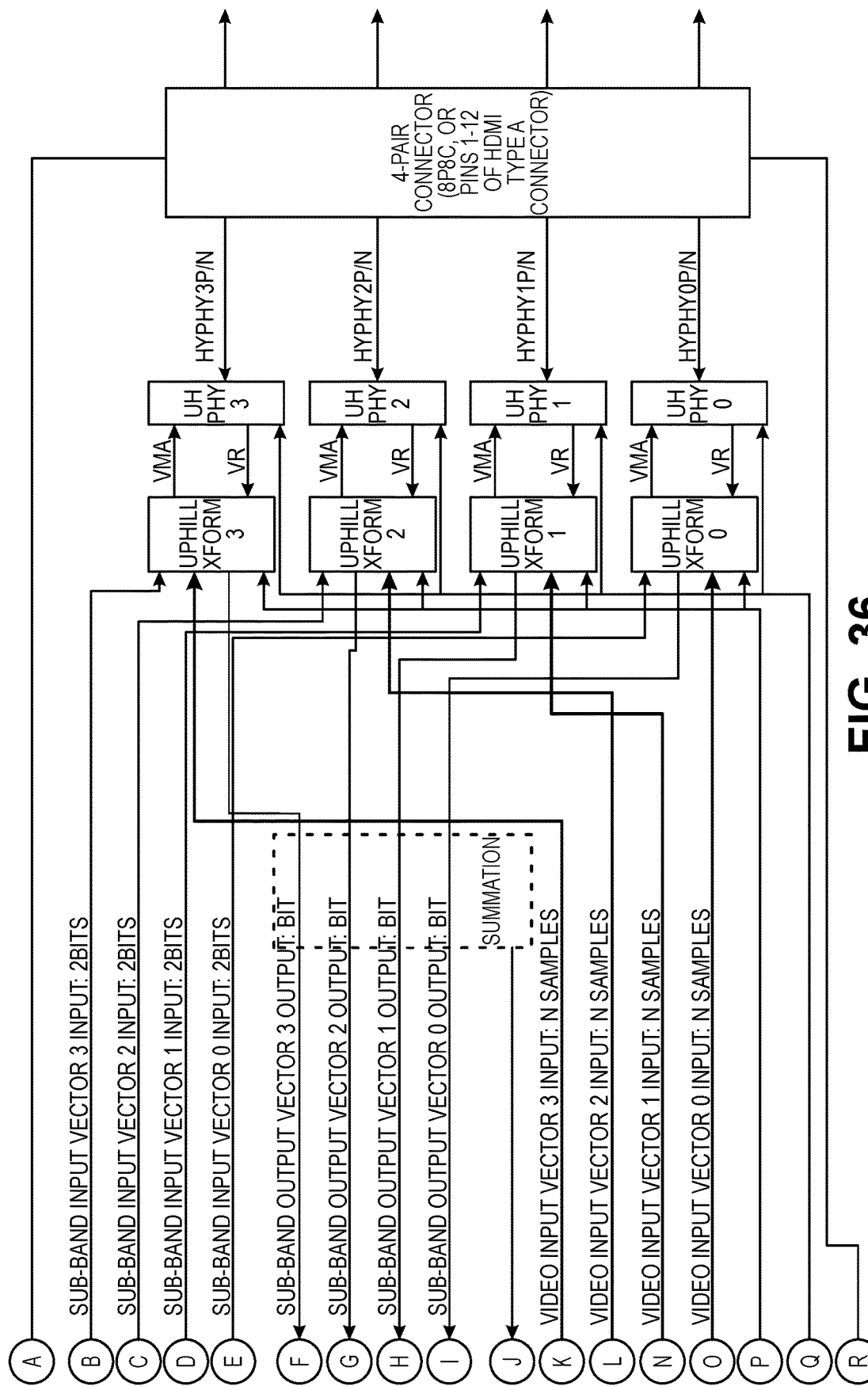

FIG. 36 shows an embodiment of a source assembly connecting an HDMI sink to a hyPHY-UTP-S source, containing an Uphill Transform and an Uphill PHY.

Figure 37:
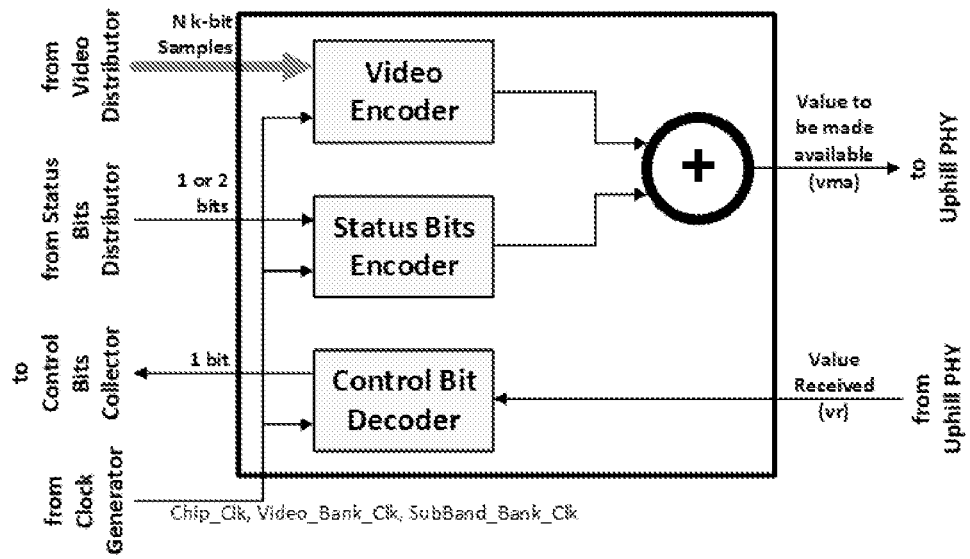

FIG. 37 shows an embodiment of a source assembly Uphill Transform.

Figure 38:
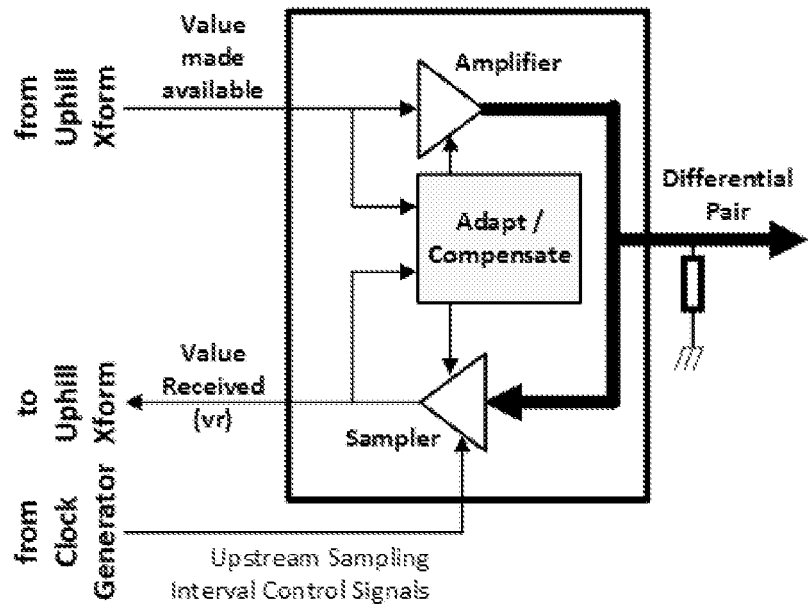

FIG. 38 shows an embodiment of the implementation of the source assembly Uphill PHY.

Figure 39:
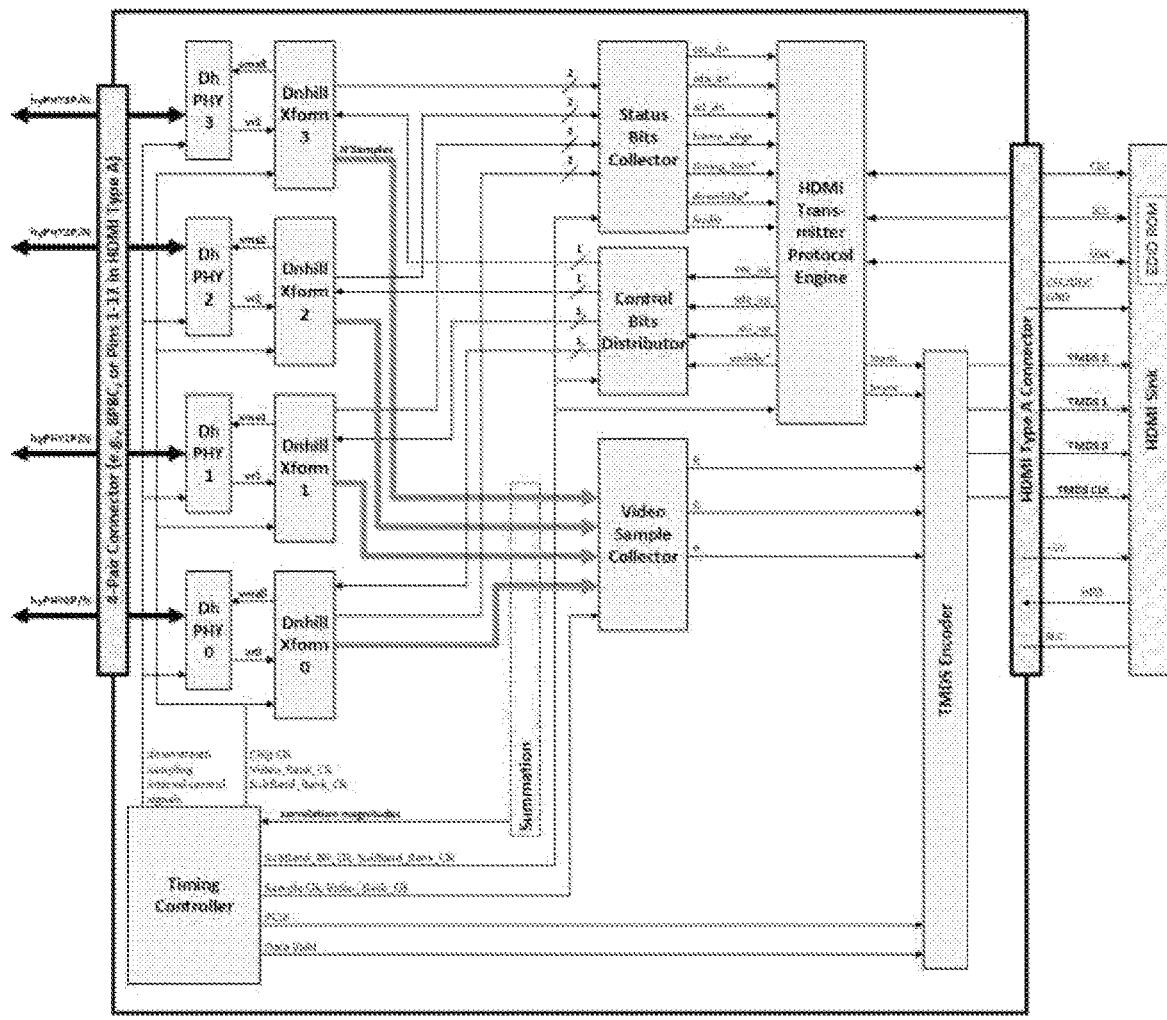

FIG. 39 shows an embodiment of a sink assembly connecting a hyPHY-UTP-S sink to an HDMI source.

Figure 40:
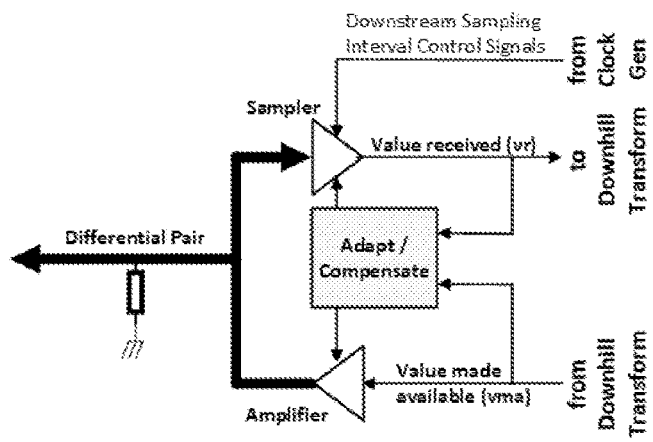

FIG. 40 shows an embodiment of a sink assembly Downhill PHY.

GLOSSARY

Terms relating to the widely understood Spread Spectrum transmission system are defined and elaborated upon in "Spread Spectrum Systems with Commercial Applications" by Robert C. Dixon, volume 3, Wiley & Sons 1994.

EM Signal A physical quantity measurable across an EM path

Visual Perception A person's subjective awareness, comprehension, or understanding of a an EM signal whose wavelength lies in the visible spectrum Media Signal sampled signal destined for human perception via some output device Media Signal Snippet A finite, ordered, contiguous series of samples from a media signal.

Media Transport method or apparatus for communicating one or more media signals over a single EM path Sink media sink equipment; the downhill side of one or more EM paths, with respect to the direction of media communication; repeatedly reconstructs output media signal snippets from input EM signals Source media source equipment; the uphill side of one or more EM paths, with respect to the direction of media communication; repeatedly encodes input media signal snippets as output EM signals Media Interface A specification for source and sink equipment for communicating media signals as EM signals; implemented with one or more instances of a media transport, plus provisions for bi-directional communication of control and status information. The media interface also specifies requirements for mechanical/electrical/logical characteristics of the connectors connecting source and sink equipment to the EM path, as well as requirements for the EM path itself.

Tunnelling The technique of conveying modest-volume, must-be-bit-accurate digital signals through the same EM path used by a media transport through SSDS-CDMA modulation with very long codes that are orthogonal to the preferred media transport code book.

Color Space An abstract mathematical model, which describes a color gamut as tuples of numbers, typically as 3 or 4 components (examples include RGB, YUV, YCbCr, and CMYK)

Color Value A signal amplitude corresponding to a basis vector in a color space.

Dot A geometric location in a 2D focal region or display region that is completely described as one Color Value. (This definition presupposes mono-layer photodiodes and photoemitters, as matches the state of the art in image sensors and displays.)

Pixel A mathematical object associated with a geometric location in a 2D region, such as an image frame; a pixel is completely described as a set of Color Values, equivalently, a vector in a color space Image A 2-dimensional array of Color Values Video A sequence of Images displayed at a predetermined frame rate which induces perception of motion and continuity in human viewers "analog" EM Signal Any measurable electromagnetic energy. Physical quantities change continuously over time, and the number of different amplitudes available is limited by our ability to measure energy. Examples of analog representations of a signal include:

Image sensor: voltage (at each "pixel" in the sensor: precharge a capacitor to a known voltage, then conditionally discharge the capacitor through a photodiode during a predetermined exposure interval; the brighter that portion of the focal area, the greater the number of photons traversing the photodiode, the greater the current in the photodiode, the lower the voltage on the capacitor after the exposure interval)

LED/LCD display: current (the brightness of each "pixel" in the display (the smallest controllable portion) is determined by a control current at any given moment)

"digital" Representation of a Signal

A number that changes at predetermined intervals. Examples of digital representations of a signal include:

PC: An R or G or B entry in a TIF file

Serial digital Interface: An ordered series of bits in a predetermined format

P Number of EM paths connecting source to sink

N Number of elements in an encoder input vector and the corresponding decoder output vector L The common number of Chips in each code, equivalently, the number of Chip intervals applied during each encoding interval or decoding interval. N can be any counting number. The bigger L is than N, the more electrical resilience is afforded to the conveyed information signal Input Vector A finite, ordered series of samples collected from input media signal snippets. The input vector comprises N values.

Output Vector A finite, ordered series of samples collected distributed to reconstructed media signal snippets. The output vector comprises N values.

EM Path A physical electromagnetic (EM) propagation pathway and its environment, through which electromagnetic energy is conveyed between terminals. Every EM path is an imperfect medium, because EM signal levels measured at a receiver terminal do not perfectly equal the EM signal levels made available at a corresponding transmitter terminal.

Waveguide An EM path that physically constrains and confines the EM signal propagation vectors.

Chip A value from a predetermined, bounded but not necessarily finite, set of possible values, that is one of the sequence of values making up a Code.

Code A pre-determined sequence of Chips. In this disclosure, L is the variable that represents the length of a code in Chips. In an aspect, the statistical/frequency characteristics of Codes are essential to an embodiment of the media signal transport disclosed herein.

Binary Code Book A Code book wherein the chips are binary, taking one of two values.

PN Sequence A Code whose output exhibits spectral characteristics similar to those of white noise. "PN" stands for "Pseudo Noise." An ideal PN Sequence's signal energy is uniform across the transmission spectrum; such that its Fourier Transform looks like a fine-tooth comb, with equal energy at every frequency. (NB: Not all Codes are PN Sequences.)

Spreading A property of individual Codes, and the effect of modulating a signal by a PN Sequence: A signal modulated by an ideal PN Sequence exhibits spectral characteristics similar to those of white noise Spreading Code PN Sequence (NB: Not all PN Sequences "spread" ideally)

Spreading Ratio
=L
=The number of successive Chips modulating each input sample
=The number of successive Chips demodulating the ordered series of received values to decode the output vector
=Spreading Factor (Dixon uses the terms "Spreading Ratio" and "Spreading Factor" interchangeably)
=SSDS process gain
=Code length
=Chip sequence length
=The number of encoder Chips modulating each sample in the input vector
=The number of decoder Chip correlations contributing to each sample in the output vector Orthogonality A property of sets of Codes ("Code Books"). A Code Book is considered orthogonal if all of its N codes are pair-wise uncorrelated and independent sequences. (An orthogonal Code Book minimize inter-track interference among N tracks.)

Walsh-Hadamard Code Set A set of PN Sequences wherein each Code constitutes an orthonormal basis vector for the L-dimensional space of Codes. For any two Codes in the set, the cross product is 0, representing nil cross-correlation. For any Code in the set, the self-product is 1, representing 100% auto-correlation.

Distributing Interval The period allocated for initializing the Input Vector with N samples collected from input media signals Encoding Interval The period allocated for modulating one set of N Input Vector samples by the L chips per code Modulating Interval The period allocated for modulating one input vector sample by a Chip in its associated Code. In a uniform sequence of modulating intervals, each modulating interval=encoding interval/L. The modulating intervals need not be uniform. The sum of the modulating intervals must not exceed the encoding interval duration.

Transport Interval The period allocated for simultaneously making available the EM signal corresponding to one set of Input Vector contents and receiving the EM signal corresponding to one set of Output Vector contents Dispatching Interval The period allocated for making available to the EM path one of the ordered series of levels corresponding to one set of Input Vector contents. The dispatching intervals need not be uniform. The sum of the dispatching intervals must not exceed the transport interval duration. In an embodiment, the dispatching intervals are varied to mitigate possible EMI/RFI issues.

Measuring Interval The period allocated for receiving one of the ordered series of levels from the EM path. The measuring intervals need not be uniform. The sum of the measuring intervals must not exceed the transport interval duration. In a preferred embodiment, each measuring interval equals the dispatching interval in the paired apparatus or method for making available.

Decoding Interval The period allocated for demodulating one ordered series of values received from the EM path by the L chips per code set to reconstruct N Output Vector samples Demodulating Interval The period allocated for demodulating one received value by a Chip in its associated Code. In a uniform sequence of demodulating intervals, each demodulating interval=decoding interval/L. The demodulating intervals need not be uniform. The sum of the demodulating intervals must no exceed the decoding interval duration.

Collecting Interval The period allocated for assigning the N Output Vector samples to output media signals.

DETAILED DESCRIPTION OF EMBODIMENTS

The embodiments provided disclose ways in which certain methods and apparatus are used and useable in a range of environments.

In an aspect, the embodiments include methods and apparatuses for communicating a video signal together with bi-directional control and status information as specified in an associated video interface through a predetermined number P of EM paths, by repeating the following three sequences of steps an unlimited number of times:

In an aspect, one independent sequence of repeated steps includes the following steps:
Distributing P*N samples from the input video signal during a predetermined distributing interval to form an N-element Input Vector in each of P encoders, one associated with each EM path;
In each of the P encoders, Encoding the Input Vector into an ordered series of L levels during a predetermined encoding interval;
Conveying each ordered series of L levels as an EM signal through the associated EM path during a predetermined transport interval, wherein the following sub-steps are performed once per Level:
Dispatching the level to a transmitting terminal during a predetermined dispatching interval,
Conveying the level through the associated EM path (more than one level may be propagating at once), and
Measuring the level at a receiving terminal during a predetermined measuring interval;
In each of P decoders, one associated with each EM path, Decoding the received ordered series of L levels during a predetermined decoding interval to form an N-sample Output Vector; and
Collecting the P*N Output Vector samples during a predetermined collecting interval as the output video signal, In an aspect, another independent sequence of repeated steps includes the following steps:
Assigning the next one or more status bits to one of the P EM paths
Encoding the status bits using any one of the many known SSDS-CDMA techniques for communicating binary signals, ensuring that the codes used are orthogonal to all codes in the media transport code book and to the codes used for control communication,
Summing the EM signal level resulting from the status bits SSDS-CDMA modulation and the EM signal level resulting from the media signal SSDS-CDMA modulation to produce an output EM signal,
Applying the ordered series of EM signal levels to the transmitter terminal,
Conveying the output EM signal via the assigned EM path,
measuring the ordered series of EM signal levels at the receiver terminal,
Correlating the received EM signal with the same codes to reconstruct the status bits, and
Interpreting some of the status bits to adjust the sink synchronization while collecting the other status bits as down-cable protocol signals per the media interface, In an aspect, another independent sequence of repeated steps includes the following steps:
Assigning the next one or more control bits to one of the P EM paths
Encoding the control bits using any one of the many known SSDS-CDMA techniques for communicating binary signals, ensuring that the codes used are orthogonal to all codes in the media transport code book and to the codes used for status communication,
Applying the ordered series of EM signal levels produced by the control bits SSDS-CDMA modulation to the receiver terminal to produce an output EM signal,
Conveying the output EM signal via the assigned EM path, contrary to the direction of media signal conveyance,
Measuring the ordered series of EM signal levels at the transmitter terminal,
Correlating the measured EM signal with the same codes to reconstruct the control bits, and
collecting the control bits as up-cable protocol signals per the media interface.

Figure 1:
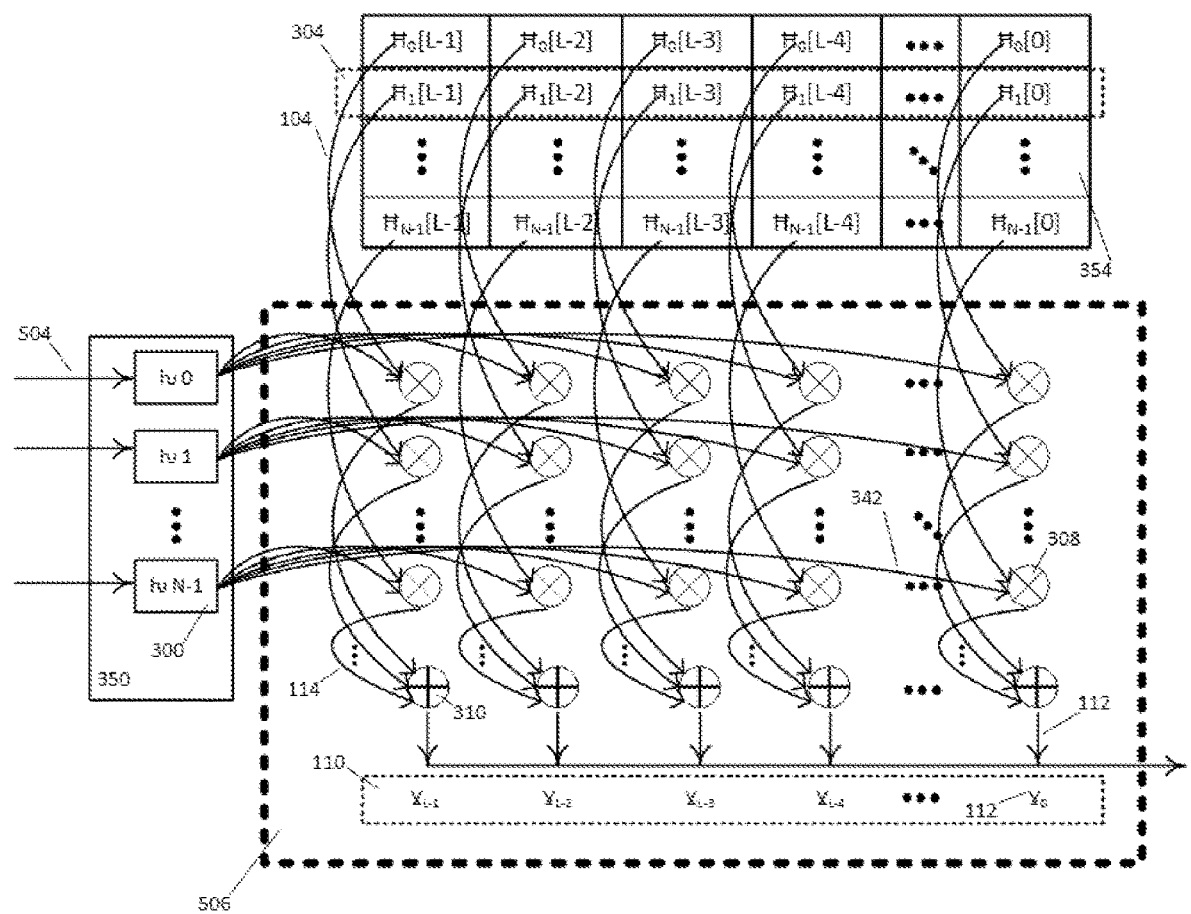
FIG. 1 depicts a method for encoding an input vector of samples as an ordered series of output levels to be made available as an EM signal for conveyance over an EM path.

An encoding process 506 embodiment is depicted in FIG. 1. The encoding process consists of a predetermined number L iterations of an arithmetic calculation shown repeated in each of the L columns of FIG. 1. The set of inputs to the encoding process is an input vector 350 containing a predetermined number N media signal samples 300. The arithmetic calculation consists of N modulator 308 operations, all of whose results are aggregated by a summer 310. Each iteration of the arithmetic calculation produces an indexed EM signal level $X_j$ 112 in an ordered series 110 of output levels for making available.

The encoding process 506 repeats a modulating step, once for each of L modulating intervals 13 and, equivalently, once for each common index in the Codes 304 of a predetermined code book 354 of indexed Chips 104. The sub-steps of the modulating step comprise but are not limited to the sub-steps of:

i) During the first part of a Modulating Interval 13, modulating 308 each input sample 300 by the commonly indexed Chip 104 in the Code 304 corresponding to the input sample's index in the input vector 350. The sum of the L Modulating Intervals must not exceed the predetermined Encoding Interval 12. In an embodiment, the Modulating Intervals are not uniform. If the input signals are pulsatile, then the samples are continuous values and an embodiment of modulation is an analog multiplication. If the Codes are binary (1/−1), then the samples are levels, and an embodiment of analog modulation is a conditional inversion. If the input signals are digital, then the samples are numbers, and an embodiment of modulation is a digital multiplier. If the Codes are binary (1/−1) and the input signals are digital, then an embodiment of the digital multiplier is a conditional negation.

ii) During the remainder of the Modulating Interval 13, summing 310 the N modulation results 114 from step i)

to form one of the ordered series 110 of output values $X_j$ 112 for making available. If the input signals are pulsatile, then the modulation results are continuous values and the summing is a summing circuit. If the input signals are digital, then the modulation results are numbers, and the summing is an adder.

By following the steps disclosed to produce one value for each code 304 index during each Modulating Interval 112 during the encoding interval 12, the ordered series 110 of values $X_j$ 112 represents the input vector 350. This process is achieved for each encoding interval, such that the encoding process 506 can be repeated for successive input vectors ad infinitum.

In a preferred embodiment of the encoding process 506 of FIG. 1, the code book 354 is a set of N mutually orthogonal L-Chip 104 Codes 304, each of which is a Spreading Code. The L indices of the Codes correspond to the L chip intervals T allocated during the encoding interval.

The ratio L/N is the "SSDS Process Gain" as defined by Dixon on p. 6. This ratio captures a trade-off wherein the electrical resilience conferred to each sample in the input vector grows with the ratio between L and N. Available implementation technology places an upper limit on L. The larger N, the higher the bandwidth of input media signals that can be accommodated. A designer is therefore motivated to make N very large. However, fixed L means that increasing N decreases the electrical resilience conferred to each sample in the input vector. In a preferred embodiment, L≥N.

The encoding process 506 of FIG. 1 repeats, during each modulating interval 13 and, equivalently, for each common index in the set Codes 354, the steps of:
i) modulating with a modulator 308 each input sample 300 by the commonly indexed Chip 104 in the Code 304 corresponding to the input sample's index in the input vector 350. If the input signals are pulsatile, then the input samples are continuous values and an embodiment of modulating is analog multiplication. If the Codes are binary (1/−1), then the input samples are levels and an embodiment of analog multiplication is conditional inversion. If the input media signals are digital, then the input samples are numbers and an embodiment of modulating is digital multiplication. If the media signal is digital and the Codes are binary (1/−1), then an embodiment of digital multiplication is conditional negation, and
ii) summing 310 the modulation results 114 from step i) to form one of the ordered series 110 of output values 112 for making available, wherein the ordered series 110 of values $X_j$ 112, one value for each code 304 index, in its entirety represents the input vector 350.

The sum of the modulating intervals 13 must not exceed the encoding interval 12. The sequence of modulating intervals need not be uniform. In an embodiment, the sequence of modulating intervals is uniform, and each modulating interval=encoding interval divided by L.

Only the signals appearing entirely within the encoding process 506 in FIG. 1 change during the process that begins with the input vector 350 and the code book 354 and produces the ordered series 110 of values $X_j$ 112.

Figure 2:
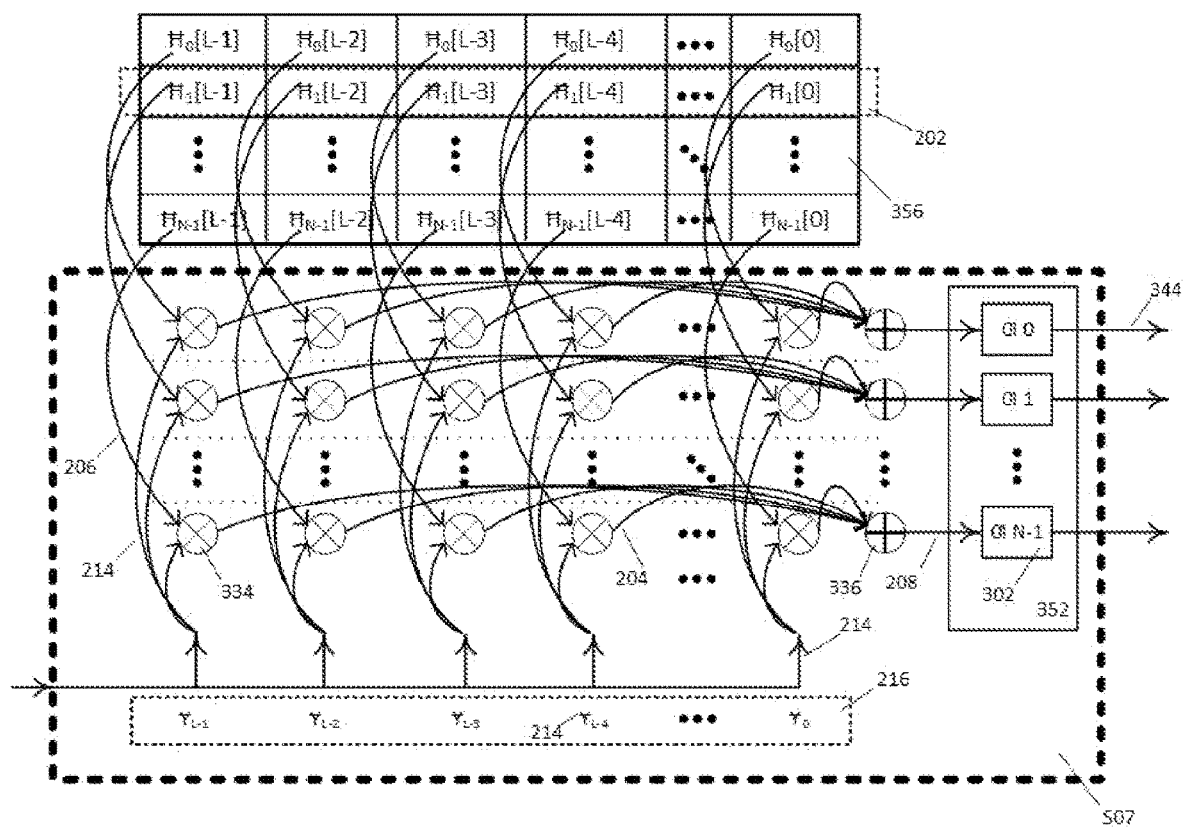
FIG. 2 depicts a method for decoding an EM signal received from an EM path as an ordered series of input levels to form an output vector of samples.

FIG. 2 depicts a decoding process 507 that is part of a receiving, decoding, and collecting method and apparatus for reconstructing output samples from an ordered series 216 of L levels 214, produced by a corresponding apparatus or method step for distributing, encoding, and making available and conveyed via an EM path. The decoding process yields an N-element output vector 352 of output samples 302 that is collected to output signals by a collecting method or apparatus. The full set of N output samples is reconstructed once per decoding interval. The decoding process repeats a demodulating step L times, each during its own predetermined demodulating interval 214, to reconstruct the output vector 352.

The demodulating intervals 15 need not be uniform. In an embodiment, the sequence of demodulating intervals is uniform and each is equal to the decoding interval 14 divided by L.

The decoding process of FIG. 2 relies on a code book 356. The code book is a set of N mutually orthogonal L-Chip 206 Codes 202, each of which should be a Spreading Code. The L indices of the Codes correspond to the L chip intervals τ allocated to receive the output vector 352.

At the beginning of the decoding process 507 (before processing $Y_0$), initialize the output vector samples 302 each to 0.

During each demodulating interval 15, the received value 214 is correlated 334 by the correspondingly indexed Chip 206 of the Code 202 whose index in the code book 356 corresponds to the index of the output value 302 in the output vector 352. If the media signals are pulsatile, then the samples are continuous values and an embodiment of correlating is analog multiplication. If the Codes are binary (1/−1), then an embodiment of analog multiplication is conditional inversion. If the media signals are digital, then the samples are numbers and an embodiment of correlating is digital multiplication. If the media signals are digital and the Codes are binary (1/−1), then an embodiment of digital multiplication is conditional negation.

All L correlation results 204 at each input vector 350 index produced during each demodulating interval 15 are summed 336 progressively over the course of the decoding interval 14 to yield the respective output sample 302.

The output vector 352 contains the reconstructed media signal samples 302 after the L demodulating intervals 15 collected to output media signal samples 344.

Only the signals appearing entirely within the decoder process 507 in FIG. 2 change during the process of decoding the output vector 352. The code book 356 remains unchanged.

Referring now to FIG. 3, wherein element 3 represents a media transport: a system for communicating one or more media signals across a single EM pathway. The system includes a source assembly 326 connected over an EM path 314 to a sink assembly 328. As explained elsewhere, the twisted-pair representation of an EM path shown in FIG. 3 is just one of a variety of physical embodiments over which the methods and apparatuses disclosed herein are applicable. The source assembly receives input media signals 500 and makes available an EM signal at the transmitting terminal 338. The EM signal propagates through the EM path. In an embodiment, the EM path is a waveguide, enabling the maximum amount of energy to be conveyed. The sink assembly receives the EM signal at a receiving terminal 340 as a series of input levels and collects reconstructed samples to output media signals 502.

The source assembly encoder 358 consumes an input vector 350 of input samples 504 and produces an ordered series of levels made available at terminal 338 as an EM signal. The sink assembly measures an EM signal at the receiving terminal and produces an output vector 352 of reconstructed samples 344, each of which approximates its corresponding input media signal sample such that the output media signal produced after large numbers of iterations of the process represents the corresponding input media signal. In a preferred embodiment, the encoding, making available, receiving and decoding intervals are common, together operating in the high-speed operation domain 510.

An encoder input vector 350 is collected from successive samples 504 from each of one or more input media signals 500 during a distributing interval 100 according to the distributing permutation (an arbitrary, pre-determined bijective distributing mapping function) 346. The corresponding output media signals 502 are collected during a collecting interval 102 from the decoder output vector 352 by the collecting permutation (a bijective collecting mapping function 348. In a preferred embodiment, the collecting permutation is the inverse of the corresponding distributing permutation.

The source assembly 326 transforms the encoder input vector 350 into a series of levels dispatched to the EM path 314 and measured by the sink assembly 328. The EM path connects the source assembly output transmitting terminal 338 to the sink assembly input receiving terminal 340. An impedance 316 terminates the EM path at the receiving terminal. The sink assembly measures the propagated signal at the receiving terminal and decodes the sequence of received levels into the decoder output vector 352.

The video transport 3 shown in FIG. 3 is capable of injecting relatively large amounts of mains-supplied energy into the EM path 314. In an embodiment, the EM path is a waveguide.

Without loss of generality, it is apparent to one skilled in the art that while the media transport 3 is described as communicating sampled input media signals from source assembly 326 to sink assembly 328 that information may also flow in the opposite direction over the EM path 314 with the implementation of a secondary decoder parallel to primary encoder 326 and attached to the transmission medium at 338 receiving information from a secondary encoder block parallel to primary decoder 328 and driving the line at 340 to implement bi-directional communication. The payload in either direction is any kind of sampled signal, either digital or pulsatile. The primary distinction of primary vs. secondary encoder/decoder is a distinction in the amount of information being communicated. The lower-volume, and therefore secondary, information flow being for example command and control signals, or audio signals carrying microphone measurements or driving speaker deflections or connecting similar apparatus. This capability is known as upstream communications. The amount of information in upstream communications is orders of magnitude lower than the amount of information in a media signal. With the use of a separate code sequence for the upstream communications the information in the form of digital or pulsatile signals may flow in the opposite direction, such separate code sequence being orthogonal to the primary code sequences.

FIG. 4 illustrates one of the N! possible permutations of the distributing permuter 346 between input media signal 500 samples 504 and distributing permuter input buffer 351 locations 301. This schema allows for any number of input media signals in the list implied by the ellipses between β and ω on the left-hand side of the drawing, and for each input media signal to contribute any number of samples from its snippet to the input vector during each distributing interval 100.

FIG. 4 shows a straightforward round-robin permutation performed within the distributing permuter 346, wherein a next sample 504 from each input media signal snippet 500 indicated in the embodiment as consisting of media signal snippets α, β, . . . , ω is assigned in turn to the next available index in the distributing permuter input buffer 351, until all N distributing permuter input buffer locations 301 have been filled. The numbered circles indicate the order in which the input media signal snippet samples are selected in this embodiment for including in the encoder input vector. Exactly N samples are collected during the distributing interval.

Although there are N! equally good choices for permutation implemented by the distributing permuter 346, the collecting permuter 348 (of FIGS. 12, 13, and 14) implements the inverse of the permutation implemented by the corresponding distributing permuter. Ensuring agreement regarding such details is the subject of Media Interface standards, for future implementation.

The schema drawn in FIG. 4 applies to many possible types of sampled signal. For example, there could be a single media signal, consisting of a representation of video wherein each successive sample is a color value (for example, 3 (R/G/B) per pixel). Another example is also a single media signal consisting of color values from several interleaved independent video signals. Further examples include diverse types of media signal, for example, video, audio, chemical, mechanical/haptic, and so forth. An embodiment of one such hybrid example includes different numbers of samples from/to each media signal during each transport interval. Further examples include each of the four types of signal (digital, analog, pulsatile, and neural) solo or in concert.

The schema of FIG. 4 highlights that the input vector 350 contents are chosen in a pre-determined sequence from a set of input media signal snippets. This means that the scheme is fully general, because any sequence of samples is itself a sampled signal. From the point of view of media transport, it makes no difference from whence the input media signal samples are collected or to where the reconstructed media signal samples are distributed.

The permuter 346 in FIG. 4 can be implemented in many ways; one example is to read the outputs 378 from a port, another alternative is to read the outputs from a memory which has been initialized to with the input samples 504 in sequence.

FIG. 5 illustrates an especially common special case of the distributing permutation described in FIG. 4. In this example, the three input signals 500 represent the three R, G, and B color planes, respectively, of a 4:4:4 video signal. N, the number of elements in the encoder input vector 350, happens to be 8 in this example. This example shows the round-robin assignment during one distributing interval.

Further to the example begun in FIG. 5 and consistent with repeatedly communicating media signal snippets, FIG. 6 illustrates round-robin assignment during the transmission of a second distributing interval.

Referring now to FIG. 7, a source assembly 326 receives input media signal samples 504 from one or more input media signals 500. The distributing permuter 346 initializes the input vector 350 via the distributing permuter input buffers 351. The encoder 358 produces an ordered series of levels that is made available as an EM signal by line driver 312 at transmitting terminal 338, connected to an EM path 314. As explained elsewhere, the twisted-pair representation of an EM path shown in FIG. 7 is just one of a variety of physical embodiments over which the methods and apparatuses disclosed herein are applicable. The source assembly includes an distributing permuter buffer memory 351 for receiving and storing permuted input samples, an input sample memory 350 for receiving a set of samples concurrently and supplying the samples for encoding during a predetermined encoding interval, and a Code Book memory 354 for receiving and storing a predetermined code set. One Code 304 in the Code Book memory is associated with each input sample 300 in the input vector.

The source assembly 326 data path embodiment shown in FIG. 7 features a plurality of modulators 308, one per input sample 300, which is re-used repeatedly, once per modulating interval. During each modulating interval, each modulator applies the commonly indexed Chip 306 in the corresponding code to modulate the corresponding input sample, and the summing circuit 310 sums all modulator outputs 508 to produce a next level to be made available by the line driver 312 via the output terminal 338 to the EM path 314. In an embodiment, the EM path is a waveguide, enabling the maximum amount of energy to be conveyed.

If the input media signal 500 is pulsatile, then the input samples 301 are continuous values and an embodiment of the modulator 308 is an analog multiplier. If the Codes 330 are binary (1/–1) in this case, then an embodiment of the analog modulator is a conditional inverter. If the media signal is digital, then the samples are numbers and an embodiment of the modulator is a digital multiplier. If the Codes are binary (1/–1) in this case, then an embodiment of the digital multiplier is a conditional negator.

An application media signal 500 of longer duration than a single collecting interval 100 is encoded over the course of several collecting intervals and thus over the course of a corresponding number of encoding intervals 12 as well as a corresponding number of transport intervals 2. In a preferred embodiment, the parameters defining the source assembly 326, including collecting interval, encoding interval, transport interval, N 8, L 10, code book 354, and distributing permuter 346 permutation all remain constant throughout the steps involved in the processing of one set of input media signal samples 504 corresponding to a single set of input vector 350 contents, to facilitate timing acquisition and tracking in a paired receiver assembly.

In one embodiment of the source assembly, all the encoding parameters are "hard coded" and cannot be changed. Because the encoding of one input vector is logically independent from the encodings of all previous input vectors and of all successive input vectors, the encoding parameters may change from one input vector's worth of media signal samples to the next. Therefore, in a further embodiment of the source assembly, any of the encoding parameters may be varied from one collecting interval to the next under algorithmic control, for example in response to changes in media signal characteristics, EM path 314 characteristics, and/or application requirements.

For a digital embodiment of the encoder modulator 308 wherein the encoder Chips 306 happen to be constrained to be binary (for example, 1 and 0), one embodiment of the modulator comprises a combinatorial circuit that inverts the signed integer representation of each input sample 342. A corresponding embodiment of the line driver 312 effects a digital to analog conversion.

For an analog embodiment of the encoder modulator 308 wherein the encoder Chips 306 happen to be constrained to be binary (for example, 1 and –1), one modulator embodiment comprises a commutating modulator, such as the example shown in FIG. 8.

The example modulator 308 shown in FIG. 8 applies the Chip input 104 to the corresponding input sample 342 to produce modulated output signal 508. This style of modulator, known as a commutating modulator, inverts the input sample 342 based upon the polarity of the Chip input 104. Coupled inductors 606 and 608 impose a galvanically isolated copy of the input sample 342 across commutation diodes 612 and 610 relative to a center tap connected to signal 602, each of diodes 612 and 610 conduct in turn based upon the polarity of bias imposed by signal 626. The Chip input 104 imposes a differential signal to the center tap of inductor 608, and one of the terminals of inductor 608 through signal 628. In one of the two differential polarities of Chip input 104, current flows through inductor 622 to signal 626, then through forward biased diode 612 into inductor 608, out of the center tap of inductor 608 onto signal 602, through inductor 616 to complete the current loop, according to Kirchhoff's circuital laws. On the opposite polarity of Chip input 104, current flows through inductor 616 to signal 602 and thereby onto the center tap of inductor 608. The signal emerges from inductor 608 and flows through forward biased diode 610 and onto signal 626, whereupon the current travels back through inductor 622 thus again completing the current loop according to Kirchhoff's circuital laws. It should be noted that the circuit direction in these two cases flows in opposite directions. Capacitors 618 and 620 are DC removal capacitors that ensure that the direction of current flow in signal 628 is converted correctly to a positive or negative polarity and biases the inductor 608 accordingly. Input sample 342 is coupled onto the above mentioned biasing signal flows. This coupled signal then flows out of coupled inductor 608 and through one of two established paths originating from the center tap 602 and exiting from one or the other of the terminals of inductor 608, there by establishing positive and negative signal representation through polarity of biasing signal imposed on 626. Capacitor 614 is a DC blocking capacitor that removes DC components from modulated output signal 508.

Referring now to FIG. 9, a single-EM-path sink assembly 328 receives a signal from one EM path 314 at its input terminal 340. As explained elsewhere, the twisted-pair representation of an EM path shown in FIG. 9 is just one of a variety of physical embodiments over which the methods and apparatuses disclosed herein are applicable. In an embodiment, the EM path is a waveguide, enabling the maximum amount of energy to be conveyed. The EM path is terminated by terminating impedance 316. The signal entering the sink assembly is measured by line amplifier 322, which is controlled through a feedback path by an equalizer 324, whose sampling aperture is adjusted by clock recovery circuit 318.

In a preferred embodiment, the parameters defining the sink assembly 328 operation, including transport interval, decoding interval, collecting interval, N 8, L 10, code book 356, and collecting permuter 348 permutation all remain constant throughout the steps involved in reconstructing one set of N output media signal samples 357 in the output memory 352. In one embodiment of the sink assembly, all the decoding parameters are "hard coded" and cannot be changed. However, the decoding of one output vector is logically independent from the decoding of all previous and of all following output vectors. Therefore, in a further embodiment the decoding parameters do change from one output vector's worth of reconstructed media signal samples to the next. In a further embodiment of the sink assembly, any of the decoding parameters may be varied from one collecting interval to the next under algorithmic control, for example in response to changes in media signal characteristics, EM path 314 characteristics, and/or application requirements. In a further embodiment of the sink assembly, the predetermined individual measuring intervals and demodulating intervals are not uniform.

In a further embodiment of an analog version of the sink assembly 328, the analog portion can be implemented as a switched capacitor circuit. Given that the operation of this circuit will entail the use of sample and hold circuits, multiplier circuits and a pipeline type operation, it should be obvious to those skilled in the art the similarities to state-of-the-art ADC design. Indeed, one such implementation of the analog sink assembly allows for accommodating any amplitude representation, from binary through n-ary to continuous, through the simple selection of thresholding levels in the pipeline operation of the sink assembly. In an embodiment, a sink assembly is design parametrically reconfigurable to accommodate either digital signals or pulsatile signals, thereby enabling system flexibility.

The output vector 352 is reconstructed by the decoder 512 from the ordered series of received levels 214 over the course of the decoding interval by accumulating partial contributions in the storage elements 302 during each demodulating interval of the decoding process (507 in FIG. 2). For each output vector location, the embodiment of the sink assembly 328 shown in FIG. 9 associates one Code 330 at a corresponding index in the Code Book memory 356, one correlator 334, and one integrator 336.

The decoding controller 507 carries out the following process: Before beginning to decode an ordered series of received values, the output vector 352 entries 302 are cleared (by storing the value 0 in each). Subsequently, during each predetermined demodulating interval for each successive output vector index, directing the correlator 334 to correlate the received value 214 produced by line amplifier 322 with the correspondingly indexed Chip 332, and gather using the summing circuit 336 the correlation result 321 with the contents of the corresponding output sample memory 352. Store the summing circuit result in each demodulating interval into the output sample memory, for reference in the successive demodulating interval.

For a digital embodiment of the decoder 512 wherein the Chips 332 happen to be constrained to be binary (for example, 1 and 0), one embodiment of a correlator 334 comprises a combinatorial circuit that inverts the signed integer representation of each received value 342 according to the Chip. A corresponding embodiment of the line driver 312 effects a digital to analog conversion.

For an analog embodiment of the decoder 512 wherein the Chips happen to be constrained to be binary (for example, 1 and −1), a correlator might consist of an analog modulator, such as the example shown in FIG. 8.

The output of each correlator 334 is integrated, together with the contents of its corresponding output sample memory 302, by the corresponding integrator 336. For a digital embodiment of the decoder 512, the integrator might be a straightforward combinatorial adder. For an analog embodiment of the decoder, one embodiment of an integrator comprises an op-amp-based integrator.

If the reconstructed media signal 502 is pulsatile, then the output samples 302 are continuous values and an embodiment of the correlator 334 is an analog multiplier. If the Codes 332 are binary (1/−1) in this case, then an embodiment of the analog correlator is a conditional inverter. If the media signals are digital, then the samples are numbers and an embodiment of the correlator is a digital multiplier. If the Codes are binary (1/−1) in this case, then an embodiment of the digital correlator is a conditional negater.

Repetition of the process provides the sink assembly the opportunity to acquire and track synchronization. The correlation spike detector 320 monitors the outputs of the array of decoder correlators 334. In one embodiment, all sink assembly 328 functional elements are synchronized by a clock recovery circuit 318, which monitors the output 214 of the line amplifier 322 as well as the output of the correlation spike detector to acquire and track carrier synchronization.

There is an additional benefit arising from the fact that the modulation/making available intervals in the source assembly and the measuring/demodulation intervals during the transport interval are controlled by crystal oscillators or other accurate time sources in an embodiment. The difference in the fundamental accurate time source frequencies between source assembly and sink assembly will be on the order of only hundreds of parts per million, given the performance specifications of known accurate time sources. Another consideration in favour of simplicity and, therefore, low implementation cost is that the sequence lengths of the pseudo noise generation circuits are not overly large, inasmuch that the values for L are not very large.

The encoding/decoding process admits aforementioned simplifications, allowing us to forego a lengthy initial timing acquisition procedure. The sink assembly measuring/demodulating interval will be running close to the source assembly modulating/dispatching interval, and the relative phase of the PN generator in the receiver (i.e., the index within the code book) is readily acquired on this basis. In an embodiment, the circuit implemented is simply a tracking system that acquires the relative phase of the receiver in respect to the transmitter with a slight variation on the ability to change frequency to match frequency of the source assembly.

The synchronization acquisition system can be described as a sliding correlator that takes as inputs the received signal from the media as well as output from a PN generator that is local to the receiver. The local PN generator is driven from a PLL or phase lock loop which has a narrow band of frequency diversity, i.e. it natively will run at close to the target frequency and has a band of control around that center frequency. The output from the sliding correlator is analyzed to determine whether or not a lock condition has been achieved or if the frequency is either too high or too low, this lock detector then drives a PLL to either speed up or slow down first to stay the same in a feedback loop.

The sliding correlator architecture can be implemented as either a sampled and digitized representation of the incoming signal in which case the correlation is formed in digital logic. Another implementation of the sliding correlator can be as switched analog circuitry, in which in this case the incoming signal is sampled analog and the correlation is performed in switched capacitor circuitry.

One classical technique in the acquisition process would be to have coarse phase alignment accomplished through searching through the various taps or delays of the receiver assembly PN generator and subtle phase frequency alignment being accomplished to the PLL. However, in an embodiment of the system, the time required to search through all of the available taps in the PN sequence generator is relatively short. Classically one might search amongst the various taps of the PN generator to find a correlation spike that is relatively close and then fine-tune this correlation by changing the frequency of the PLL. Through this it becomes possible to accomplish both coarse and fine adjustments. Because an embodiment of the system is relatively unconstrained, it becomes possible simply to slide the phase by changing the frequency and accomplishing both the coarse and the fine adjustments through the changing of the PLL.

A further embodiment allows the transmitter to send a training sequence that has predetermined characteristics to facilitate synchronization acquisition and tracking. This training sequence may occur at the beginning of every grouping of data video data or it may exist as a sub band, i.e. modulated by a further code orthogonal to all the codes in the code book applied to the media signal snippets and transmitted at the same time, continuously. The independent training sequence, or sub-band, serves as a probe of the EM characteristics of the EM path, which may in turn be referenced for parametric tuning of signal correction circuits, such as pre-emphasis. Henceforth this signal is referred to as the "probe signal" without loss of generality. This probe signal may be held constant over k transport intervals, for some predetermined k, and its associated code made k*L chips long. As with the media signal samples in the input vector, this probe signal may be implemented either with discrete (digital) or with continuous (pulsatile) representations. This approach enhances the resilience of the probe track to noise, interference, and reflections. In this application, the probe signal is particularly powerful in facilitating acquisition and tracking because the probe signal can be made to have a constant amplitude that allows channel attenuation to be measured directly.

FIG. 10 shows the architecture of an embodiment of one synchronization acquisition and tracking circuit, which can be described as a sliding correlator. The key input is the received signal 214, and the key output is the clock signal 826. The circuit in FIG. 10 comprises a PN generator 814, clocked by a phase-locked loop (PLL) 810, which is adjusted finely by the correlation peak detector 320. The PN generator is designed to have a narrow band of frequency diversity, i.e. it natively will run at close to the target frequency and has a band of control around that center frequency. The output 824 from the sliding correlator is analyzed in the correlation peak detector to determine whether a lock condition has been achieved or if the frequency is either too high or too low. This lock detector then adjusts the PLL frequency to servo on synchronization.

The sliding correlator architecture shown in FIG. 10 can be implemented as either a sampled and digitized representation of the incoming signal in which case the correlation is formed in digital logic. Another implementation of the sliding correlator can be as switched analog circuitry, in which in this case the incoming signal is sampled and the correlation is performed in switched capacitor circuitry. One embodiment simply adjusts the phase by changing the frequency and accomplishing both the coarse and the fine adjustments by adjusting the PLL frequency.

In an alternative embodiment, the source assembly 326 sends a training sequence with known characteristics as a preamble to a series of vector transmissions, so as to facilitate synchronization acquisition and tracking. This training sequence may occur at the beginning of every vector transmission, or it may be transmitted as an independent snippet along with the input media signal snippets. Sending the training sequence as an independent EM signal allows this probe signal to characterise the quality of transmission media. Such characterization data is used for various signal correction parameters like pre-emphasis. Additionally, the training sequence signal could also be of much longer period than one collecting interval, increasing the SSDS process gain and thereby increasing the resilience against noise and interference. In the present disclosure, the training sequence is particularly powerful in facilitating acquisition and tracking simply because the training sequence can be made to have a constant amplitude.

An example of a parallel-correlation synchronization acquisition and tracking system is shown in FIG. 11. This system analyses adjacent taps 902, 904, and 906 in the PN sequence generator 814. By evaluating three adjacent taps concurrently, as well as the correlation relating to each of those individual taps, in the correlation spike detector 320, the lock detection algorithm is greatly simplified.

In a further embodiment, the receiving circuit is adapted to retransmit a phase-aligned and synchronized signal back to the transmitting circuit in an independent sub-band. Completing the control loop in this manner allows the transmitter to transition, in an embodiment, between providing the probe signal versus encoding media signal snippets. Upon initial power-up, the transmitting circuit transmits the probe signal until it acquires a sub-band signal that is returned from the receiving circuit. When the returned signal is received, the transmitting circuit then starts transmitting data according to the received parameters. This closed-loop control system allows a robust and self-calibrating media interface to be implemented.

Another preferred embodiment is the parallel correlation system shown in FIG. 11. This system analyzes adjacent taps in the PN sequence generator. By studying three adjacent taps and the correlation relating to each of those individual taps, the lock detection algorithm is greatly simplified.

In a further embodiment, the sink assembly is adapted to retransmit a phase-aligned and synchronized signal back to the source assembly in an independent sub-band. Completing the control loop in this manner allows the source assembly to transition, in an embodiment, between providing the probe signal versus encoding media signal snippets. Upon initial power-up, the source assembly transmits the probe signal until it acquires a sub-band signal that is returned from the sink assembly. When the returned signal is received, the source assembly then starts transmitting an EM signal according to the parameters received from the sink assembly. This closed-loop control system allows a robust and self-calibrating media transport to be implemented.

FIG. 12 shows a straightforward round-robin permutation of the collecting permuter 348. This permutation is applied iteratively such that samples 302 are successively collected from the decoder output vector 352 to samples 804 in the output media signals 502 α', β', . . . , ω', until all N output vector locations have been exhausted. There are potentially different numbers of samples per reconstructed output signal, all collected during the one collecting interval. The numbered circles indicate the order in which the decoder output vector contents are collected to output signals during the collecting interval. Exactly N samples are collected during the collecting interval.

Although there are N! equally good choices for collecting permuter 348 permutation, successful media signal transport demands that the collecting permuter implement the inverse of the collecting permuter 346 (shown in other figures) permutation. Ensuring agreement regarding such details is appropriately the subject of international standards, rather than of the present disclosure.

The schema drawn in FIG. 12 applies to many possible types of signal. For example, there could be a single media signal, consisting of a representation of video wherein each successive sample is a color value (for example, 3 (R/G/B) per pixel). Another example is also a single media signal, this one consisting of color values from several independent video signals are interleaved. Further examples include diverse types of signal, for example, video, audio, chemical, mechanical/haptic, and so forth. An embodiment of one such hybrid example includes different numbers of samples from/to each media signal during each transport time interval. Further examples include each of the four types of signal (digital, analog, pulsatile, and neural) solo or in combination.

There are many ways to implement the collecting permuter 348; one example is to write each successive output sample to a port; another alternative is to store the output samples to a memory upon which a reading can be executed to make the output available in the desired order.

FIG. 13 illustrates round-robin assignment of samples from indices in an 8-element decoder output vector to a parallel-RGB output video signal arising from reception of a first transport interval.

FIG. 13 illustrates an especially common special case of the general schema described in FIG. 12. In this example, the reconstructed media signal consists of 3 signals 502, representing the R, G, and B color planes, respectively, of a single reconstructed RGB-based video signal. N, the number of elements in the decoder 512 output vector 352, happens to be 8. This example shows the round-robin assignment during a given collecting interval.

Further to the example begun in FIG. 13, FIG. 14 illustrates round-robin assignment during the immediately following collecting interval.

FIG. 15 shows the structure of a binary code book which is a subset of the identity matrix, for the case where L=N+3. The chip index j 916 runs from 0 to L−1 horizontally across the figure, and the input/output vector index i 914 runs from 0 to N−1 vertically down the figure.

FIG. 16 shows an example of a 127×127 binary code book whose codes is each a unique rotation of a common PN sequence. In the figure, a black square corresponds to a "1" value, while a white square corresponds to a "−1" value. The matrix for pulsatile modulation is constructed per the following steps:
1. Instantiate the L×L identity matrix
2. Keep only the $1^{st}$ N rows
3. Convert 0 entries to −1 values
4. The result is the example code book depicted in FIG. 16

FIG. 17 shows an example of a 128×128 binary code book, which is a Walsh-Hadamard matrix. In the figure, a black square corresponds to a "1" value, while a white square corresponds to a "−1" value.

FIG. 18 shows an example of a 128×128 binary code book, which is constructed by convolving a Walsh-Hadamard matrix with a near-PN sequence. In the figure, a black square corresponds to a "1" value, while a white square corresponds to a "−1" value.

In an embodiment, the input media signal 500 and reconstructed media signal 502 comprise video signals, for example as illustrated in FIG. 5, FIG. 6, FIG. 13, and FIG. 14 for the case of fully populated R/G/B color planes.

FIG. 19 shows one embodiment wherein the subject of this disclosure is applied to (a class of) video systems. All of the elements are connected with instances of Media Interfaces 1. Every Media Interface is implemented with one or more Media Transports combined with provision for control and status communication. The Media Transports each includes one source assembly 326 and one sink assembly 328. As explained elsewhere, each of the EM paths 314 shown in FIG. 19 can be one of a variety of physical embodiments over which the methods and apparatuses disclosed herein are applicable.

The architecture depicted in FIG. 19 comprises a predetermined number C of cameras 516 and another predetermined number D of displays 518. The architecture depicted in FIG. 19 also includes a media processing unit (MPU) 548. The MPU in turn contains a video processor 536, non-volatile storage 560, with which the video processor exchanges storage signals 562, and a Wide Area Network interface 544, through which the video processor communicates with the Internet 576 via Internet Protocol signals 546.

The camera 516 depicted in FIG. 19 comprises a lens 520, which refracts incident light 528 to project focused light 534 onto a focal plane 554 occupied by an image sensor 522. The image sensor produces an output signal 524 which comprises an ordered series of light measurements, each measurement corresponding to a geometric location within the focal plane, wherein each measurement is acquired during a predetermined image sensor exposure interval 4. In one pipeline-balanced embodiment, the image sensor exposure interval equals the transport interval 2. The camera also includes a source assembly 326. 538 is a circuit that adapts image sensor output samples as an input media signal for the encoder.

The image sensor 522 output signal 524 is intrinsically pulsatile; converting to digital signals uses an additional analog-to-digital converter circuit, which cannot possibly add fidelity while certainly adding non-zero manufacturing cost. A simplest embodiment of the subject of this disclosure conveys pulsatile signals directly, without requiring analog-to-digital conversion of the light measurements, resulting in fit-for-purpose transmission of high-resolution video signals at least cost compared to prior arrangements.

The display 518 shown in FIG. 19 comprises a sink assembly 328, a circuit 540 that adapts the sink assembly output (reconstructed display control signal snippets) to the input 526 of display element array controller 556. The array controller generates a series of brightness control values 558. Each brightness control value determines the brightness maintained during each predetermined display array refresh interval 6 of the light-emitting element at each geometric location within the array 530 of display elements. In one pipeline-balanced embodiment, the display array refresh interval equals the transport interval 2. The display array consists of elements, such as certain kinds of diodes, which emit light 552. Viewers' brains interpret such activity over time as moving images.

In a video embodiment of FIG. 19, the centrepiece of the video system depicted in is the central processing unit (MPU) 548, which in turn is based on a video processor 536. The MPU receives a signal from every camera 516 via Media Interface 1, and the MPU transmits a signal to every display 518 in the system via Media Interface 1. All the camera signals and all of the display signals each is independent from all other video signals in the system. A potentially trivial circuit 568 adapts each sink assembly output 570 (reconstructed camera output signal snippets) to the data format required for the video processor. Similarly, a potentially trivial circuit 574 adapts prepared display input signals 566 from the data format of the video processor to an input media signal 566 destined for the corresponding display. Circuits 568 and 574 are well known in the art.

In an embodiment, the MPU 548 performs a variety of operations on video, including decoding stored content 562 retrieved from non-volatile memory 560, storing compressed video signals 562 to non-volatile memory, and/or exchanging Internet Protocol signals 546 with the Internet 576 via a WAN Modem 544. A bidirectional converter 542 translates between Ethernet packets and the pulsatile or digital signals traversing the datapaths of the video processor.

In one embodiment, the video processor 536 is a CPU. In a further embodiment, the video processor is a GPU. The video processor may be implemented either with digital datapaths or with pulsatile data-paths. Digital data-paths demand A/D on inputs and D/A on outputs and are therefore intrinsically less efficient for video than pulsatile data-paths.

A broad diversity of common video systems are seen to be parametric variants of the schema sketched in FIG. 19, for example:

In one embodiment of a home entertainment system circa 1990: C=0—there are no cameras. D=1—a CRT display is encased in a box that sits on a table. The MPU 548 is a tuner/amplifier circuit assembly, the EM path 314 is coaxial cable, and the Media Interface 1 is PAL.

In one embodiment of a home entertainment system circa 2016, C=2—a Kinect system includes stereo monochrome computer vision. D=1—an HDMI display hangs on the wall. The MPU 548 is a gaming machine such as, for example, a PlayStation™ of Sony or Xbox™ of Microsoft, the EM path 314 is HDMI cable, and the Media Interface 1 is HDMI.

In one possible embodiment of a home entertainment system, for example one implementing iVR™ ("immersive virtual reality"), C=256—high-resolution cameras provide 3D 360-degree machine vision inputs, making a whole new range of inputs available for gesture- and movement-based interfaces. D=2048—every solid wall, ceiling, and floor is constructed from flexible, rugged display panels. The MPU 548 is a computationally enhanced variant of a PlayStation or Xbox. The EM path 314 is any American Wire Gauge (AWG) wire pair, and the Media Interface 1 is implemented with Media Transport 3 that is the subject of the present disclosure. This embodiment enables an experience that is qualitatively different from what is heretofore expected of pixel-rich Internet content.

In one embodiment of a passenger vehicle system, C=8—a variety of infrared (IR) and ultraviolet (UV) and visible light sensors collects data for machine vision analysis for safety. D=4—displays are provided on the dash and in front seat head rests, for rear passenger entertainment. The MPU 548 is the engine control unit (ECU). The EM path 314 is CAT-3, and the Media Interface 1 is LVDS.

In one possible embodiment of a passenger vehicle system, C=32—a variety of IR and UV and visible light sensors collects data for machine vision analysis for safety, and video-intensive Internet interaction is enabled for passengers. D=64—displays are provided on all solid surfaces and on exterior glass and on the dash, both for control and for passenger entertainment. The MPU 548 is the engine control unit (ECU). The EM path 314 is inexpensive cable, and the Media Interface 1 is the subject of the present disclosure. This embodiment enables passengers to enjoy iVR entertainment experiences, while the driver can take advantage of the most responsive possible heads-up display for controlling the vehicle.

In one embodiment of a retail signage video system (e.g., fast food restaurant menus), the MPU 548 is a tower PC or server. The EM path 314 is CAT-5/6, and the Media Interface 1 is HDBaseT.

In one possible embodiment of a retail signage video system, the MPU 548 is a tower PC or server. The EM path 314 is any AWG wire pair, and the Media Interface 1 is implemented with Media Transport 3 that is the subject of the present disclosure. This embodiment allows displays 518 to be placed further away from the MPU, thus saving costs by allowing a single MPU to accommodate a larger number of displays. Moreover, the cables are far less expensive, and it is easy to terminate such cables in the field (currently a major barrier to HDMI enabling iVR).

In one embodiment of an HD video surveillance system, the MPU 548 is a DVR. The EM path 314 is coaxial cable, and the Media Interface 1 is Analog HD.

In one possible embodiment of an 8K video surveillance system, the MPU 548 is a DVR. The EM path 314 is any AWG wire pair, and the Media Interface 1 is implemented with Media Transport 3 that is the subject of the present disclosure. This embodiment carries high-resolution video cost-effectively over legacy infrastructure cabling.

Other embodiments that can be shown to be parametric instantiations of the schema of FIG. 19 include a circa 1970 cinema system wherein C=0 and D=1, an example surround-view system wherein C=0 and D=8, a futuristic iVR cinema system wherein C=64 and D=64, an HD rock concert video system wherein C=8 and D=8, and an 8K rock concert video system, wherein C=128 and D=128, that enables high-resolution live experiences incorporating video feeds of performers, audience members, prepared video signals, and synthetically generated video signals.

The subject of the present disclosure is aspects of a Media Transport 3 that can be used to implement any media interface over one or more EM paths of any type. In many applications requiring transport of video, audio, and other kinds of media signals, it is desirable also to be able to transport information along the EM path in the direction opposite to that of the main media signal information flow. For example, the MPU 548 shown in FIG. 19 may benefit from the ability to send control and configuration information to sensors, including cameras and microphones. The disclosed Media Transport does not preclude low-bandwidth upstream communication.

The source assembly 326 encodes a vector of N samples every encoding interval. If we call the number of encoding intervals per second f (so f=1/encoding interval), the throughput of the source assembly is N f samples per second, making available Lf samples per second for transmission into the EM path 314, where L>=N. For example, 1920×1080 1080p60 HD Video, is approximately 2 million pixels or 6 million samples per frame, or 360 million samples per second for an RGB encoding of each pixel. That tells us N f=360e6=.36e9. It might reasonably be expected that Lf=1 GHz=1e9. Then N/L=.36, or for L=128, N=46. The source assembly transmits the entire ordered series of output values during the transport interval.

FIG. 20 shows an example oscilloscope trace of a signal arriving from the EM path (314 of FIG. 19) at the sink assembly 328 input terminal 340. The vertical scale is voltage, and the horizontal scale is 100 ps oscilloscope measurement interval. In FIG. 20, 20 oscilloscope measurement intervals correspond to one sink assembly measuring interval.

FIG. 21 shows a flow diagram for a method for collecting, encoding, and making available. The flow diagram suggests many ways in which the various steps can be decoupled in practical ways for useful effect. There are many ways to achieve the making available step; one example is to provide the level on a transmitting terminal, another alternative is to store the output into a memory upon which a reading can be executed to make the output available.

FIG. 22 shows a flow diagram for a method for receiving, decoding, and collecting. Iteration is intrinsic to the method, because it relies on iteration for tracking synchronization with the paired method for collecting, encoding, and making available. There are many ways to achieve the receiving step; one example is to measure the values in succession on a port, another alternative is to read the input from a memory which has been initialized to make the input available. The receiving is adapted to any form of intra-equipment signalling.

FIG. 23 shows an example comparing uniform intervals and non-uniform intervals for modulating, dispatching, measuring, and demodulating.

FIG. 24 shows an example comparing binary-valued chips and continuous-valued chips.

FIG. 25 shows an example of a test pattern being transmitted through an EM path exhibiting a relatively low electrical Signal-to-Noise Ratio in the presence of strong aggressor signals. Many known video transports fail totally under such adverse conditions. As is evident in the figure, the media signal is readily visible.

FIG. 26 shows an embodiment of the implementation of the sink assembly Downhill Transform.

FIG. 27 shows a single-EM-pathway Media Interface 1 that is a superset of the Media Transport method/apparatus 3 that is the subject of FIG. 3. As explained elsewhere, the twisted-pair representation of an EM path 314 shown in FIG. 27 is just one of a variety of physical embodiments over which the methods and apparatuses disclosed herein are applicable. In addition to the Media Transport, the Media Interface includes these circuits:

incoming content decoder, to expose the input media signal. Examples include MPEG4 decoder or HDMI HDCP decoder transmitter assembly includes bit-serial SSDS-CDMA modulation of a modest number of down-cable control signals with very long codes. The amount of information to be communicated is relatively tiny, while it is important to accurately convey each control bit source assembly includes EQ, measurer, and known bit-serial SSDS-CDMA demodulation of a modest number of up-cable status signals with very long codes. The amount of information to be communicated is relatively tiny, while it is important to accurately convey each status bit sink assembly includes known bit-serial SSDS-CDMA modulation of a modest number of up-cable status signals with very long codes. The amount of information to be communicated is relatively tiny, while it is important to accurately convey each status bit sink assembly includes known bit-serial SSDS-CDMA demodulation of a modest number of down-cable control signals with very long codes. The amount of information to be communicated is relatively tiny, while it is important to accurately convey each control bit outgoing content encoder, to prepare the reconstructed media signal for its intended system application. Examples include MPEG4 encoder or HDMI HDCP encoder FIG. 28 shows three alternative sets of logical pin assignments for a 19-pin HDMI connector, two of which are suitable for EM signalling according to the methods and apparatuses disclosed herein with $P \geq 4$.

FIG. 29 shows a source assembly that receives an HDMI video signal and exchanges control and status information on an HDMI interface and exchanges EM signals representing the video signal and forwarding the control and status information over a hyPHY-HDMI-A-A interface (as defined in FIG. 28) using the detailed apparatuses disclosed herein.

FIG. 30 shows a sink assembly that exchanges EM signals over a hyPHY-HDMI-A-A interface (as defined in FIG. 28) using the detailed apparatuses disclosed herein and transmits a reconstructed video signal and exchanges control and status information on an HDMI interface.

FIG. 29 is a source assembly and FIG. 30 is a sink assembly that are paired to implement HDMI over HDMI cables, with EM signals produced by the media signal SSDS-CDMA. Samples from the high-bandwidth media signal are assigned in turn to four encoders and making available circuits driving the four shielded EM paths driven from the source assembly as hyPHY0 . . . hyPHY3. The media signals reconstructed in the receiver assembly from each of the four EM paths are combined as appropriate in post-processing and media transport encryption. All of the modest-volume, bit-accurate bi-directional control and status communications are tunnelled over other EM paths available in the HDMI Type A connector.

FIG. 31 shows two alternative sets of logical pin assignments for an 8P8C UTP connector that are suitable for EM signalling according to the methods and apparatuses disclosed herein with P=4.

FIG. 32 shows a source assembly that receives an HDMI video signal and exchanges control and status information on an HDMI interface and exchanges EM signals representing the video signal and forwarding the control and status information over a hyPHY-UTP-A32 interface (as defined in FIG. 31) using the detailed apparatuses disclosed herein.

FIG. 33 shows a sink assembly that exchanges EM signals over a hyPHY-UTP-A32 interface (as defined in FIG. 31) using the detailed apparatuses disclosed herein and transmits a reconstructed video signal and exchanges control and status information on an HDMI interface. This sink assembly repeatedly receives four EM signals conveyed over UTP cable as an input series of measured levels, decoding each input series into a memory of output samples, and collecting the output samples as an HDMI video signal, wherein control and status information is exchanged via their modulation with high-process-gain spreading codes that are orthogonal with the codes in the codebook chosen for media sample communication. In this asymmetric example architecture, the control information is tunnelled over a designated one of the pairs (hyPHY3), while the status information is tunnelled over a different designated one of the pairs (hyPHY2).

FIG. 34 shows a source assembly sub-circuit that adds an EM signal containing timing recovery information to an EM signal representing an input media signal snippet. The added EM signal facilitates synchronization acquisition and tracking in a paired sink assembly.

FIG. 34 shows an embodiment of a timing recovery information injector circuit. The purpose of injecting timing recovery information is to facilitate timing acquisition and tracking in the paired receiver assembly. In a preferred embodiment, the circuit of FIG. 33 is incorporated in the transmitter assembly.

The code overlaid per FIG. 34 must be orthogonal with all of the codes in the codebook.

Note that it may be possible to apply the long-code control/status tunnelling scheme to provide media framing information, for example hsync and vsync for video signals.

FIG. 35 shows a sink assembly sub-circuit that heuristically searches for phase and frequency lock with an incoming EM signal containing timing recovery information. The PN code generated in FIG. 35 must be the same as that referenced in FIG. 34 in the paired source assembly.

FIG. 36 shows an embodiment of a source assembly connecting an HDMI sink to a hyPHY-UTP-S source, containing an Uphill Transform and an Uphill PHY.

FIG. 37 shows an embodiment of a source assembly Uphill Transform.

FIG. 38 shows an embodiment of the implementation of the source assembly Uphill PHY.

FIG. 39 shows an embodiment of a sink assembly connecting a hyPHY-UTP-S sink to an HDMI source over four EM paths. The sink assembly is a bi-directional device, so "input" is w.r.t. video flow. 4 UTP inputs; media sink port connects to 4 UTP terminals and receives 4 EM signals produced by the media signal SSDS-CDMA, receives 4 sideband EM signals corresponding to digital status and audio information, and generates 4 sideband EM signals corresponding to digital control and audio information; transcode between connections; on the HDMI transmitter side, ctrl/status EM signals and an HDMI transmitter over 4 EM paths to/from 19-pin HDMI.

FIG. 40 shows an embodiment of a sink assembly Downhill PHY.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. While some of the examples shown are for RGB full-color images, the subject of this disclosure applies regardless of the depth/number of media signals or color space of any video in the media signal, including all variants of chroma/luma separated (and chroma-sub-sampled) color spaces (e.g., YUV, YUV 4:2:0, etc.), as well as Monochrome (i.e., just Y). Neither is the present invention restricted in its preferred embodiment regarding the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claim.

The invention claimed is:

1. A method for repeatedly distributing an ordered series of analog samples into two or more input vectors, each input vector being input into in an encoder input memory, each encoder encoding each input vector into an ordered series of analog output levels to be made available, and making available each ordered series of output analog levels to an Electromagnetic Propagation Pathway (EM path) during a transport interval through which EM signals are conveyed comprises the steps of:
   a) selecting values for P, an integer ≥2, and for N and L, each an integer such that L≥N≥2, where P is the number of EM paths through which the EM signals are conveyed and where each EM path comprises one encoder that encodes each input vector, where N is the number of the analog samples distributed during a distributing interval according to a predetermined permutation per input vector, and where L is a number of chips per code there being one code book for each of P encoders;
   b) determining a set of time intervals during which the steps of the method occur, including the distributing interval, an encoding interval, and the transport interval, and
   c) selecting a set of N codes from each of the code books, wherein each code of each set is associated with one of the analog samples of the corresponding encoder input vectors and wherein each of the N codes is a unique indexed sequence of the L chips, and each of the N codes is different from and orthogonal to the other N−1 codes in the set, wherein within the encoding interval each encoder performs the following sub-steps L times, once for each indexed sequence of the L chips, to form the ordered series of analog output levels:
      i. modulates each analog sample in the input vector by a value addressed by the indexed sequence in the code associated with the analog sample to form a modulated value, and
      ii. sums all modulated values to form an analog output level.

2. The method according to claim 1 wherein in step b) the distributing interval and the encoding interval are different from one another.

3. The method according to claim 1 wherein in step b) the determination of the transport interval is a period of time wherein the ordered series of analog output levels is made available to the EM path and depends upon trade-offs involving one or more of the N, the L, and the energy density limits of the EM path wherein, when the N and L are fixed, a shorter transport interval means higher payload throughput.

4. The method according to claim 3 wherein the transport interval is 100 ns.

5. The method according to claim 1 wherein in step c) each of the chips is a binary value, either +1, 0, or −1, and each code is DC-balanced.

6. The method according to claim 5, wherein the modulation is accomplished when the chip values are restricted to +1/−1 or +1/0.

7. The method according to claim 1, further communicating High Definition Multimedia Interface (HDMI) signals over Unshielded Twisted Pair (UTP), wherein P=4, N=63, and L=64.

8. The method according to claim 1, further communicating HDMI signals over UTP, wherein P=4, N=126, and L=512.

9. A method of distributing analog samples from one or more input media signals to P electromagnetic paths, the steps comprising:
   a) distributing the analog samples from the one or more input media signals into P indexed input vectors each of length N by implementing a predetermined distributing permutation, which is a one-to-one mapping between indices in a set of the input media signals to indices in the P indexed input vectors;

b) encoding using P encoders by iterating a modulating sub-step L times, once for each code index of codes of length L, each of the analog samples corresponding to one of the codes, wherein P is an integer ≥2, and for N and L, each an integer such that L≥N≥2, each encoder performing the following modulating sub-step L times on the input vector corresponding to said each encoder, in order to form an ordered series of L analog output levels per encoder:
  i. modulating each analog sample in an input vector by the value addressed by the code index in the code corresponding to the each analog sample, and
  ii. summing the results of all the modulations of this modulating sub-step to form one of an the ordered series of analog output levels,
wherein the ordered series of analog output levels resulting from the modulating sub-step represents an electromagnetic signal of one of the P electromagnetic paths with properties conducive to reconstructing an output vector that suitably represents the corresponding input vectors; and
c) for each of the P electromagnetic paths corresponding to one of the encoders,
making available all of the analog output levels in the ordered series of analog output levels and outputting the analog output levels on said each P electromagnetic path.

10. The method in accordance with claim 9 wherein additional information is conveyed over the P electromagnetic paths during a predetermined modulating interval.

11. The method in accordance with claim 9 wherein additional information is conveyed over the P electromagnetic paths by varying modulating intervals that are in succession, wherein an ordered series of varied modulating intervals is a modulation that adds phase information to the electromagnetic signal produced by media signal modulation, wherein varying modulating intervals that are in succession provides supplementary Electro-magnetic Interference/Radio Frequency interference and spectral energy suppression.

12. The method in accordance with claim 11 wherein the modulating intervals are either 80 ps or 120 ps, and the selection between the two modulating interval values is such that a sequence of the modulating intervals is a near-Pseudo Noise (PN) sequence, wherein the sequence of modulating intervals comprises an average of 100 ps.

13. The method in accordance with claim 11 wherein the modulating intervals range continuously between 80 ps and 120 ps.

14. The method in accordance with claim 9 wherein the modulating intervals are uniform to facilitate the encoding step implementation, while the dispatching intervals are varied.

15. The method in accordance with claim 11 wherein the varying modulating intervals are either 80 ps and 120 ps, and the selection between the two values is such that the sequence of modulating intervals is a near-PN sequence wherein the modulating intervals comprise an average of 100 ps.

16. The method in accordance with claim 11 wherein the modulating intervals are one of the durations of 40 ps, 60ps, 80 ps, 100 ps, 120ps, 140 ps, 160 ps, and 180 ps, and a selection of successive durations is such that a sequence of modulating intervals is a PN code.

17. The method of claim 9 wherein the analog samples from the one or more input media signals are assigned to input vector locations in the P encoders in straightforward round-robin order.

18. A method for receiving an ordered series of input values corresponding to a series of output values produced by a corresponding encoding method having been applied to one or more input payload snippets from two or more electromagnetic propagation pathways during a predetermined transport interval, decoding the ordered series of input values received from each electromagnetic pathway into an output vector, and collecting the output vectors into two or more reconstructed payload snippets, comprising the steps of:
  a) acquiring synchronization with a signal arriving from the electromagnetic pathways;
  b) preparing an output vector containing a predetermined number N of locations for N input values to develop the reconstructed payload snippets;
  c) associating with each index in an output vector a code, from a predetermined code set, wherein each of the codes from the predetermined code set is an indexed sequence of values, wherein each code is different from each of the other N−1 codes in the set, and each code is L chips long, and the code set is identical to a code set applied in the corresponding encoding method, wherein L and N for a decoding method match the corresponding parameter values in the corresponding encoding method, wherein for N and L, are each an integer such that L≥N≥2;
  d) receiving during the predetermined transport interval in which a paired method for collecting, encoding, and making available executes its making available step, by repeating a measuring inner loop, executed once for each of the L indices in the ordered series of input values, comprising the multiple sub-steps:
    i. determining the duration of measuring inner loop, and
    ii. measuring an indexed one of the ordered series of input values delivered from an electromagnetic propagation pathway; and
  e) decoding during a predetermined decoding interval, the decoding step executes L iterations of a demodulating loop, one iteration for each of the L indices in the ordered series of input values, each demodulating step of the demodulating loop executed during a demodulating interval, each decoding step consisting of several sub-steps:
    A. determining the duration of the demodulating interval,
    B. demodulating the indexed value in the ordered input series by a commonly indexed value in the code corresponding to an output vector index,
    C. summing the demodulation result from sub-step B) with a correspondingly indexed element of the output vector,
    D. storing the summing result from sub-step C) in the corresponding output vector index, and
    E. tracking synchronization with a sending signal; and
  f) collecting during a predetermined collecting interval by implementing a predetermined permutation, which is a one-to-one mapping between indices in the output vector to indices in the set of reconstructed snippets, wherein the permutation is the inverse of a permutation applied in the corresponding encoding method, wherein the predetermined permutation presents zero or more samples from the output vector to each reconstructed payload snippet.

19. The method according to claim 18 wherein in step e) the decoding interval equals the transport interval.

20. The method according to claim 18 wherein the collecting interval equals the transport interval.

21. The method according to claim 18 wherein when there is a sequence of demodulating intervals that are uniform, the duration of each demodulating interval is equal to the duration of the transport interval divided by L.

22. The method according to claim 21 wherein the demodulating interval is 100 ps.

23. The method according to claim 1 wherein the codes are spreading codes.

24. The method according to claim 1 further comprising:
for each EM path corresponding to one of the encoders, making available all of the analog output levels in the ordered series of analog output levels and outputting the analog output levels on said each EM path.

25. The method according to claim 1 further comprising:
d) for each EM path corresponding to one of the P encoders, making available all analog output levels in the ordered series of analog output levels from the corresponding encoder, including iteration of a dispatching sub-step L times, once for each of the L levels in the ordered series of analog output levels, wherein each dispatching sub-step includes:
   iii. making available to the EM path the ordered series of analog output levels from the corresponding encoder and outputting the analog output levels on said each EM path.

26. The method according to claim 9 further comprising:
d) for each electromagnetic path corresponding to one of the P encoders, making available all analog output levels in the ordered series of analog output levels from the corresponding encoder, including iteration of a dispatching sub-step L times, once for each of the L levels in the ordered series of analog output levels, wherein each dispatching sub-step includes:
   iii. making available to the electromagnetic path the ordered series of analog output levels from the corresponding encoder and outputting the analog output levels on said each electromagnetic path.

27. The method according to claim 18 wherein the input values are analog or digital values.

28. A method for receiving P ordered series of analog input values produced by a corresponding encoding method having been applied to one or more media signals, wherein P>=2, each of the ordered series of analog input values being received from an electromagnetic pathway, decoding the ordered series of analog input values received from each electromagnetic pathway into an output vector, and collecting the output vectors into one or more reconstructed media signals, comprising:
  a) for each ordered series of analog input values, identifying an output vector containing a predetermined number N of locations;
  b) for each ordered series of analog input values, associating with each index in the output vector a code from a predetermined code set, wherein each of the codes from the predetermined code set is an indexed sequence of values, wherein each code is different from each of the other N−1 codes in the set and each code is L chips long, wherein the code set is identical to a code set applied in the corresponding encoding method, and wherein for N and L, are each an integer such that $L \geq N \geq 2$;
  c) for each electromagnetic pathway, executing for each of L indices the step of measuring an indexed one of the ordered series of analog input values delivered from said each electromagnetic pathway; and
  d) for each electromagnetic pathway, executing one iteration for each of L indices the sub-steps of:
    i. for each output vector index, multiplying the indexed value in the code associated with said each output vector index by the indexed value in the ordered series of analog input values,
    ii. for each output vector index, summing the result from sub-step i) with the contents at said each output vector index, and
    iii. for each output vector index, storing the summing result from sub-step ii) at said each output vector index; and
  e) collecting analog samples from the locations of the output vectors by implementing a predetermined permutation, wherein the predetermined permutation presents zero or more analog samples from the output vectors to each reconstructed media signal.

\* \* \* \* \*